July 24, 1962     A. J. MALAVAZOS     3,045,907
CALCULATING MACHINE
Filed May 19, 1958                           23 Sheets-Sheet 3
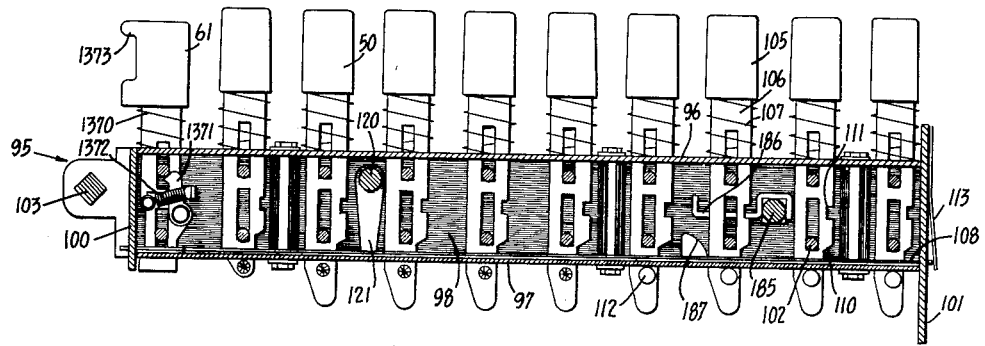
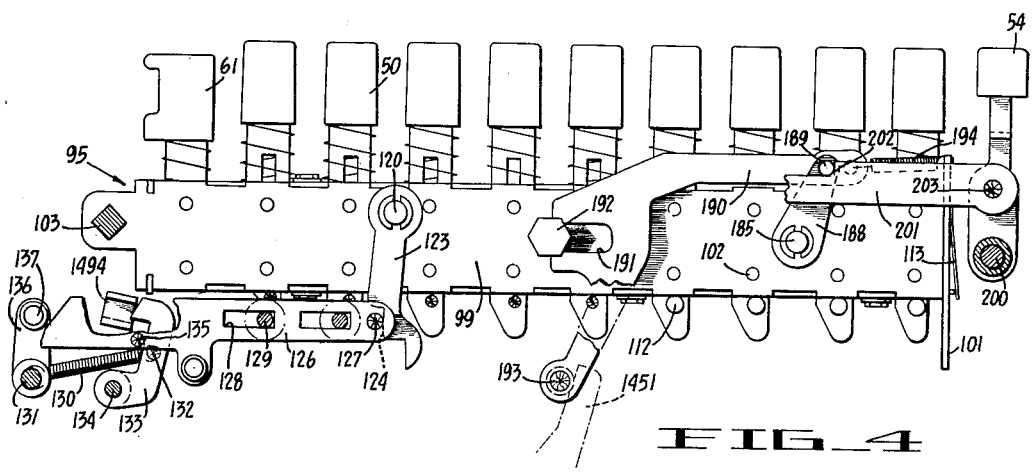
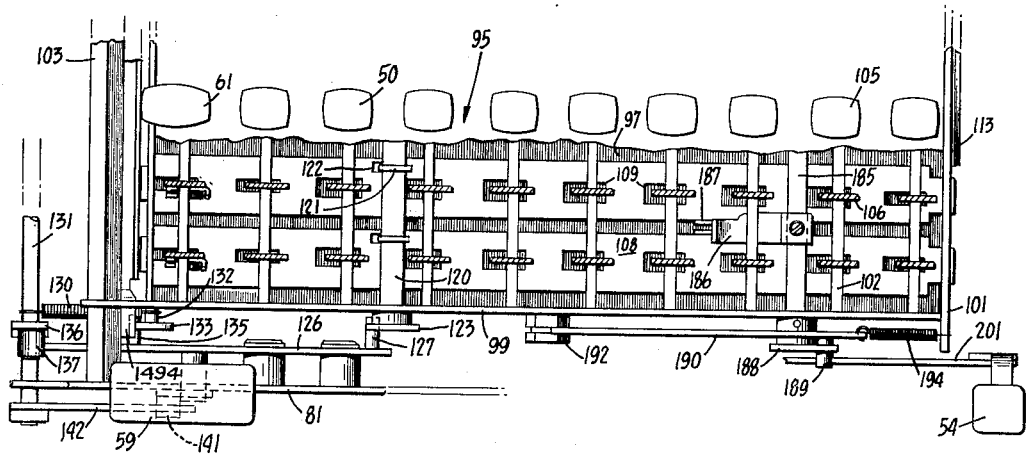

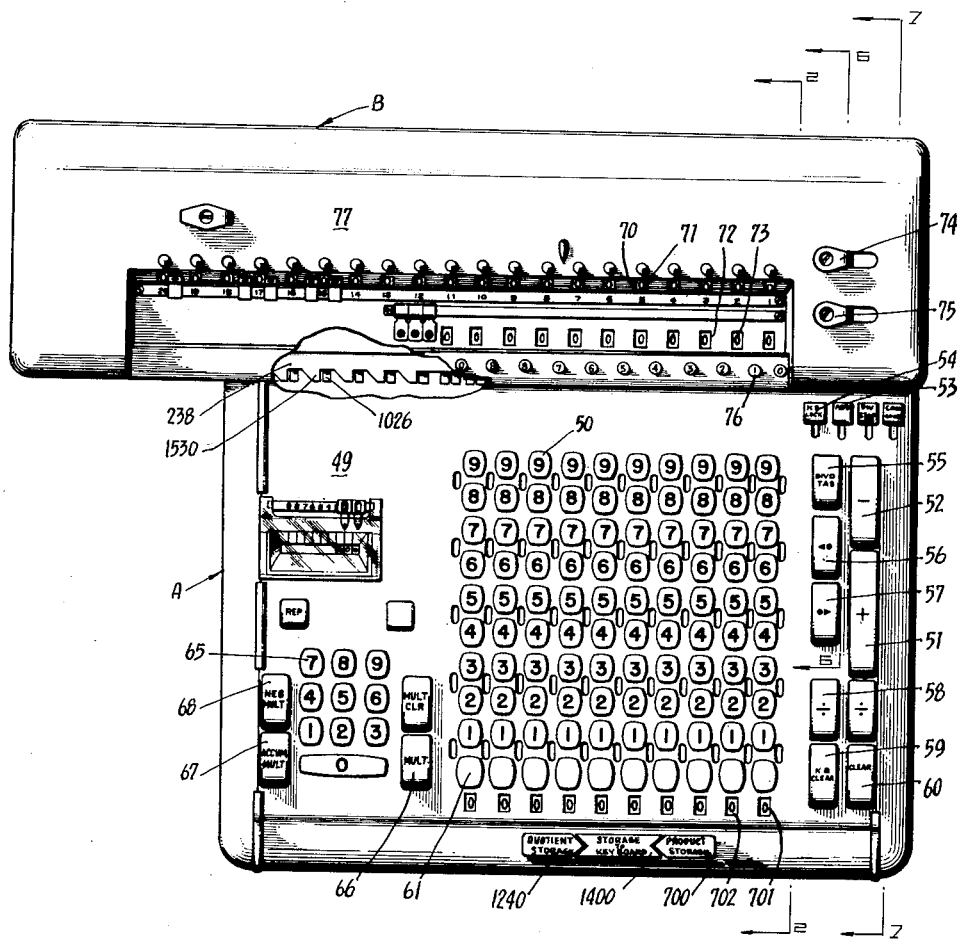
FIG_1

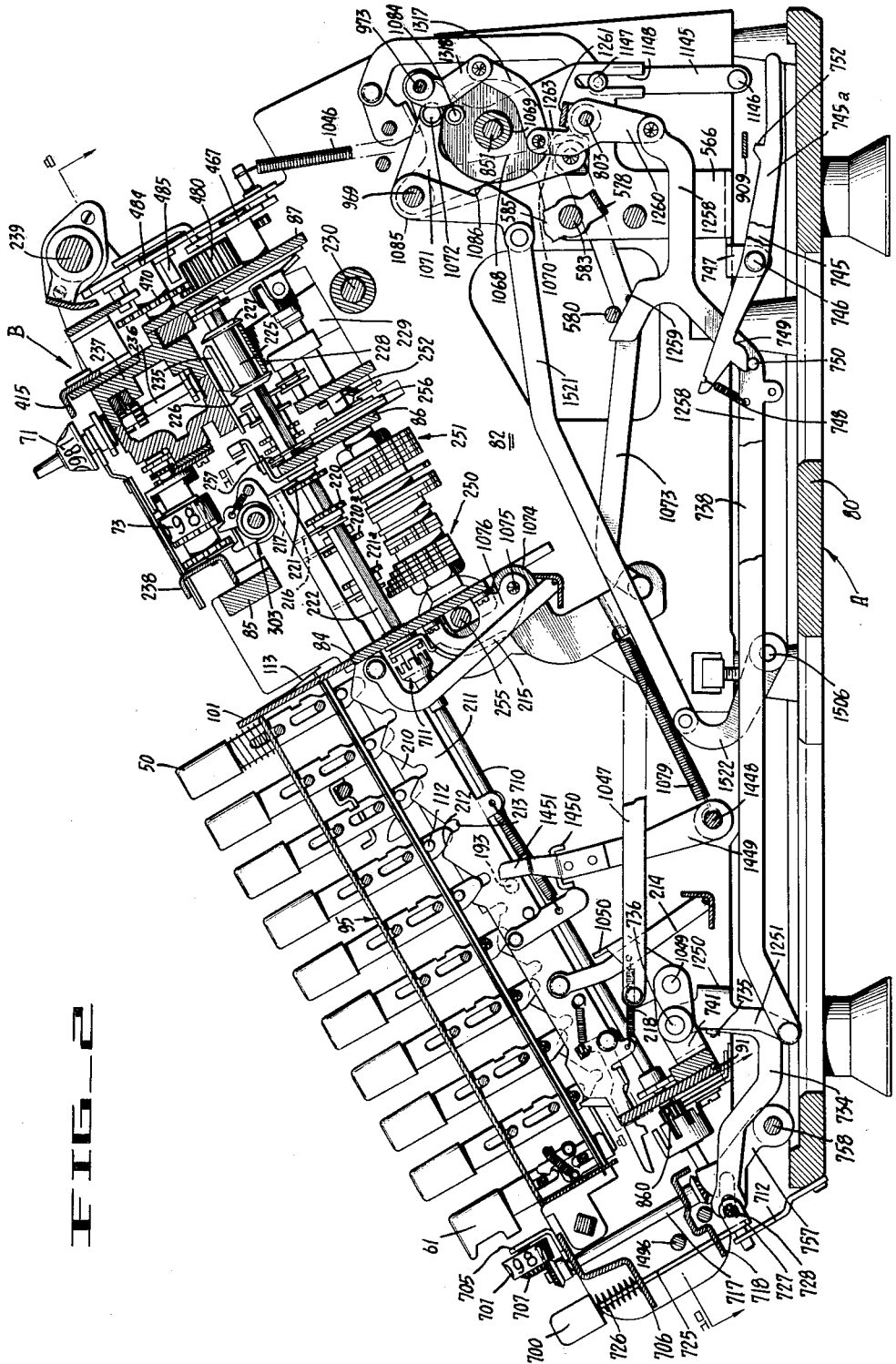
FIG_2

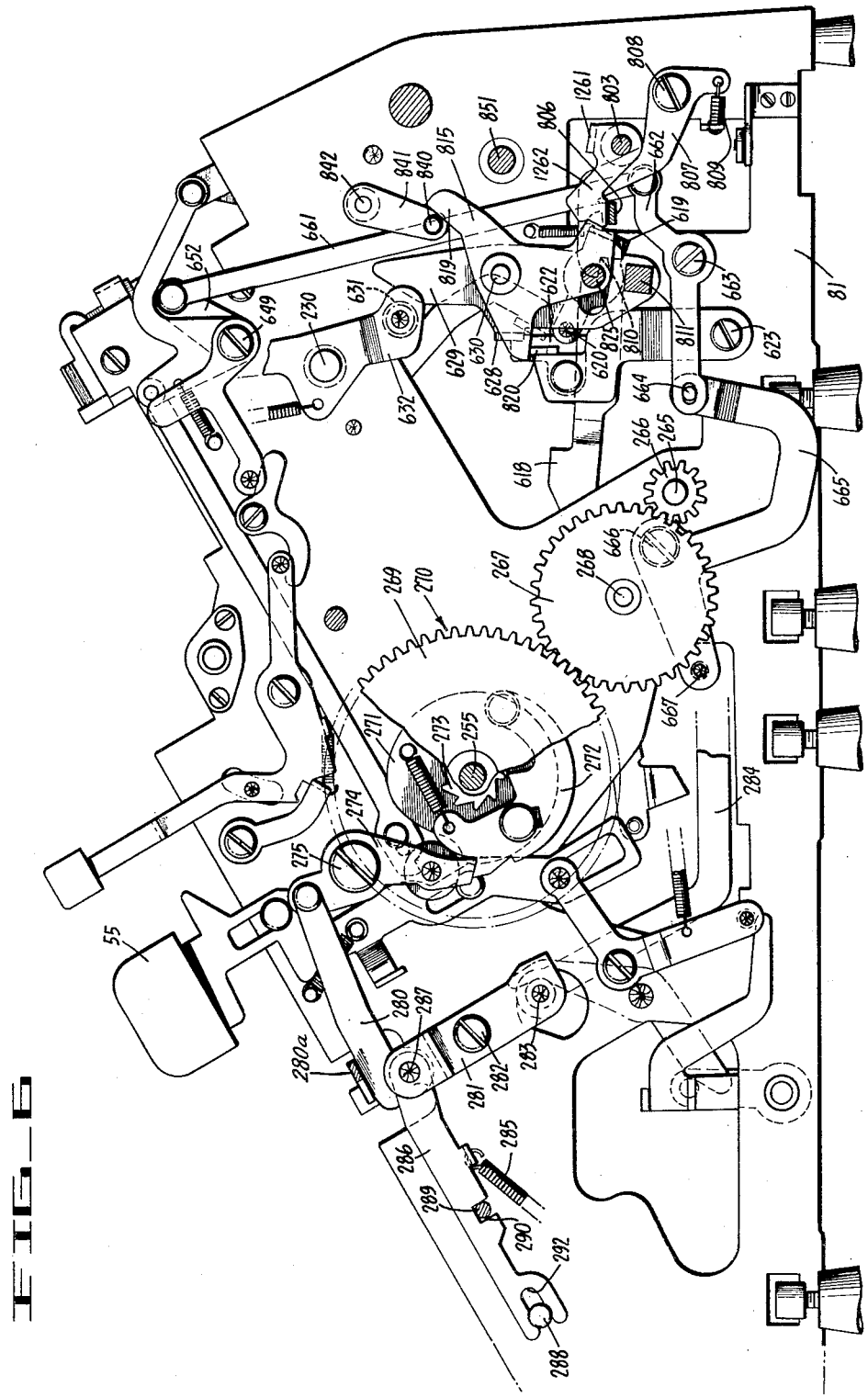

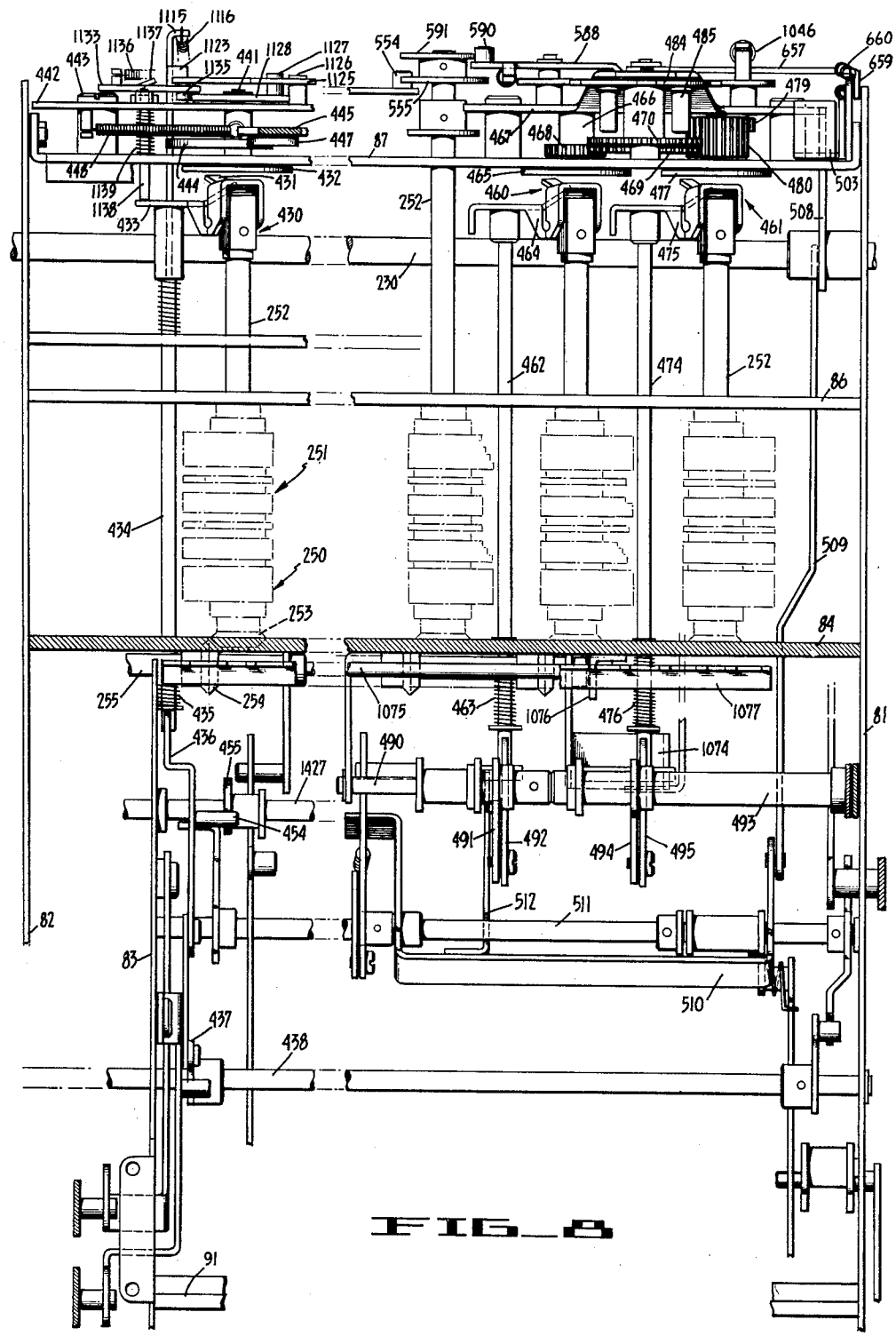
FIG_8

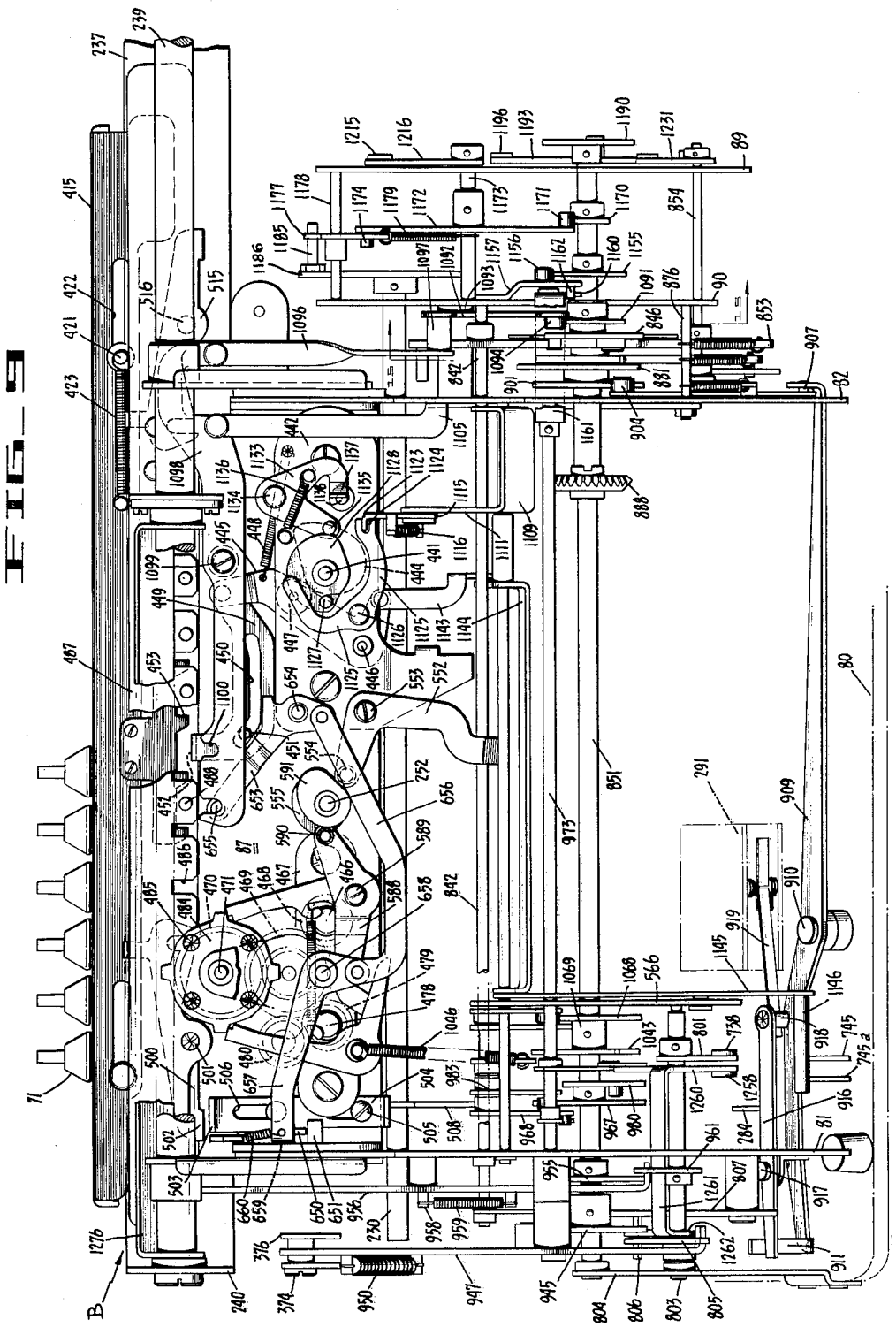

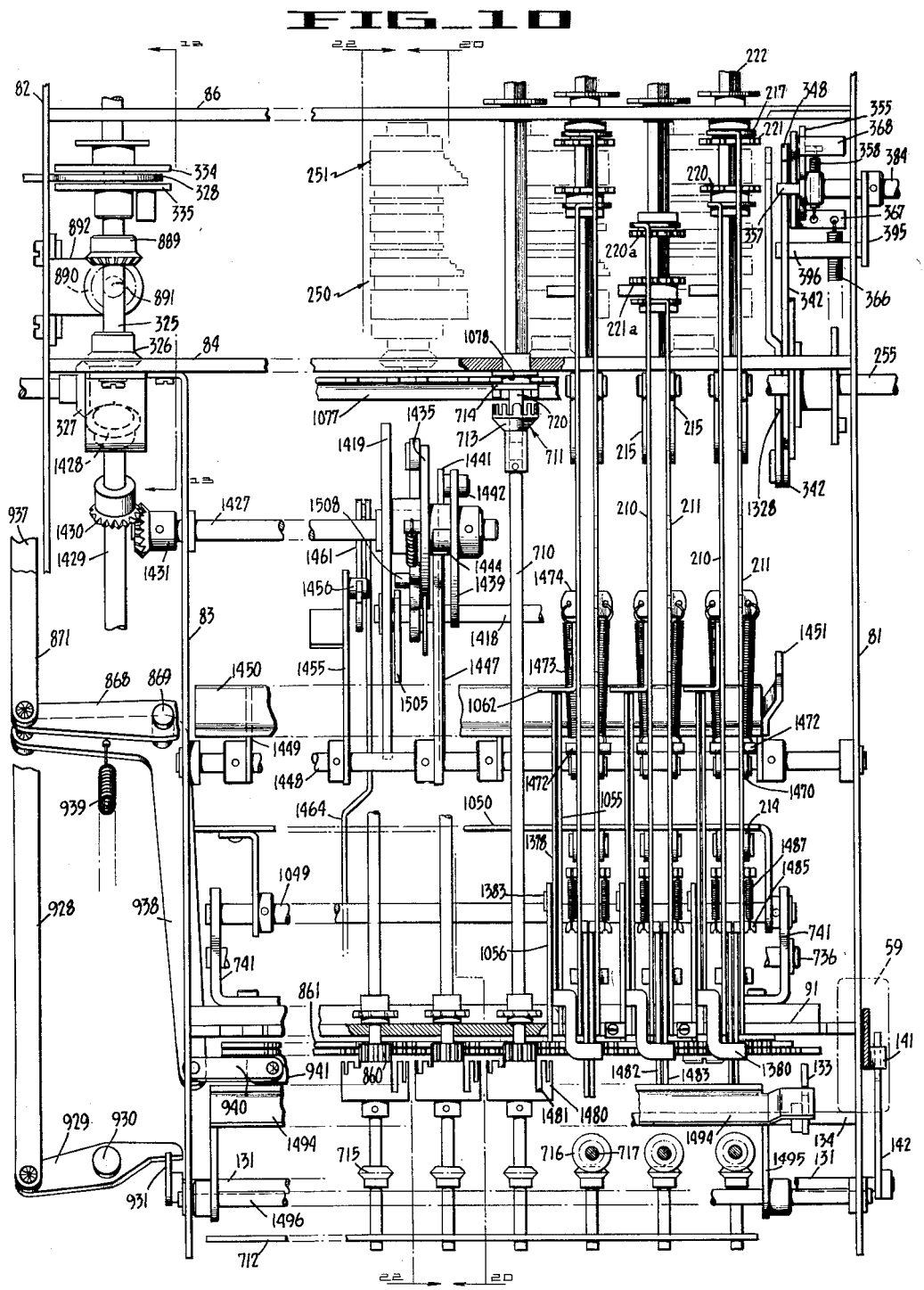
FIG_10

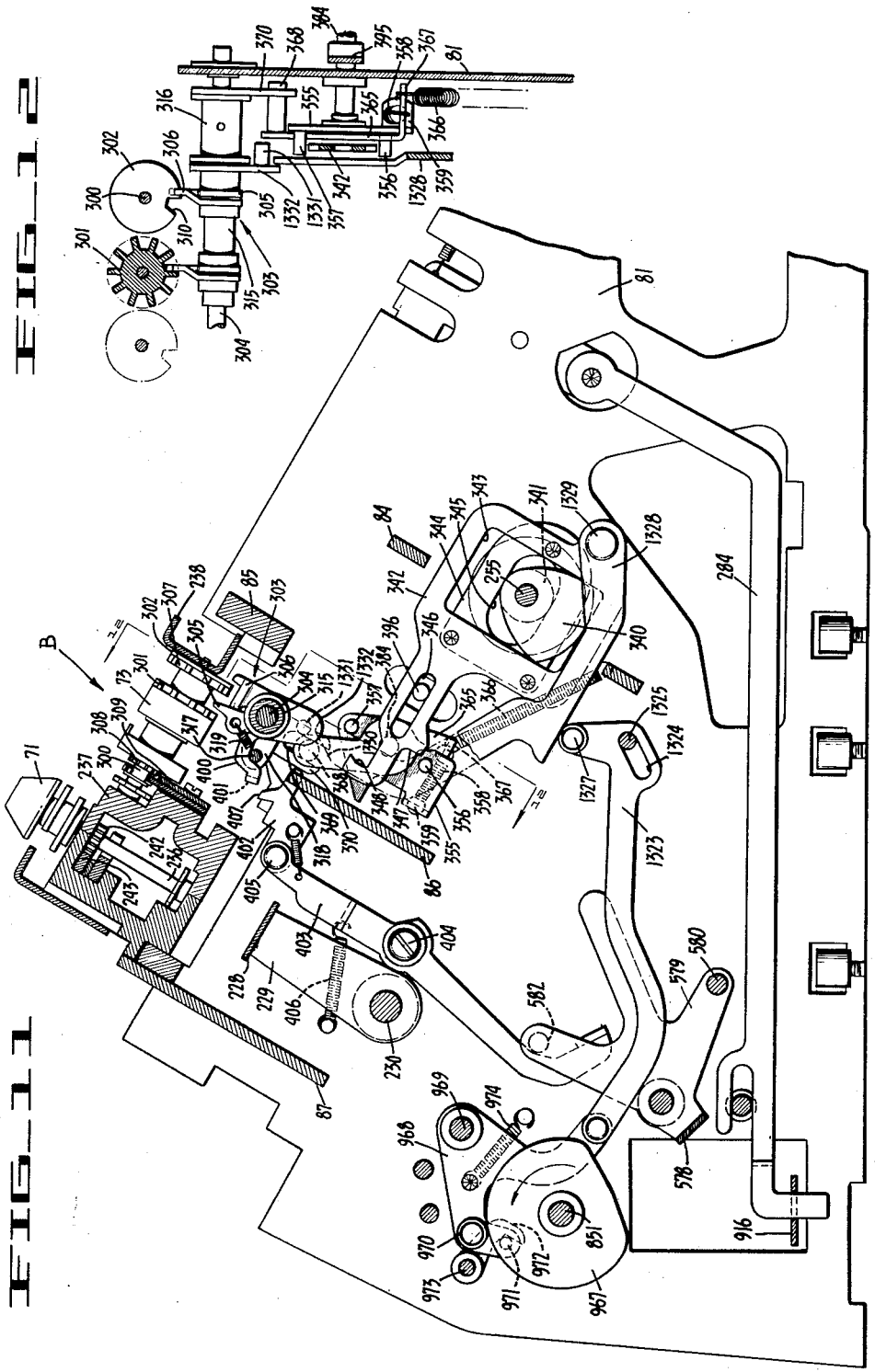

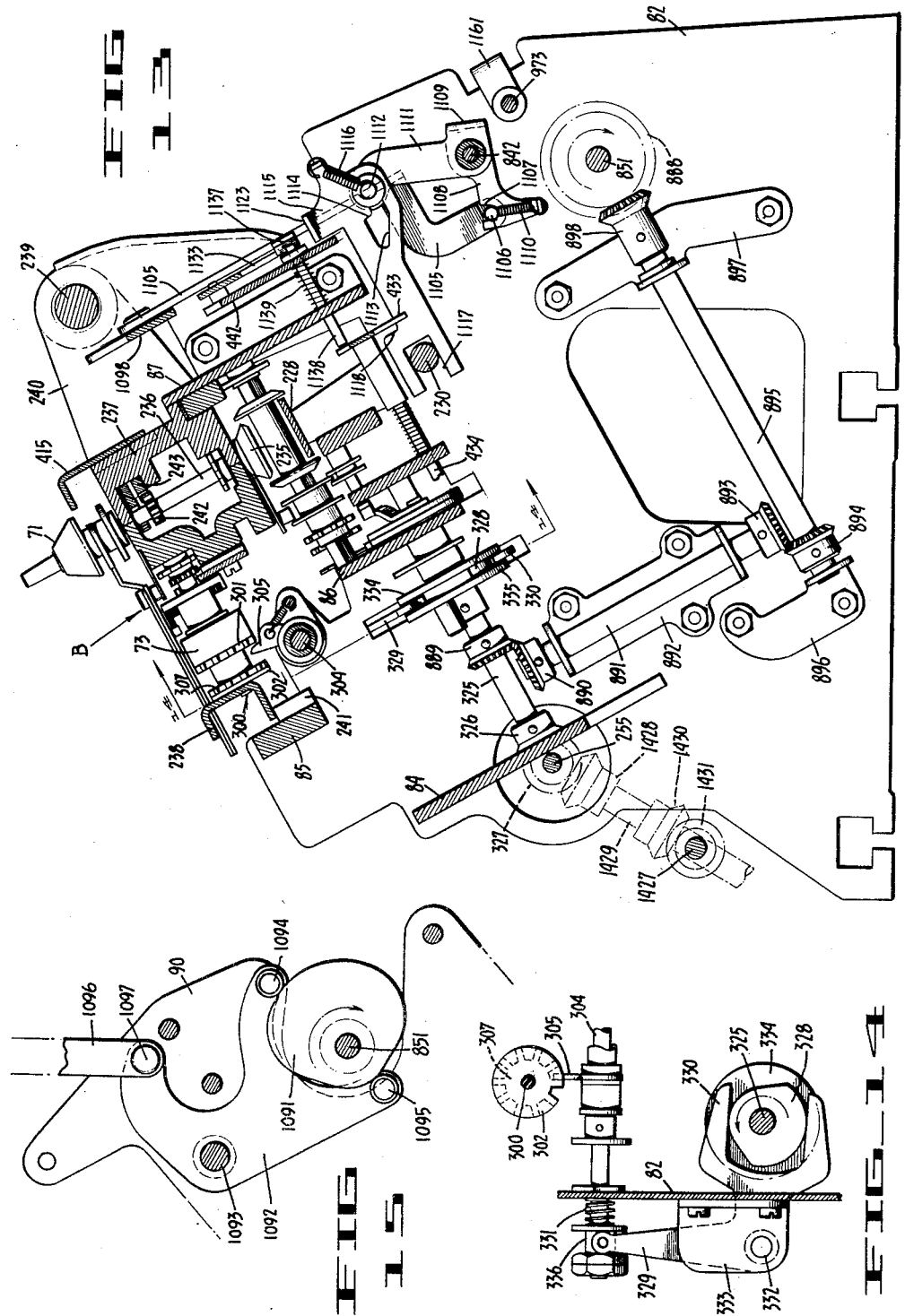

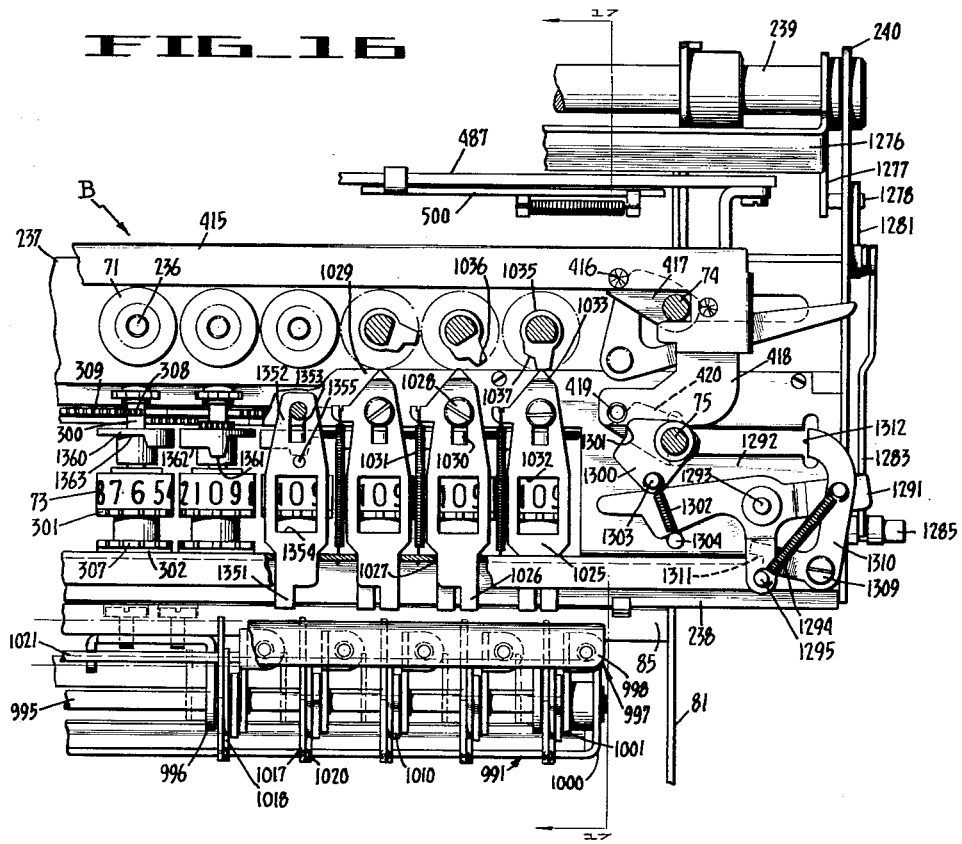
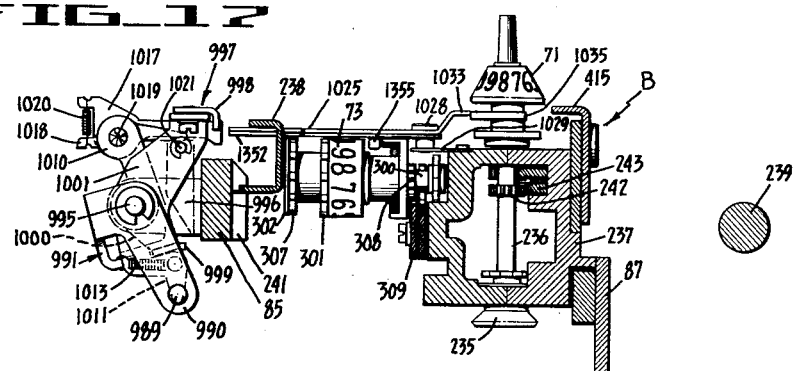
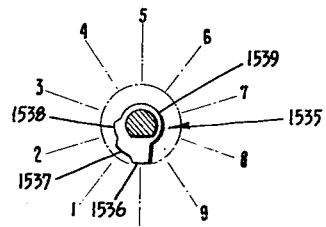

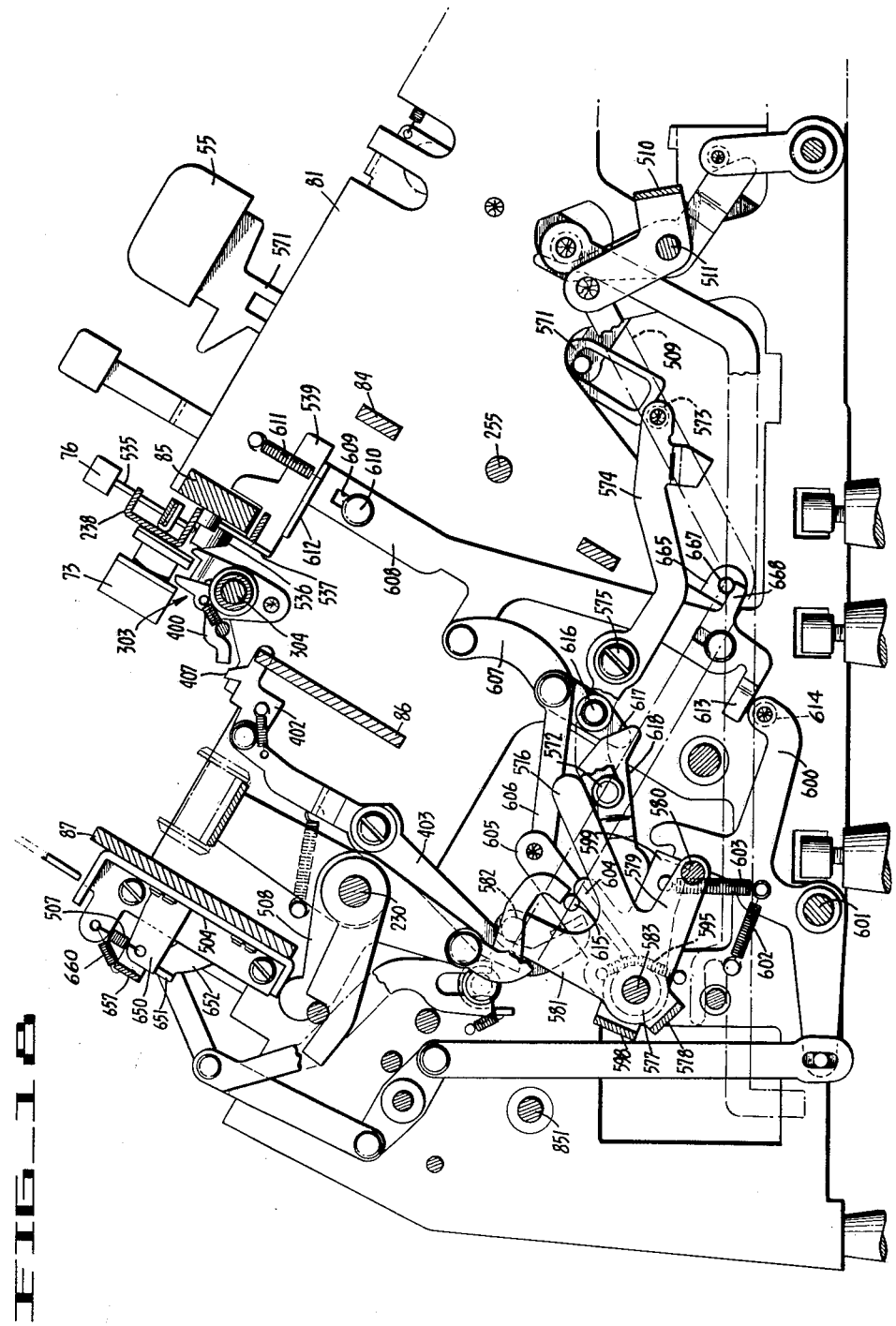
FIG_18

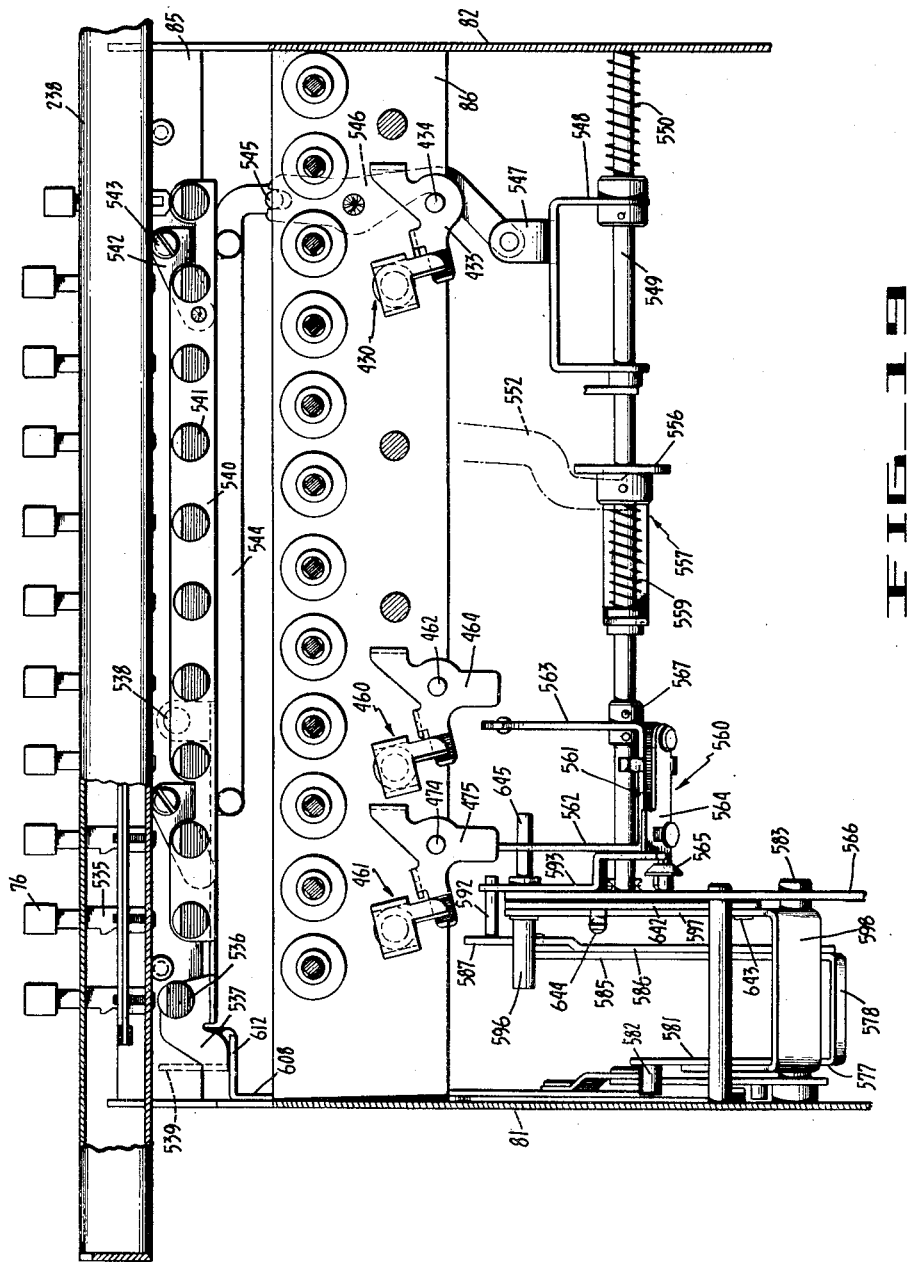

July 24, 1962
A. J. MALAVAZOS
3,045,907
CALCULATING MACHINE
Filed May 19, 1958
23 Sheets-Sheet 14
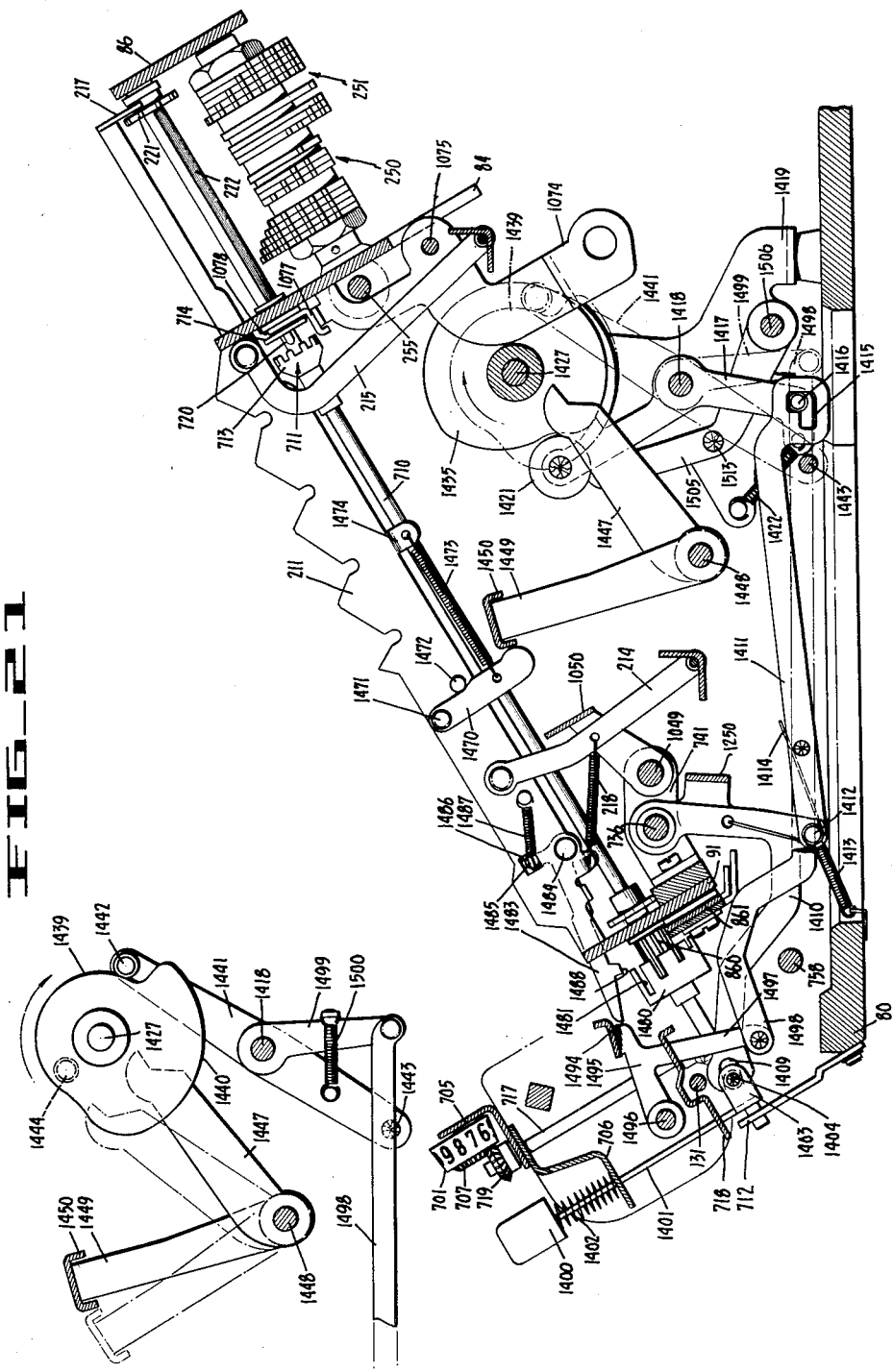

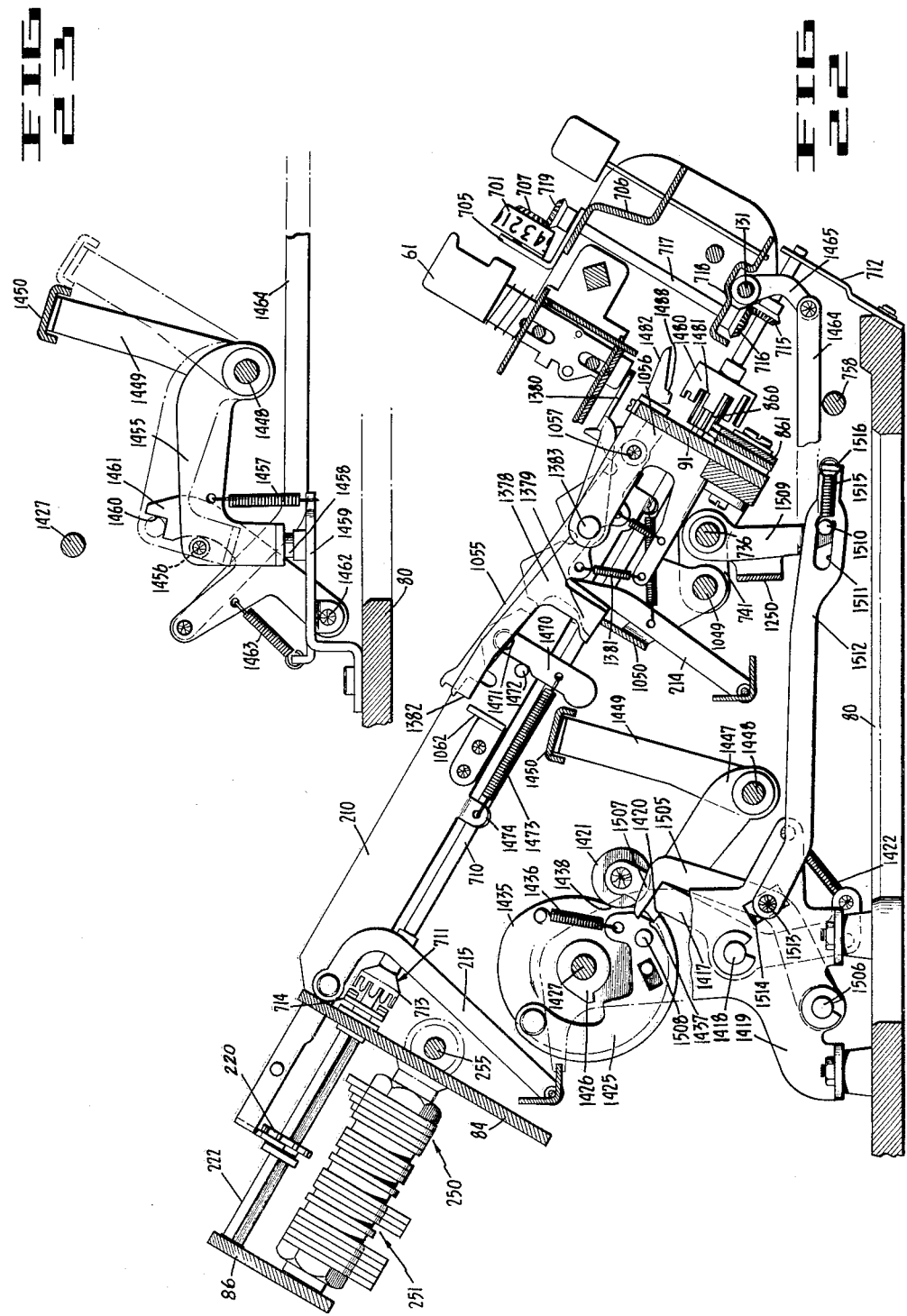

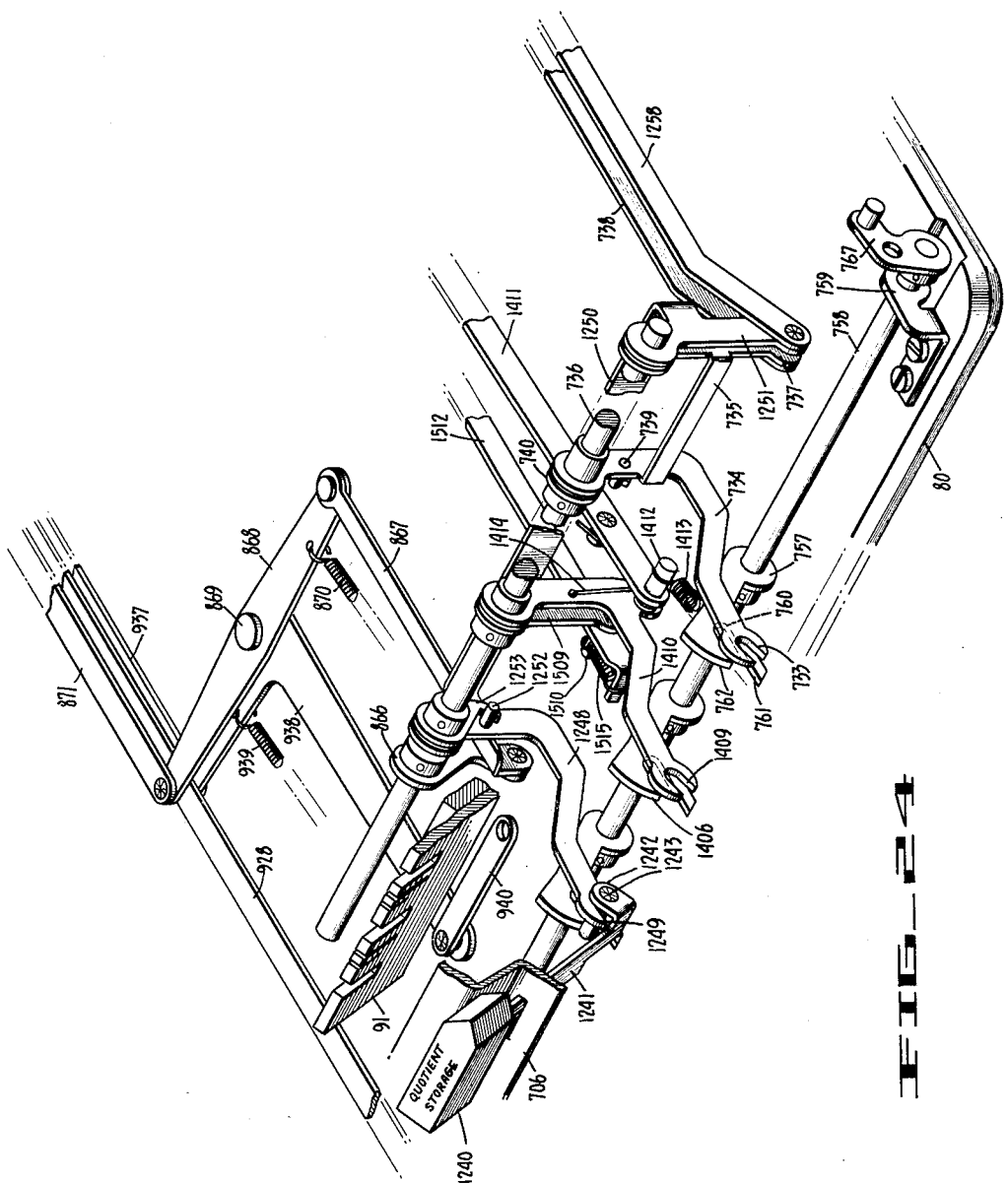

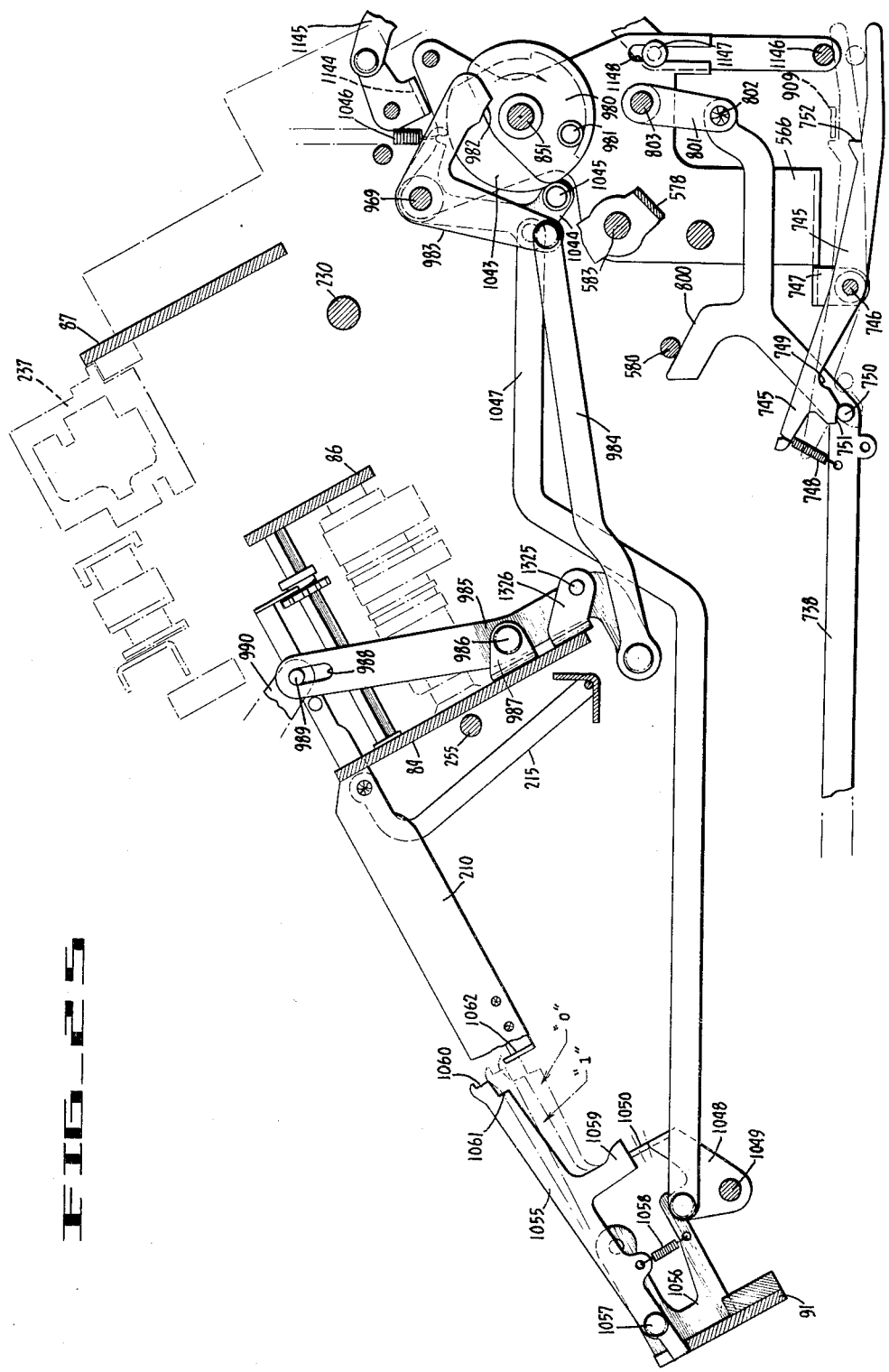

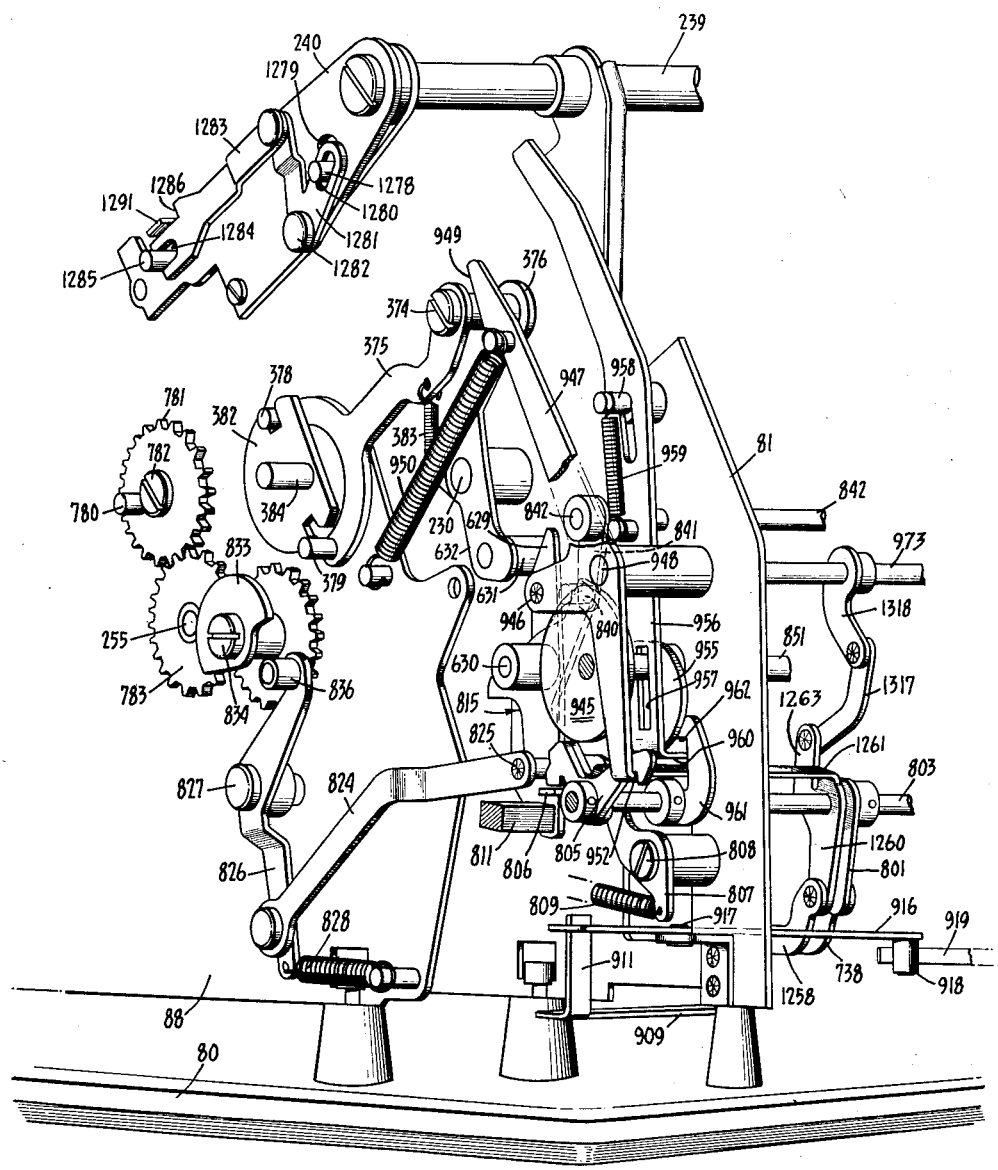
FIG_26

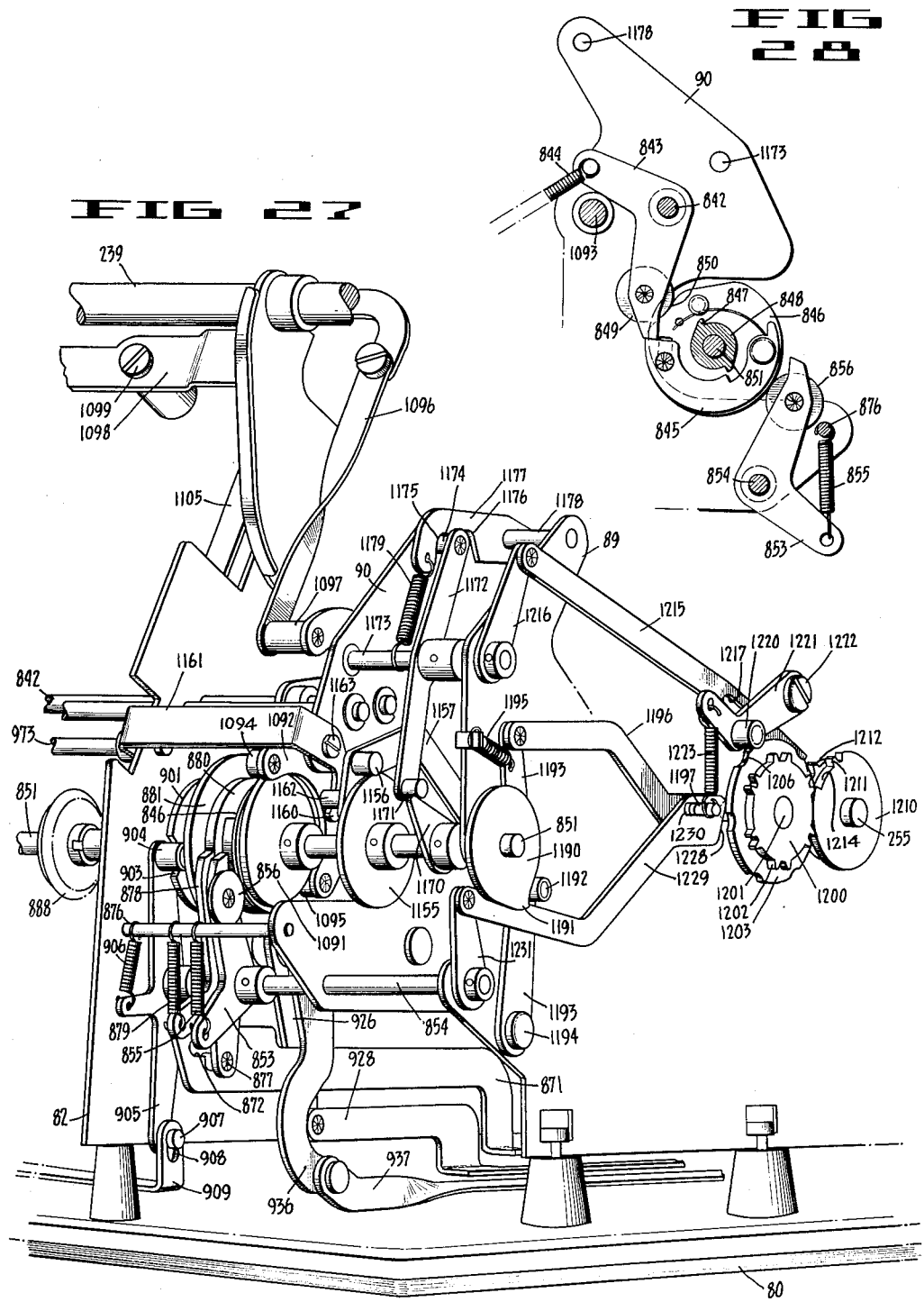

July 24, 1962   A. J. MALAVAZOS   3,045,907
CALCULATING MACHINE
Filed May 19, 1958   23 Sheets-Sheet 20
FIG_31
FIG_30
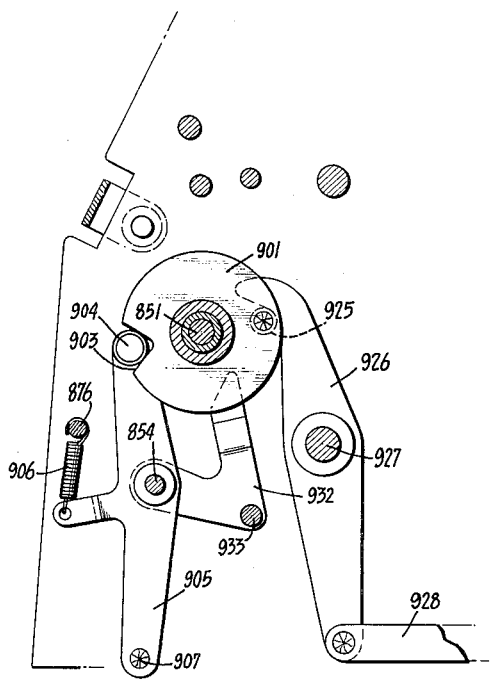
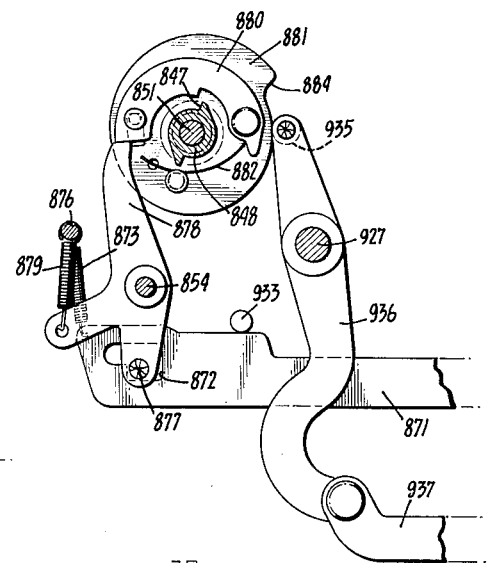
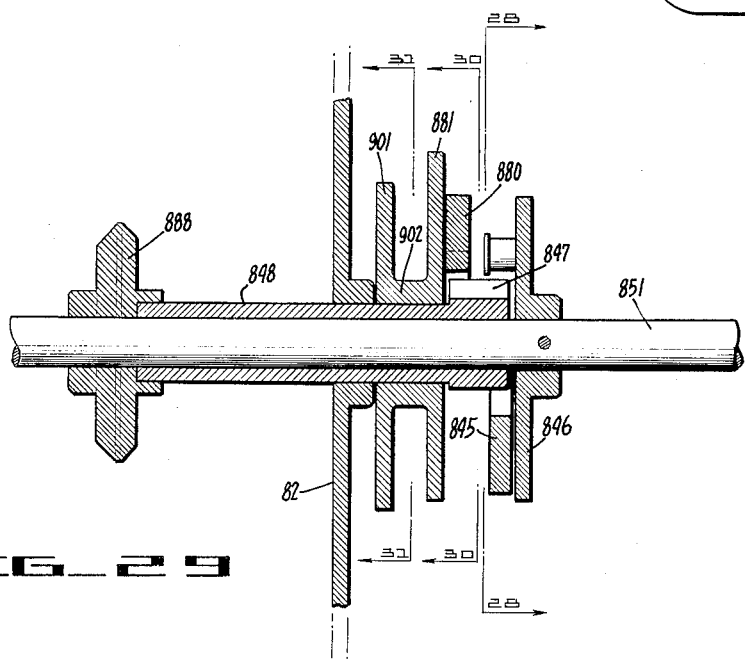
FIG_29

July 24, 1962
A. J. MALAVAZOS
3,045,907
CALCULATING MACHINE
Filed May 19, 1958
23 Sheets-Sheet 21
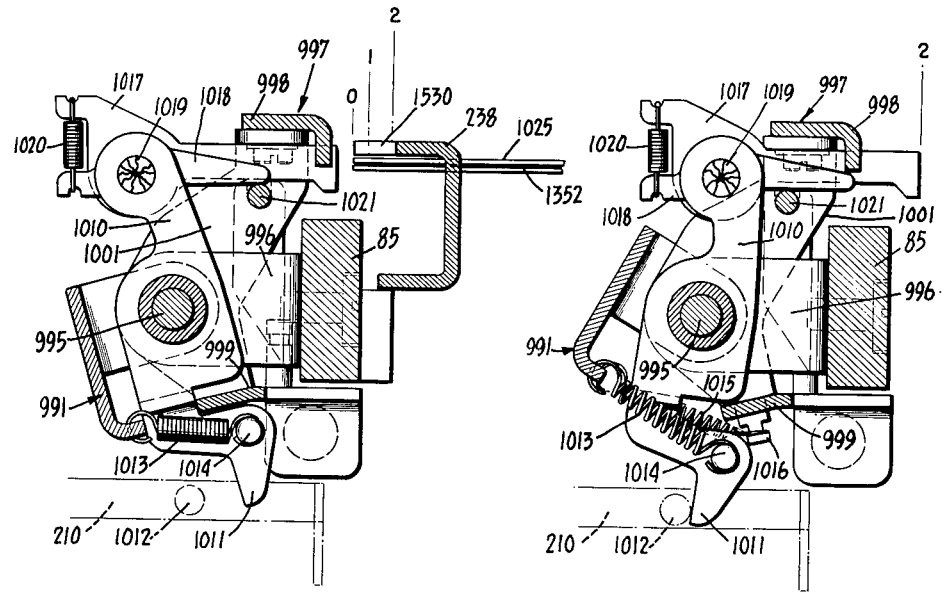
FIG_32  FIG_33
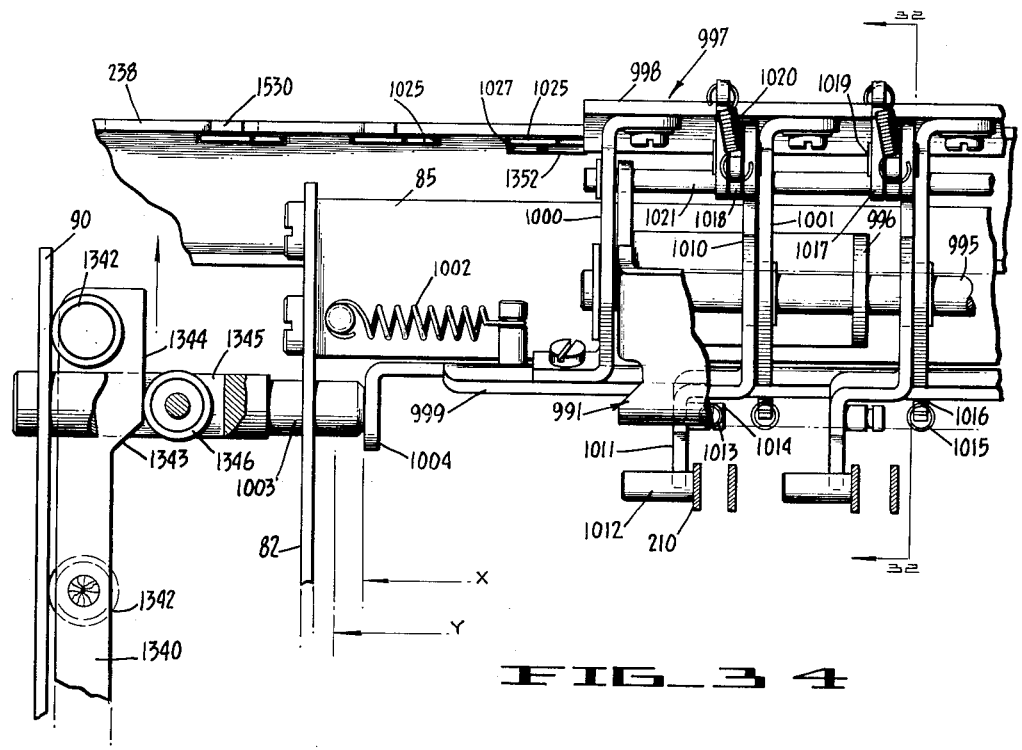
FIG_34

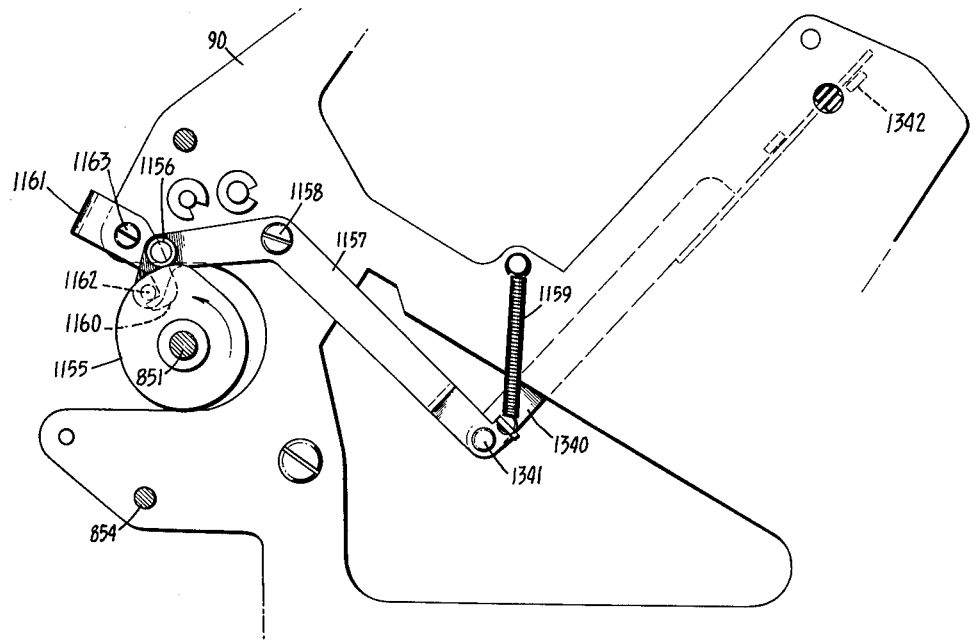
FIG_35
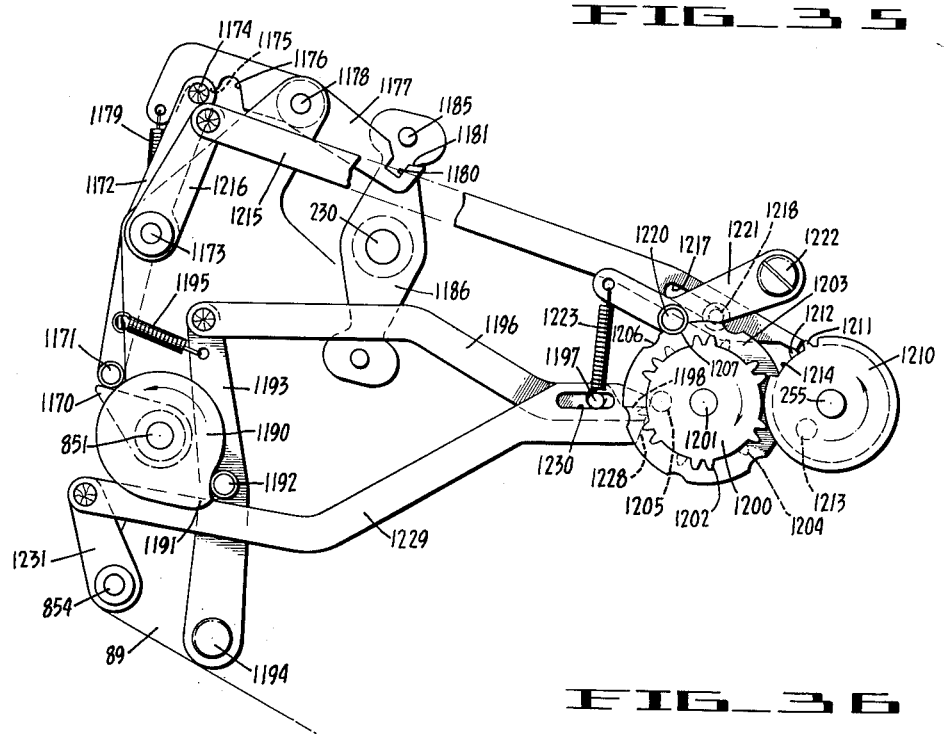
FIG_36

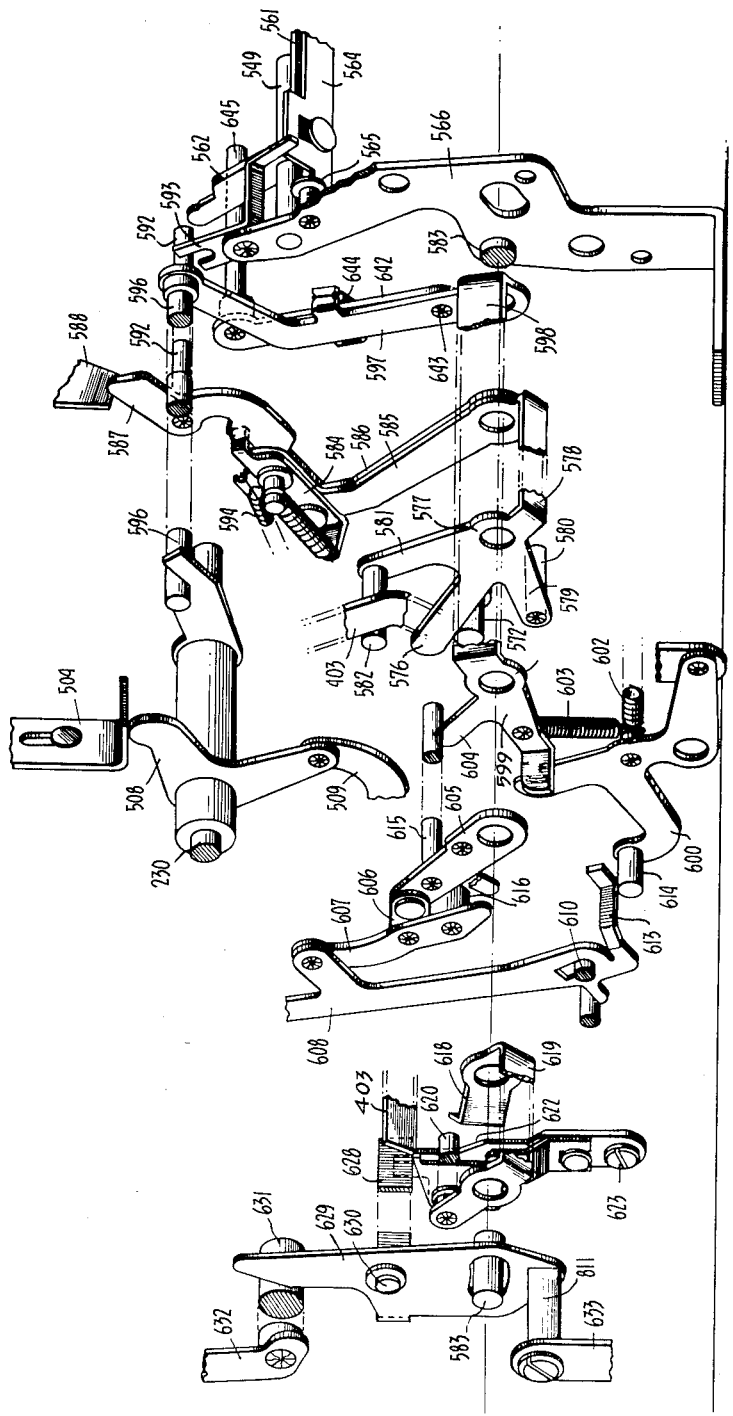

United States Patent Office 3,045,907
Patented July 24, 1962

3,045,907
CALCULATING MACHINE
Arthur J. Malavazos, Hayward, Calif., assignor to
Friden, Inc., a corporation of California
Filed May 19, 1958, Ser. No. 736,091
18 Claims. (Cl. 235—73)

TABLE OF CONTENTS

| | Col. No. |
|---|---|
| I. Conventional Mechanisms | 6 |
|    1. General Arrangement | 6 |
|    2. Keyboard | 7 |
|    3. Keyboard Clearing | 8 |
|    4. Keyboard Lock | 9 |
|    5. Selection Mechanism | 10 |
|    6. Accumulator Register | 12 |
|    7. Actuating Mechanism | 12 |
|    8. Drive Mechanism and Clutch | 13 |
|    9. Counter Register | 14 |
|    10. Counter Actuator | 15 |
|    11. Counter Control | 18 |
|    12. Counter Actuator Block | 19 |
|    13. Register Clearing | 19 |
|    14. Carriage Shift | 22 |
|    15. Carriage Tabulation | 24 |
| II. Transfer From Accumulator to Storage | 31 |
|    1. Storage Register | 34 |
|    2. Key Mechanism | 35 |
|    3. Main Clutch and Motor Switch Control | 36 |
|    4. Primary Auxiliary Clutch | 37 |
|       (a) Hold Switch Closed and Clutch Engaged for Second Cycle | 39 |
|       (b) Keyboard Release | 39 |
|       (c) Clear Storage Dials | 40 |
|       (d) Release Clutch Control Link | 40 |
|    5. Tabulating Mechanism | 41 |
|    6. Transfer Drive Clutch | 42 |
|       (a) Set Digitation Control Gate for Subtraction | 44 |
|       (b) Enable Counter Clear Mechanism | 44 |
|       (c) Counter Control Cam | 46 |
|       (d) Set Sensing Mechanism to Operative Position | 46 |
|       (e) Zero Locking Bail | 50 |
|       (f) Clutch Storage Mechanism to Square Shafts | 51 |
|       (g) Lock Carriage and Condition Register Clearing Mechanism | 52 |
|       (h) Counter Sensing Control | 55 |
|       (i) Operate Gate Centralizer | 55 |
|       (j) Five Cycle Program Control | 57 |
|    7. Terminate Operation and Clear Registers | 59 |
|    8. Transfer Operation | 59 |
| III. Transfer From Counter to Storage | 61 |
|    1. Storage Register | 63 |
|    2. Key Mechanism | 63 |
|    3. Main Clutch and Motor Control | 64 |
|    4. Primary Auxiliary Clutch | 64 |
|    5. Initiate Operation of Tabulating Mechanism | 64 |
|    6. Transfer Drive Mechanism | 64 |
|       (a) Gate Setting Cam 945 | 65 |
|       (b) Counter Actuator Cam 955 | 65 |
|       (c) Condition Counter Actuator | 67 |
|       (d) Set Sensing Mechanism to Operative Position | 68 |
|       (e) Zero Locking Bail | 68 |
|       (f) Clutch Storage Mechanism to Square Selection Shafts | 69 |
|       (g) Lock Carriage and Condition Register Clear Mechanism for Operation | 69 |
|       (h) Counter Sensing Control | 69 |
|       (i) Operate Gate Centralizer | 72 |
|       (j) Operate Machine Through Five Digitation Cycles | 72 |
|    7. Terminate Operation and Clear Registers | 72 |
| IV. Ordinal Transfer Lock | 72 |
| V. Transfer From Storage to Selection | 73 |
|    1. Control Key | 74 |
|    2. Selection Setting Clutch | 75 |
|    3. Selection Setting Actuator | 76 |
|    4. Bail Latching Mechanism | 77 |
|    5. Selection Bar Setting | 77 |
|    6. Value Cams | 78 |
|    7. Cam Sensing Fingers | 78 |
|    8. Keyboard Lock | 79 |
|    9. Simultaneous Operation With Transfer Control Keys | 79 |
|    10. Operation | 81 |

This invention relates to a calculating machine, and particularly to a mechanism therefor which is operative to transfer values from one register to another, and to store a factor in a manner in which it can be inserted into the selection mechanism and used as a factor in a subsequent operation.

It is one primary object of the present invention to provide what is often called a "back-transfer" mechanism for a calculating machine, i.e., a mechanism which can be selectively operated to transfer a value accumulated in a register back into the selection mechanism, or into a storage register, or both, from whence it can be used as a factor in a subsequent problem. One aspect of this objective is a transfer of values from the conventional accumulator, or product register, into the selection mechanism, while another aspect is a transfer of values from the counter, or quotient register, into the selection mechanism, or alternatively, to transfer either value into a storage register.

Another primary object of the present invention is to provide a factor storing mechanism in which a factor can be placed either directly from the keyboard or transferred from one of the registers of the machine, and there retained until desired by the operator, at which time it can be set into the selection mechanism and thence, in the preferred embodiment of my invention, inserted directly into the accumulator register of the machine additively or subtractively, or otherwise used as a keyboard factor in any machine operation, and without erasing the factor from the storage mechanism unless the operator desires to so erase it.

In its preferred form the invention utilizes a calculating machine of the type disclosed in the patent to Friden No. 2,229,889, issued January 28, 1941, as modified by certain other patents mentioned hereafter. The calculator of that patent includes two conventional registers: the accumulator, or product register, and a counter, or quotient register. The present invention, in its preferred form, adds a third, or storage, register and a mechanism whereby factors accumulated in either of the conventional registers can be transferred into the storage register or into the selection mechanism, or both, at the discretion of the operator. Thus, I provide in one machine, a mechanism which greatly extends the usefulness of the conventional calculator, not only by adding an additional register thereto, but also providing a mechanism by which a factor accumulated in any of the conventional registers can be transferred into the storage register or into the selection mechanism, so that the factor can be retained for any purpose and can be used in exactly the same way as a value inserted by manual operation of the keyboard. Incidentally, the value so stored in the storage mechanism will be shown in the storage register and can be stored there for an indefinite time and without regard to any number of intervening operations.

Another important object of the present invention, therefore, is to provide a factor storage mechanism, or constant factor device, in which a value can be stored indefinitely during an infinite number of intermediate problems and then used to insert that factor into the selection mechanism of the machine whenever, and as often as, the operator desires.

Another important object of the present invention is to provide a set of value indicating, or storage, dials which are operative to show the value set in the constant factor mechanism previously mentioned, or which can be used, if desired, to store grand totals.

Another important object or aspect of the present invention is to provide a means for driving a back-transfer mechanism more efficiently and with less strain on conventional mechanisms than has heretofore been the case. It can be mentioned that back-transfer mechanisms heretofore constructed are usually operated by clearing the particular register to "0" through the conventional clearing, or zeroizing, mechanism while the register dials are connected through intermediate gearing to the back-transfer mechanism. It will be understood that, in most instances, the clearing mechanism of a particular machine will have been designed to clear the respective dials of a register but have not been designed to operate heavier mechanisms, such as the gearing, shafts, and auxiliary registers. Such back-transfer mechanisms are, relatively speaking, rather large, and therefore the setting of such mechanisms through the conventional clearing devices, through inertia alone, throws a very heavy load on the conventional clearing mechanisms, and in many instances, such a heavy load that the clearing mechanism will occasionally fail. In this respect, in the preferred form of my invention, I utilize the conventional selection and digitation mechanisms to effect the interregister transfer. For this purpose I provide a cam on the conventional register dial which is effective to register a "0" or a value of "1" or "2"; a sensing mechanism which senses the dial position of the coordinal cam and is operative to set the coordinal selection mechanism to a like value of "0," "1" or "2"; and means for setting the actuating mechanism to run the proper value of "0," "1" or "2" into the storage, or back-transfer, mechanism in accordance with the value set in the selection mechanism by the sensing means, and then operating the machine through a program of five cycles, the sensing means changing the setting of the selection means between each cycle of operation as may be necessary to transfer any value from "1" to "9" or "0," as required.

An important object of the present invention is to provide a back-transfer mechanism by means of which the transfer is accomplished through the operation of the conventional selection and actuating mechanism, thereby using conventional parts in a conventional manner and affording a mechanism of the type described which does not require modification of existing clearing mechanisms.

Another object of the present invention is to provide a back-transfer mechanism utilizing a value cam associated with a register dial and a sensing mechanism associated therewith for setting the conventional selection gears in a differential position, and operating the machine to control operation of said selection gears to insert a value into the back-transfer, or storage, mechanism without a direct connection between the register dial and the back-transfer, or storage, mechanism and without clearing the value previously in the dial, as will be more fully explained under heading III, entitled "Transfer From Counter To Storage," hereafter.

Thus, the general object of the present invention is to provide a single and relatively simple mechanism which can be used for the various objects heretofore mentioned, including: (1) the transfer of a value standing in either the accumulator (product register) or the counter (quotient register) into a storage mechanism or into the selection mechanism of the machine where it can be used as a factor in a subsequent problem; and (2) to provide a constant factor mechanism which is operable to receive a factor standing in the accumulator or the counter and is thereafter operable to store the value so transferred until, at the will of the operator, it can be set into the selection mechanism and used as a keyboard factor whenever, and as often as, desired by the operator. This mechanism is relatively simple and readily installed in the conventional calculating machine, such as the one disclosed in the patent previously mentioned, and which operates through the conventional selection and actuating mechanisms rather than through a clearing mechanism.

It is contemplated that these features will be associated with a mechanism for automatically aligning the accumulator or counter registers with the selection mechanisms or storage dials, so that a transfer is prevented until the register is first placed in a predetermined ordinal position with respect to the receiving mechanism, the transfer mechanism operating when, and only when, the proper ordinal position has been reached.

The present invention is concerned with these and other objects which will become apparent from a perusal of the description of the preferred embodiment of the invention which is shown in the accompanying drawings, and in which:

FIG. 1 is a plan view of the preferred form of the machine with which my invention can be associated.

FIG. 2 is a longitudinal cross-sectional view of the machine, looking toward the left from a plane lying to the right of the first order of the keyboard, such as taken along the plane indicated by the line 2—2 of FIG. 1, and showing particularly the construction of the selection mechanism, the actuating mechanism and the registering mechanism.

FIG. 3 is a cross-sectional view of the keyboard assembly.

FIG. 4 is a right side view of the keyboard assembly shown in FIG. 3, and shows particularly the mechanism which operates the clearing and keyboard locking mechanisms.

FIG. 5 is a partial plan view, partly in cross-section, of the keyboard assembly shown in FIGS. 3 and 4.

FIG. 6 is a partial right side view of the right side frame plate, such as along the plane indicated by the line 6—6 of FIG. 1, and shows patricularly the drive mechanism and a right side view of the tabulating mechanism.

FIG. 8 is a partial plan view of conventional shifting and clearing mechanisms, with the selection bars removed, such as taken along the plane indicated by the line 8—8 in FIG. 2.

FIG. 9 is a rear view of the machine, with the cover removed, taken on a transverse plane substantially perpendicular to the plane indicated by the line 8—8 of FIG. 2, and obliquely to the base of the machine.

FIG. 10 is a plan view, partly in cross-section, taken on a plane parallel to, and immediately below, the keyboard assembly, such as along the plane indicated by the line 10—10 of FIG. 2, and shows particularly the selection mechanism and certain means for operating it during interregister transfer operations.

FIG. 11 is a left side view of the right-hand control plate, such as taken along the plane indicated by the line 2—2 of FIG. 1, but looking toward the right, and showing particularly a portion of the counter actuating mechanism and one of the control cams for the interregister transfer mechanism of the present invention.

FIG. 12 is a front view of a portion of the counter actuating mechanism, such as taken along the planes indicated by the lines 12—12 of FIG. 11.

FIG. 13 is a right side view of the left-hand control plate, such as taken along the plane indicated by the line 13—13 of FIG. 10, and showing particularly a second portion of the counter actuating mechanism and the drive mechanism for the interregister transfer mechanism of the present invention.

FIG. 14 is a detailed front view of the second portion of the counter actuating mechanism, such as taken along the planes indicated by the lines 14—14 of FIG. 13.

FIG. 15 is a detail of one of the cams used in controlling the programming of an interregister transfer operation, taken along a plane to the left of the left frame plate, as along the planes indicated by lines 15—15 of FIG. 9.

FIG. 16 is an enlarged plan view of the right-hand end of the carriage, and showing particularly the means for sensing values in the accumulator and counter registers.

FIGS. 16A and 16B are enlarged plan views of a second form of the accumulator cam and a development of the counter cam, respectively.

FIG. 17 is a cross-sectional end view of the mechanism shown in FIG. 16, such as taken along the vertical plane indicated by the line 17—17 of FIG. 16.

FIG. 18 is a left side view of the right-hand frame plate, showing particularly the carriage tabulating mechanism, being taken substantially on the same plane as that of FIG. 11, but with the mechanism shown in that figure omitted for purposes of simplification.

FIG. 19 is a rear view of the carriage tabulating mechanism, taken on an oblique transverse plane lying forwardly of, and parallel to, that shown in FIG. 9.

FIG. 20 is a cross-sectional view taken on longitudinally vertical planes at about the fifth order of the keyboard, as indicated by the lines 20—20 of FIG. 10, looking toward the left, and showing particularly the construction of the storage register and the control means for setting a value in the storage register into the selection mechanism.

FIG. 21 is a detail of the control cam and related mechanisms indicated in phantom lines in FIG. 20.

FIG. 22 is a left side view of the mechanism shown in FIG. 20, and is taken on the longitudinal vertical planes indicated by the lines 22—22 of FIG. 10.

FIG. 23 is a detail of the latching mechanism associated with the means for setting a stored value into the selection mechanism shown in FIGS. 20 to 22, but taken on a plane to the left of that shown in FIG. 22.

FIG. 24 is a perspective view of the control key mechanism and immediately related elements of the present invention.

FIG. 25 is a cross-sectional view taken on a longitudinal vertical plane through the interior of the keyboard a short distance inside the right frame plate and looking toward the left.

FIG. 26 is a perspective view from the rear and right-hand side of the machine, showing particularly control mechanisms associated with the present invention and the right end of the cam, or program, control shaft.

FIG. 27 is a perspective view taken from the rear and left-hand side of the machine, showing particularly control mechanisms and the program, or control, shaft of the present invention.

FIG. 28 is a cross-sectional view of the program control clutch, lying immediately to the left of the left-hand control plate, such as taken along the plane indicated by the line 28—28 of FIG. 29.

FIG. 29 is a cross-sectional view, looking from the rear, of the two auxiliary clutches of the present invention, the first operating the keyboard clearing and storage register clearing mechanisms of the present invention, and the second of which is shown in FIG. 28 and controls the operation of the program mechanism.

FIG. 30 is a detail of the driven member of the first auxiliary clutch, such as taken along the plane indicated by the line 30—30 of FIG. 29.

FIG. 31 is a detail of another portion of the driven side of the first auxiliary clutch, such as taken along the plane indicated by the line 31—31 of FIG. 29.

FIG. 32 is a cross-sectional view, on an enlarged scale, of the sensing mechanism in its normal inoperative position, such as taken along the plane indicated by the line 32—32 of FIG. 34.

FIG. 33 is another cross-sectional view of the sensing mechanism, on an enlarged scale, showing the parts in their fully operative condition.

FIG. 34 is a front view of the left-hand end of the sensing mechanism shown in FIGS. 32 and 33.

FIG. 35 is a right-hand view of the cam mechanism which controls operation of the sensing mechanism to sense either the accumulator or counter register.

FIG. 36 is a left-hand view of the mechanism which programs, or counts, the cycles of operation required for the transfer of a value from either the accumulator register or the counter into the storage register, in the preferred form to control five such digitation cycles of operation.

FIG. 37 is an exploded perspective view, taken from the rear and right side, of the carriage tabulating mechanism shown in FIGS. 18 and 19.

I. CONVENTIONAL MECHANISMS

Figure 7:
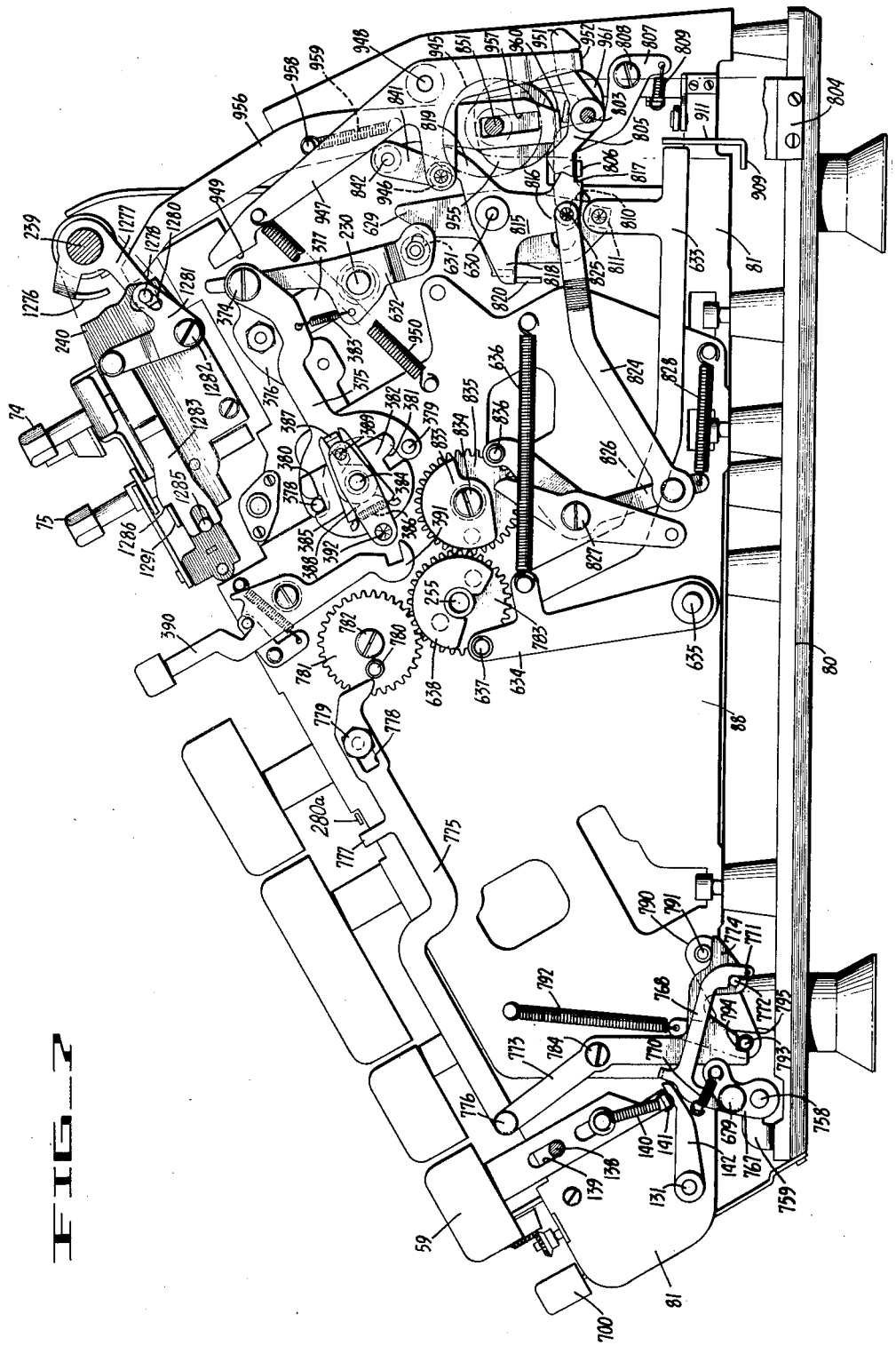
FIG. 7 is a right side view of the machine shown in FIG. 1, with the cover removed, showing mechanisms mounted on the right side auxiliary, or control, plate, such as along the plane indicated by the line 7—7 of FIG. 1.

The present invention is applied, for purposes of exemplification, to a calculating machine of the general type shown and described in the patent to Carl M. F. Friden, No. 2,229,889, issued January 28, 1941. This basic construction, in the preferred form of the present invention, has been modified and improved by the mechanism shown in Patent No. 2,926,846 of myself and another issued March 1, 1960, and relating to the direct automatic tabulation of the carriage with respect to the selection mechanism; and the Patent No. 2,946,505 of Elwood A. Davis, issued July 26, 1960, and relating to the automatic clearing of the registers in any ordinal position thereof; and other patents not here pertinent. However, the invention is not limited to incorporation in that particular machine as it can be incorporated in, or applied to, other calculating machines on the market. It is, therefore, to be understood that the machine shown in the accompanying drawings and described herein is for purposes of exemplification only and that the invention is not limited thereto.

1. General Arrangement (FIGS. 1, 2, and 6 to 9)

It is conventional for calculating machines to comprise a frame, or body portion, A (FIG. 1) upon which is mounted a register carriage B, the latter being ordinally shiftable in either direction with respect to the body portion A. The body portion A is provided with a cover 49 through which project the various keys, such as the value keys 50 and the ordinal clearing, or "0," keys 61 which constitute the main keyboard; and various control keys, such as the plus bar 51, the subtraction key 52, the "ADD," or automatic single cycle, key 53, keyboard lock key 54, automatic tabulation control key 55, left shift key 56, right shift key 57, division key 58, keyboard clear key 59, and register clear key 60. The machine used for exemplification of the present invention also normally includes a multiplication mechanism, including multiplier value keys 65, arranged as a separate keyboard on the lower left-hand corner of the machine, as shown in FIG. 1 and as described in the patents to Friden, Nos. 2,371,752 of March 20, 1945, or 2,399,917 of May 7, 1946, and the associated multiplier control keys, such as multiplier key 66, accumulate multiply key 67, or negative multiply key 68.

The cover 77 of the carriage B contains a plurality of ordinally arranged windows 70, through which are visible the accumulator, or product register, dials 71, and another series of ordinally arranged windows 72 through which are visible the counter, or quotient register, dials 73. In the machine with which my invention is preferably associated, the carriage also carries a pair of manually operated clear knobs 74 and 75 for clearing, or zeroizing, the accumulator and counter register, respectively. Preferably also, the carriage will contain a plurality of ordinally arranged tabulator buttons 76 which control the ordinal position to which the carriage will be automatically shifted in certain operations, some of which will be described hereinafter.

The operating mechanism of the machine is, for the most part, supported upon a main frame which includes a base 80 (FIG. 2), right side frame 81 (FIGS. 6 and 8), a left side frame 82 (FIGS. 2 and 8), and a left side auxiliary frame plate 83. The two side frame plates 81 and 82 are interconnected and braced by a plurality of crossbars 84, 85, 86 and 87 near the rear of the machine. Similarly, the front portion of the machine is braced by a crossbar 91 (FIGS. 2 and 8) which extends between the right frame plate 81 and the left side auxiliary frame plate 83. Most of the operating parts are mounted upon this frame, and particularly upon the side frames 81 and 82. To the right of the right side frame 81 is an auxiliary, or right side control, plate 88 (FIG. 7) upon which are mounted most of the control keys and their related mechanisms which are found on the right side of the machine. Similarly, to the left of the left frame plate 82 is an auxiliary, or left side control plate 89 (FIG. 9), and an intermediate plate, or bracket, 90 lying between frame plate 82 and auxiliary plate 89, upon which plates are mounted most of the control keys and control mechanisms related to the multiplying mechanism, as well as some of the parts utilized in the present invention.

It should be mentioned that, for the sake of brevity, many mechanisms which are conventional in machines of this kind, such as the multiplying mechanism, the division mechanism, and the like, which are not pertinent to the mechanisms of the present invention, are not described herein. Those parts which are conventional and which are indirectly related to the operation of this machine will be described as briefly as possible; while those mechanisms which are directly related to the operation of my invention, will be described more in detail. It will be understood, therefore, that I assume that my invention will be associated with a fully automatic calculating machine which has conventional features, such as those mentioned, but that, for the sake of brevity, I will limit my description of conventional elements to those which directly or indirectly relate to the operation of my machine or those mechanisms which must be modified in their operation in order to provide for the most satisfactory operation of the mechanism of my invention.

2. *Keyboard (FIGS. 2, 3, 4 and 5)*

The value keys 50 and "0" keys 61 are arranged in longitudinally extending ordinal rows and in transversely extending value banks, as shown in FIG. 1. The keyboard, in the preferred form of the machine, comprises a subassembly in which the keys are mounted in a keyboard frame 95, comprising top and bottom plates 96 and 97, respectively, side frames 98 and 99 and front and rear plates 100 and 101, respectively (FIGS. 3 to 5). This keyboard frame is held together as a rigid subassembly by means of interlocking the side and end plates with the top and bottom plates, the assembly being held together by suitable tie bolts 102. In my preferred form of keyboard, the various control means related to the keyboard, such as the keyboard clearing mechanism and the keyboard locking mechanism, are contained within the keyboard frame 95. Such mechanisms are operated by parts contained in the main frame which engage operating elements of the keyboard mechanisms, but which do not require the connecting of one to the other. It is conventional to secure the keyboard frame 95 in the machine by resting the rear plate 101 thereof upon the cross-member 84 and bolting the front portion to the main frame A by means of the tie rod 103 inserted through apertures in ears extending from the front of the keyboard frame plates 98 and 99, and bolted in the left auxiliary and right side frame plates 83 and 81, respectively.

The value keys 50 comprise a key top, or button, 105 and a key stem 106. The key stems are slidably supported in aligned slots in the top and bottom frame plates 96 and 97, and are biased to a raised position by suitable springs 107 which surround the upper portion of the key stem and are seated between the top plate 96 and the bottom of the key top. A manually operated, or depressed, key stem 106 is latched in its operative position by a conventional latching means which can comprise a latching slide 108 associated with each order of the keyboard. In the conventional machine shown, the latching slides 108 are provided with a plurality of apertures 109 through which the coordinal key stems extend, the latching slide being biased to a forward position by a suitable spring, such as leaf spring 113. Each key stem is provided with a rearwardly extending cam nose 110, above which is located a latching notch 111. The depression of a key 50 will cause the cam nose 110 on the key stem to force the latching slide 108 rearwardly against the bias of its spring until the key stem has been depressed sufficiently to cause the notch 111 to register with the latching slide, whereupon the latch snaps to its forward position to hold the key stem depressed. Whenever a latching slide is moved rearwardly by the depression of another key in that order, or by the operation of any of the keyboard clearing means, the slide 108 releases the notch 111, whereupon the key stem is snapped to its raised position by the force of its biasing spring 107.

The lower end of each key stem 106 carries a stud, or pin, 112 which engages a differentially angled cam face 212 of one or the other of a pair of selection, or V-notch, bars 210 and 211, as shown in FIG. 2. It is conventional in the machine with which my invention is embodied, to provide a pair of selection bars 210 and 211. In this invention, the former bar 210 serves the "1" to "4" keys of that order and the latter bar the "5" to "9" keys. These selection bars are supported on rockable supporting arms 214 and 215, and are biased to a rearward, inoperative, position by a suitable spring, such as spring 218. It is obvious that the depression of a value key 50 causes the pin 112 on the lower end of its key stem to engage the corresponding cam face 212 and, due to the differential angularity of the respective cam faces 212, to translate the selection bar 210 or 211 forwardly a differential amount. In view of the fact that the depressed key is latched in its operative, or fully depressed, position, the corresponding selection bar 210 or 211 is latched forwardly in its differential position by the engagement of the pin 112 with a latching notch 213 at the lower end of the cam face, which latching notch closely embraces the pin 112.

3. *Keyboard Clearing (FIGS. 4 and 5)*

It has heretofore been noted that the various keys 50 are latched in a depressed position by means of the latching slide 108 engaging a notch 111 in the operated key stem 106. It has also been noted that a depressed key can be released by operating another key in the same order, as the depression of the second key, through its cam nose 110, moves the slide 108 rearwardly to its releasing position. A latched key can also be released by depression of the "0" key 61 of the same order, the "0" key having a cam face similar to nose 110 on key stems 106. A "0" key 61, however, has no notch similar to notch 111, so the key can not be latched in its depressed position. All of the keys of the keyboard can also be released by operation of a keyboard clear mechanism which can be operated by manual depression of the keyboard clear key 59, or automatically through certain mechanisms to be hereafter described.

This clearing mechanism comprises a transverse shaft 120 (FIGS. 3 to 5) rotatably journalled in the keyboard frame side plates 98 and 99. In each order the shaft 120 carries an arm 121 rigidly mounted on the shaft 120 and extending downwardly to engage a slot 122 in the co-ordinal latching slide 108. The rocking of the shaft 120 (counter-clockwise in FIGS. 3, 4 and 5), through the engagement of the arms 121 with the rear edge of the slots 122, forces all of the latching slides 108 rearwardly against the force of their spring 113. Incidentally, the force of spring 113 is sufficient, not only to push all of the slides 108 forwardly, but also to maintain the shaft 120 and arms 121 in the clockwise position shown in FIG. 3. On the right-hand end of shaft 120, on the outside face of the right side plate 99, the shaft 120 carries an arm 123 rigidly mounted thereon. A linkage, mounted in the frame and operated by the clear key 59, may be used to rock the arm 123 and therefore the keyboard clearing mechanism just described. Any suitable form of linkage may be used, but for purposes of illustration, I show a link 126 (FIGS. 4 and 5) slidably mounted by suitable pin-and-slot connections including slots 128 in the link engaging pins 129 carried by the frame plate 81. The link 126 is provided with a pin 127 on its rear end, which pin engages a shoulder 124 on the arm 123. The link is resiliently maintained in its forward inoperative position by means of a spring 130 tensioned between a keyboard clearing shaft 131 and a stud 132 on latch arm 133. The latch arm 133 is pivotally mounted on a transverse shaft 134 (not otherwise used in the present invention), and is operative to latch bail 1494 in its operative position, which bail will be described hereafter under the heading "V. Transfer From Storage To Selection." This latch has to be released by the keyboard release mechanism and hence serves two purposes: (1) to latch bail 1494, and (2) in the present instance, biasing the link 126 to its forward, inoperative position. It is seen that the forward edge of latch arm 133 bears against a pin 135 riveted on the link 126. Thus, the spring 130 indirectly biases the link 126 to its forward, inoperative position.

The clearing link 126 is translated rearwardly to operate the keyboard clearing shaft 120 and arms 121 by the rocking of shaft 131. This shaft carries an arm 136 rigidly mounted thereon, which arm carries a roller 137 at its outer end. The roller 137 engages the forward end of link 126, so that the rocking of shaft 131 (clockwise when viewed from the right as in FIG. 3) forces the link to the rear (right in this figure) and clears the keyboard.

The shaft 131 can be rocked to its operative position by an automatic mechanism described under the heading "II. Transfer From Accumulator To Storage." It can also be rocked manually by depression of the keyboard clear key 59, as shown particularly in FIG. 7. The key 59 is slidably mounted on the right side frame 81 by conventional pin-and-slot mountings 138, 139 and is biased to a raised position by a conventional spring 140 tensioned between one of the pins 138 and an ear 141 on the lower end of the key stem. The ear 141 engages the rear end of an arm 142 pinned on, or otherwise rigidly secured to, the right end of shaft 131. Thus, the depression of the keyboard clear key 59, through the rocking of the arm 142, shaft 131, and arm 136, translates the link 126 rearwardly.

4. *Keyboard Lock (FIGS. 3, 4 and 5)*

The keyboard 95 is provided with a keyboard locking mechanism of somewhat novel arrangement. It comprises a transverse shaft 185 journalled in the side frames 98 and 99 of the keyboard frame. A number of arms 186 are pinned to, or otherwise rigidly mounted on, the shaft 185—in my preferred form there being one such arm for every pair of orders of the keyboard. In a normal, unblocking position of the parts, the arms 186 assume the unblocking, or raised, position shown in FIG. 3. These arms, upon counter-clockwise rotation of shaft 185, drop down to engage ears 187 formed on each locking slide 108, as shown in FIGS. 3 and 5. By placing the ears on alternate sides of the locking slides 108, as shown in FIG. 5, one arm 186 can block a pair of latching slides, as shown in this figure. It is obvious that if the shaft 185 and arms 186 are rocked to their blocking position (counter-clockwise from the position shown in FIG. 3), the end of the arm will lie behind the ears 187, thereby preventing rearward movement of the latching slides. When this rearward movement of the latching slides is blocked, the keys are locked against movement or release, for the locking slides 108 themselves are locked against movement. Thus, a value in the keyboard cannot be changed nor can a value be inserted in the keyboard.

The shaft 185 is provided, on the right side of the keyboard frame plate 99, with an arm 188 (FIG. 4) pinned to, or otherwise rigidly mounted on, the shaft. The upper end of the arm 188 carries a long pin 189 which supports the rear end of a slide, or link, 190. An intermediate portion of the link 190 is provided with a slot 191 which embraces a flat-headed screw 192 mounted in the frame plate 99 to hold the link 190 in its proper position. The lower end of the link carries a pin 193 which will be engaged by an arm 1451 of the back-transfer mechanism, hereinafter to be described in Section II. The engagement of pin 193 by this arm 1451 forces the link 190 forwardly (to the left in FIG. 4), thereby rocking arm 188 and shaft 185 counter-clockwise to the keyboard locking position. Normally, the link 190 is held in its rearward position by means of a spring 194, which biases the keyboard locking mechanism to its inoperative position.

The keyboard can also be locked, at the will of the operator, by means of a keyboard locking key 54 shown in FIGS. 4 and 5. This key is formed as a lever, and is pivotally mounted on a long pin 200 supported by the right-hand frame plate. It is detented in either its normal position, shown in FIGS. 1, 4 and 5, or in a forward position, by a detent not here shown. A forwardly extending link 201 is pinned to the key 54, as by pin 203, which link is provided with a vertically extending shoulder 202 adapted to engage the long pin 189 which connects the link 190 to the arm 188. Thus, movement of the key 54 to its forward position (counter-clockwise in FIG. 4) translates link 201 forwardly and rocks the keyboard locking mechanism to its locking position.

5. *Selection Mechanism (FIGS. 2 and 10)*

It has been mentioned that the lower end of each key stem 106 carries a transversely extending pin 112. This pin is adapted to engage a differentially angled cam face 212 formed in one or the other of the selection, or V-notch, bars 210 or 211. It is conventional in the machine with which my invention is shown, to provide a pair of selection bars 210 and 211 for each order of the keyboard, in the present invention, in the present instance the former serving the "1" to "4" keys of that order and the latter the "5" to "9" keys. The pair of bars is preferred to a single one in order to avoid excessive angles on the cam faces 212 which are necessary when these faces represent nine different values. Each of the cam faces 212 terminates in a notch, or pocket, 213 which tightly embraces the corresponding pin 112 when the key is depressed to its locked position, so that the slide 210 or 211 is locked in a differential position by the depression of a key. The bars 210 and 211 are supported for longitudinal movement in the machine by a pair of supporting arms 214 and 215, and are biased to a rearward, inoperative, position by a suitable spring 218 conventionally tensioned between each slide and its forward supporting arm 214. It is obvious that the depression of a value key causes the pin 112 on its key stem to engage the corresponding cam face 212, and, due to the differential angularity of the respective cam faces, to translate the selection bar 210 or 211 forwardly a differential amount.

The selection bars 210 differ from those shown in earlier machines in that they serve the "1" to "4" keys, while the other selection bars 211 serve the "5" to "9" keys, inclusive. The present arrangement also differs from conventional selection bars due to the fact that there is a double increment, or double increase in angularity, between the notches cooperating with the "1" and "2" keys, as compared to the others. Thus, there is a double increment of movement of the selection bar 210 between the "1" and the "2" keys, as compared to a single increment between all of the others.

The selection bars 210 and 211 extend rearwardly (to the right in FIG. 2) and are provided at their rearward extremities with perpendicularly formed yokes 216 and 217, respectively. These yokes engage in annular slots formed in the collars of a pair of selection gears 220 and 221, respectively, the gears being slidably but nonrotatably mounted on longitudinally extending selection, or "square," shafts 222. The square shafts 222 are journalled in the crossframe members, or crossbars, 84, 86 and 87, there being one such square shaft for each order of the keyboard. These selection gears 220 and 221 can be arranged on their square shaft in the conventional manner, but I have found that it is preferable to arrange them as shown in FIG. 2. In the preferred form of construction, the gear 221 of the odd numbered orders of the keyboard is placed toward the rear of the front section of the square shaft immediately in front of the crossbar 86, as is best shown in FIG. 10. This gear is transposed forwardly on the square shaft from one to five increments corresponding to values of "5" to "9," inclusive. The gear 220 is placed forwardly thereof, normally lying in a neutral position and transposable forwardly one increment for a value of "1," and then three to five increments for values of "2" to "4," inclusive. In the next higher order, the relative position of the selection gears is reversed, the "1" to "4" gear 220a lying at an intermediate position of its square shaft, while the "5" to "9" gear 221a lies forwardly thereof. All of these gears are moved forwardly differential amounts corresponding to the value of the key depressed, with the exception of the double increment between the "1" and "2" keys heretofore mentioned. Thus, the depression of a value key, by translating one or the other of the selection bars 210 or 211, moves the corresponding selection gear 220 or 221 forwardly on square shaft 222 a differential amount corresponding to the value of the key operated.

The rear end of square shaft 222 carries a digitation control spool 225 (FIG. 2) slidably but nonrotatably mounted thereon. The forward end of the spool carries an addition gear 226 and the rear end carries a subtraction gear 227, the spool and the two gears forming an integral assembly. The two gears 226 and 227 are adapted to register with the ordinally related accumulator gear 235 when the spool 225 is displaced from its central, or neutral, position shown. The spools 225 are moved in unison to either operative position by means of a gate 228 extending transversely across the machine and lying between the two integral gears 226 and 227. The gate 228 is preferably mounted on a pair of arms 229 which are rigidly secured to a digitation control shaft 230. Normally, the assembly comprising the shaft 230 and gate 228 is held in the intermediate, or neutral, position shown by means of a centralizer conventional in the art, but not shown herein. However, various controls, some of which will be mentioned hereafter, are effective to rock the shaft 230 and consequently displace the digitation control spools 225 forwardly or rearwardly as the operation demands, thereby operatively connecting the accumulator gears 235 to either the plus gears 226 or the minus gears 227, and thus driving the accumulator gear 235 incremental amounts in either sign character direction by means of a differential rotation of the selection gears 220 and 221.

6. Accumulator Register (FIGS. 2 and 13)

An accumulator register, containing a series of ordinally arranged register dials 71, is mounted in the shiftable carriage B. In the machine shown in FIG. 1, the accumulator register contains twenty such dials 71 for a selection mechanism of ten orders. The various ordinal assemblies in the register comprise the dial 71 and the accumulator gear 235, both of which are mounted upon a common dial shaft 236. Preferably, the dial shaft is journalled in a hollow frame bar 237 which forms one of the major frame members of the carriage B. The differential rotation of the square shaft 222, caused by the longitudinal translation of the selection gears 220 or 221 and the rotation of the corresponding actuators 250 or 251, is, upon rocking of the gate 228 from the neutral position shown, effective to rotate the dials 71 additively or subtractively.

It can be mentioned at this point that the carriage frame B comprises, in addition to the hollow frame bar 237, a front carriage rail 238 (FIG. 13) and a rear carriage bar 239, which also extends longitudinally of the carriage or transversely of the machine. These three members: the front rail 238, the hollow frame bar 237 and the rear bar 239, are tied together into a rigid carriage by means of end pieces 240 (see also FIGS. 7 and 9). The carriage is laterally shiftable, the front rail riding on rollers 241 mounted on the crossbar 85, and the rear bar 239 sliding in bearings carried by the frame plates 81 and 82.

It can also be mentioned at this point that the register dial 71 can be returned to a "0" position by any suitable clearing, or zeroizing, mechanism. That shown in this embodiment is the one normally found in machines of this type, as illustrated in Patent No. 2,229,889, above-mentioned. This mechanism comprises a mutilated gear 242 mounted on each accumulator dial shaft 236. These mutilated gears are engaged by a clearing rack 243 of conventional construction. Longitudinal movement of the rack engages the mutilated gears and returns the dial assemblies to their "0" position, as is well-known in the art. The means for operating the clearing racks 243 will be described under the heading of "Register Clearing."

It can also be mentioned at this point that there is a tens-transfer mechanism between the various orders of the register, but as this mechanism has no relation to the present invention, it will not be described, reference being made to the above-mentioned patent to Friden No. 2,229,889 for a detailed description of this mechanism.

7. Actuating Mechanism (FIG. 2)

The actuating mechanism of the machine shown is of the well-known Thomas-type, modified slightly as to tooth arrangement, as will hereinafter be specifically mentioned in detail. This type of actuating mechanism comprises a number of stepped drums 250 and 251 arranged transversely of the machine. These drums are mounted on parallel shafts 252 parallel to the square, or selection gear, shafts 222. It is conventional in the Friden machine which is used to exemplify this invention, to provide one actuator shaft 252 for each pair of square shafts 222, and to mount two drums 250 and 251 on each one of these shafts 252—one of the drums to serve the order to the right of the actuator shaft 252 and the other to serve the order to the left. These actuator drums are provided with differentially stepped teeth, so that forward translation of either of the selection gears 220 or 221 causes that gear to lie in the path of travel of a number of teeth on the associated actuator drum corresponding to the value key 50 depressed. It is conventional in the machine of the Friden patents previously mentioned, to use two identical drums on each drive shaft 252 and to divide each drum so that one portion will serve the "1" to "5" keys and the other the "6" to "9" keys, and conventionally both drums are provided with the "1" to "5" section of the forward part of the drum. In the present invention it is preferred to modify these drums so that one will serve "1" to "4" keys, with a blank space between the one-tooth segment and the two-tooth segments, as is clearly shown on the right-hand section of drum 250 or the left-hand section of drum 251, the other segments lying closely adjacent each other as is conventional. This construction is provided to clearly differentiate between a value of "1" and a value of "2" in the selection mechanism. This is desirable in the present invention because during a back-transfer operation, the selection slides are shifted from a value of "2" to a value of "1" between successive cycles of operation. It has been found preferable to require a double step, or increment, between the values of "1" and "2" in order to avoid difficulties which might arise from bounce of the parts or from construction to conventional tolerances. Thus, the gear 220a serving the "1" to "4" keys of the second order, shown on the left in FIG. 2, will be moved forwardly one increment for a value of "1," three increments for a value of "2," four increments for a value of "3" and five increments for a value of "4." However, the gear 221a serving the "5" to "9" keys will be moved forwardly in single increments, as is conventional in the art. It will also be noted by reference to FIG. 2 that it is preferable to rearrange the segments in the drums 250 and 251—the drum 250 having the "1" to "4" portion at the rear and the "5" to "9" portion at the front, while the drum 251 has the "1" to "4" portion at the front and the "5" to "9" portion at the rear. This change is not important insofar as the theory of operation is concerned, but it is desirable in order to afford a slight saving of space.

The actuator shafts 252 are driven through miter gears 253 thereon, each of which meshes with a corresponding miter gear 254 on the main drive shaft 255, as is best shown in FIG. 8. The main drive shaft 255 is given a complete cycle of rotation with each machine cycle, thereby rotating the actuators 250 and 251 a complete revolution in each machine cycle and consequently giving the selection gears 220 or 221 and square shafts 222 increments of motion depending upon the longitudinal position of the selection gears on their respective square shafts.

It can be mentioned that it is conventional in machines of this kind, to provide a Geneva stop for each square shaft 238, so angularly disposed on the square shaft as to positively stop rotation thereof at the termination of the digitation phase of a cycle of operation. It is also customary in these machines to start the ordinal digitation operation of the values differentially, in an inverse order, and to stop digitation of all values in an order, simultaneously. Thus, a single Geneva wheel and Geneva block will afford a positive stopping action of the square shafts 222, and consequently the register dials 71, at the end of each digitation phase. For this purpose it is conventional in machines of this kind to provide the actuator shaft 252 with a Geneva wheel 256 and to provide a Geneva block 257 on each square shaft 222.

8. Drive Mechanism and Clutch (FIG. 6)

Various mechanism of the machine, including the actuator shafts 252 just described, are given cycles of operation as required by means of a conventional electric motor, not shown. The armature of the motor is conventionally connected to a short shaft 265 by a conventional flexible coupling, not shown. The shaft 265, as shown in FIG. 6, extends through the frame plate 81 and at its outer end, carries a small pinion 266 secured thereto. The pinion 266 meshes with a larger idler 267, the latter gear being rotatably mounted on a transverse stub shaft 268. The idler, in turn, meshes with a larger gear 269 which is rotatably mounted on the drive shaft 255. The gear 269 forms the driving side of a conventional clutch 270, the driven plate 271 of which is rigidly secured to the drive shaft 255. The operation of the clutch is controlled by a clutch dog 272 which is pivotally mounted on the clutch plate 271 and is resiliently biased into engagement with a ratchet 273 formed integrally with the driving gear 269. The operation of the clutch dog 272 is controlled by a clutch pawl 274 which is pivotally mounted on the frame plate 81 by any suitable means, such as stud 275. Whenever the clutch pawl 274 is rocked (clockwise in FIG. 6), it releases the clutch dog 272, which is then spring-biased into engagement with the ratchet 273 to cause engagement of the clutch. Preferably, the clutch is provided wtih a full-cycle control of conventional construction.

In the conventional machine with which my invention is preferably associated, the clutch pawl 274 is operated by a link 280, the rear end of which is pivotally connected to the upper end of the clutch pawl. The forward end of the link is pivotally mounted on the upper end of a two-armed lever 281, which is pivotally mounted on the frame plate by any suitable means, such as stud 282. A long pin 283 is riveted on, or otherwise rigidly secured to, the lower end of the lever 281 and extends through an aperture in the frame plate in order to support the forward end of a long switch control link 284. The rear end of the long link 284 cooperates with a suitable switch, such as a conventional Micro-Switch 291 shown in phantom in FIG. 9, to control the flow of power to the motor, not shown. By this construction, the clutch pawl 274 and the switch control link 284 are operated in unison to simultaneously engage the clutch and close the power switch to the motor.

The clutch pawl is resiliently held in its clutch-disengaging position shown, and the switch link in its open position, by any suitable means, such as spring 285 tensioned between a stud on the frame plate and an ear on a control link 286. This link 286 is pivotally mounted on a pivot pin 287 which interconnects the clutch link 280 and the switch lever 281 previously mentioned. The forward end of the link 286 is provided with a notch 292 which engages a pin 288 positionable by the "ADD" key mechanism. The "ADD" key mechanism is not pertinent to the present invention, and so will not be described; but it should be mentioned that the link 286 can be lifted by pin 288 in the latter portion of each cycle of operation by this "ADD" key mechanism, and thereby release the clutch pawl 274 and switch link 284 from control of pin 289. Both the clutch pawl 274 and the switch link 284 can be operated by various mechanisms, such as the pin 289 engaging a slot 290 in the lower edge of the link 286, as is conventional in the machine of the patents above-mentioned. The pin 289 is carried by a slide, not shown, operated by the plus and minus keys 51 or 52; but as this mechanism is not pertinent to the present invention, it will not be described.

9. Counter Register (FIGS. 2 and 11)

The carriage B also contains a counter, or quotient register, comprising the dials 73. As shown in FIG. 1, it is conventional to provide a series of ordinally arranged counter dials 73 containing a number of dials approximately half that of the accumulator register—in the macihne shown in FIG. 1, eleven such counter dials 73 are utilized as compared to twenty accumulator dials 71. This number of dials is selected to provide one more than the orders of the selection and actuating mechanisms, and one more than the ordinal positions of the carriage B so as to provide an overflow dial in the event that ten or more cycles of operation are performed with the carriage in its extreme right-hand position. The counter dials 73 are rigidly mounted on ordinally arranged and longitudinaly extending shafts 300, as best shown in FIG. 11. The rear ends of the counter shafts 300 are journalled in bearings in the carriage frame member 237, and the forward ends of which are journalled in bearings formed in the front carriage rail 238. Each counter dial assembly also includes a feed gear 301 and an integral tens-transfer control plate 302 formed as a spool and rigidly mounted on the shaft 300; and a conventional mutilated clearing gear 308. The clearing gears are engaged by a clearing rack 309, which may be of the conventional style disclosed in the Friden patents previously mentioned, so that longitudinal translation of the rack returns all the counter dials to "0."

A counter actuator 303 is mounted on a shaft 304, which shaft is given an oscillatory, or rocking, motion in a plane perpendicular to the axis of the shaft 304 and also a longitudinal translation parallel to the axis of the shaft with each cycle of operation. Thus, in each cycle of operation, a counting finger 305 of the actuator 303 of the lowest, or units, order of the actuating mechanism, will mesh with the ordinally aligned gear 301 and then be translated in one direction or the other to give the gear a single increment of motion, and thus enter a count of "1" into the dial 73 aligned with the units order of the actuating mechanism. The operation of the counter actuator and its ability to effect the necessary tens-transfer will be described in the next subsection.

In the present invention, the counter gear 301 and the tens-transfer control disk 302 are modified by the addition of a second gear 307 formed integrally on the spool which contains gear 301 and disk 302, located against the disk 302 and forwardly of the conventional counter gear 301 and the counter finger 305. It can be mentioned at this point that in a back-transfer operation from the counter, the counter actuator shaft 304 is rocked forwardly (clockwise when viewed from the left as in FIG. 11). In this condition, the counter actuator finger 305 of each order of the counting mechanism will engage its respective gear 307, thereby entering a count of "1" in each order of the counter in each cycle of the back transfer operation. The reason and the mechanics for this operation will be described under the section entitled "Transfer From Counter To Storage" hereafter, but for the moment it should be noted that the conventional counter mechanism of the Friden patents mentioned has been modified by the addition of this auxiliary, or second, gear 307, which preferably is formed integrally with the gear 301 and disk 302.

10. *Counter Actuator* (*FIGS. 11 to 14*)

It has been mentioned that the actuator assembly 303 is given both reciprocal and oscillatory movement in order to enter a count of "1" into the counter dial aligned with the units order of the keyboard. The actuator assembly, as is shown particularly in FIG. 11, is mounted on a shaft 304 which is given the necessary movement in timed sequence to provide for the reciprocating and oscillating movement of the counter actuator. The actuator comprises a series of ordinally arranged spools 315 loosely mounted on the shaft, but held against longitudinal displacement thereon by a pair of collars 316 which are pinned to, or otherwise rigidly secured on, the counter shaft at the ends thereof. Each spool is provided with the counter finger 305, previously mentioned, mounted on the left end thereof; and each (except the one in the lowest order) carries a tens-transfer finger 306 on the right end thereof. A bar 317 is mounted in rearwardly extending arms 318 of the collars. It is thus obvious that the bar 317 moves with the shaft 304, the shaft, collars, and bar, forming a unitary assembly. A spring 319 is tensioned between the bar 317 and a spring seat formed in each counter finger 305. Thus, the rocking of the shaft 304 resiliently biases the counter spool 315 (clockwise in FIG. 2, or counter-clockwise in FIG. 11) to rock the finger toward engagement with the corresponding counter gear 301.

Tens-transfers are effected into the counter by means of the auxiliary fingers 306, each of which is bent to engage the counting finger 305 of the adjacent lower order spool 315. If the auxiliary finger 306 enters a single slot 310 in the tens-transfer control plate 302 of the adjacent lower order (as it does when a tens-transfer is to be effected), that spool is permitted to rock counter-clockwise from the force of its spring 319, whereupon the counter finger of the spool in question will engage its aligned gear 301. However, if the auxiliary finger 306 engages the plate 302 rather than the notch 310, then further rocking is blocked and counting cannot take place in the next higher order, as the counting finger 305 of the higher order is prevented from engaging its gear 301. A more detailed description of this mechanism will be found in the Patent No. 2,229,889 previously mentioned.

The mechanism for longitudinally translating the shaft 304 is shown particularly in FIGS. 10, 13 and 14. An auxiliary shaft 325 is journalled in the crossbars 84 and 86, being driven by a pair of miter gears, gear 326 on the shaft 325 and gear 327 on the main drive shaft 255. A cam 328 is pinned to, or otherwise rigidly mounted on, the auxiliary shaft 325. The periphery of this cam is embraced by a pair of fingers 330 formed in the lower arm of a bellcrank 329 which is pivotally mounted on a stud 332 extending from a bracket 333 mounted on the left-hand frame plate 82. The cam 328 and the fingers 330 of the bellcrank 329 are embraced within the flanges 334 and 335 immediately adjacent the cam 328, so that the cam follower 329 will be held in engagement with the cam. A compression spring 331, mounted on the left end of shaft 304 and seated against the side frame 82 and the inner flange of a flanged collar 336, strongly biases the shaft 304 to the left, while the upper end of bellcrank 329 lies between the two flanges of that collar. Thus, the lobe of the cam 328 first holds the bellcrank stationary; then rocks the bellcrank 329 (first counter-clockwise in FIG. 14) to move the shaft 304 to the left; and then, after a considerable dwell, it is rocked in the other direction to push the shaft 304 to the right against the force of spring 331. The reciprocation of shaft 304 occurs at the same point in each cycle, regardless of whether the counter is operating additively or subtractively.

The mechanism for oscillating the shaft 304 on its axis is best shown in FIGS. 11 and 12. It should be noted that the counter of the preferred form of my invention is operable additively or subtractively and that the difference between the two operations lies only in the timing of oscillation, or rocking, of shaft 304 with respect to its longitudinal, or axial reciprocation. In addition, the shaft is first rocked rearwardly (counter-clockwise in FIG. 11) to cause counter finger 305 to engage its gear 301, then shifted to the left, then rocked (clockwise in FIG. 11) to disengage the counting finger 305 from its dial gear, and then the shaft returned to its normal position at the end of the cycle. In subtraction, the shaft 304 is first shifted to the left, then rocked rearwardly (counter-clockwise in FIG. 11) to cause the counter finger 305 to engage the teeth of its associated gear, then the shaft is shifted to the right to enter the count subtractively into the counter gear, and finally, the shaft is rocked forwardly (counter-clockwise in FIG. 2) to disengage the counter fingers 305 from the gears. It has been mentioned that the reciprocation, or longitudinal translation, of the shaft 304 occurs at the same points of the cycle, so that the difference between additive and subtractive operation lies in the timing of the rocking movement of the shaft with respect to this fixed translation of the shaft. The means for oscillating the shaft, as well as changing the timing of these oscillations, is shown in FIG. 11.

A square motion cam 340 is mounted on the drive shaft 255 immediately to the left of the right frame plate 81. This cam 340 is formed with an integral circular collar 341. The cam follower comprises a member 342 with an enlarged slot 343 formed in the forward end thereof. The periphery of cam 340 engages the edges of this slot to provide reciprocal movement to the follower member 342. This movement of the follower member 342 is confined to a direct linear motion by means of a plate 344 riveted to, or otherwise secured on, the follower member 342. This plate is provided with a longitudinally extending slot 345 which embraces the top and bottom of the collar 341, but is elongated to provide for the necessary longitudinal movement of the member 342. This construction provides for a true linear reciprocation of the follower member 342.

Rearwardly of the shaft 255, the follower member 342 is provided with an elongated slot 346 which embraces a pin 396 of the counter control mechanism to be described in the next subsection. The rearwardly extending portion of the member 342 is also provided with a rearwardly facing shoulder 347 and a forwardly extending hook 348. Associated with the rear end of the follower member 342 is a rocking member 355, rotatably mounted on the counter control shaft 384. This rocking member is provided with two pins, or studs, 356 and 357 adapted to cooperate with the shoulder 347 and hook 348, respectively. The stud 357 is located adjacent the top of the member 355 and is designed to be engaged by the hook 348 whenever the rear end of the follower is elevated, as by means of pin 396 which is embraced within slot 346 and is positioned by the counter control mechanism to be discussed in the next subsection. Conversely, the stud 356 is designed to be engaged by the shoulder 347 when the rear end of the follower 342 is depressed by the same counter control mechanism. Normally, in the neutral, or inoperative, position of the counter control mechanism, the pin 396, and consequently the follower 342, lie in the position shown, in which neither the shoulder 347 nor the hook 348 will engage their respective pins during the linear translation of the follower. The rocking member 355 is biased to the inoperative position shown by a strong spring 358, one end of which is seated in an aperture in an ear 359 on the rocking member and the other end of which is seated in an ear 367 of the adjacent member 365. The rocking member 355 is prevented from overthrow by the spring 358 by any suitable means, such as by engagement of the member 355 with the ear 367.

It will be obvious that the rocking member 355 will be rocked (in a clockwise direction when viewed from the left as in FIG. 11) by both the hook 348 or the shoulder 347. The only difference will be the point in the cycle at which the rocking takes place. The mechanism shown in FIG. 11 is in its full-cycle position, the drive shaft 255 rotating in a counter-clockwise direction in this figure. Thus, at the start of a cycle of operation the follower moves forwardly, to the right in this figure. If the counter is set for additive registration by the elevation of stud, or pin, 396, the hook 348 will engage the pin 357 at approximately the 30° point of the cycle and will have reached its extreme forward limit at about the 60° point, thereby rocking the counter finger 305 into engagement with its gear by this time. The follower 342 remains stationary for approximately 100° and then is moved rearwardly by the cam 340, whereupon the rocker 355 is rocked by its spring 358 to return the counter actuator to normal position. If the counter is set for subtractive operation by the depression of the pin 396, then the follower 342 moves forwardly away from pin 356 in the first 60° of the cycle, remains in the forward position until about the 160° position, and then starts to move rearwardly. The shoulder 347 then picks up the pin 356 at about the 190° position and within about the next 30° rocks the member 355 to its extreme position to cause the engagement of tooth 305 with its associated gear. In the dwell between the 60° and 160° positions the actuator shaft is shifted toward the left, from which it is returned to the right, starting at about the 260° position. At the end of the cycle, in approximately the last 30°, the follower arm is moved forwardly to the neutral position shown in FIG. 11.

Adjacent the rocking member 355 on the shaft 384, is an arm 365, likewise pivotally mounted on the shaft 384. The lower end of this arm is formed into ear 367, which is connected by spring 358 to rocking member 355, and by means of a spring 366 to the crossbar 84, whereby the lever 365 is resiliently rocked with the rocking of member 355 and both are normally held in the neutral position shown. The upper end of the arm 365 is provided with a pin 368 which is embraced within a slot 369 formed in an arm 370, pinned to, or otherwise secured on, the right end of right-hand collar 316 fastened to the shaft 304. Thus, the rocking of the rocking member 355 resiliently rocks the shaft 304 and consequently the counter spools 315.

11. *Counter Control (FIGS. 7, 10 and 12)*

It is conventional in the machine with which the present invention is preferably associated, to provide means for operating the counter additively or subtractively, and to control that setting to a sign character to be either identical with, or opposite to, the sign character of registrations in the accumulator register dials 71. It is conventional in this machine to provide a Y-shaped counter control link 375 (FIG. 7) which is effective to control the counter actuator to like or unlike registration. The read end of this link is pivotally mounted, as by pin 374, on the conventional digitation control, or plus-minus, link 376, which, in turn, is supported on an arm 377 fixed to the digitation control shaft 230. The link 375 is thus translated forwardly or rearwardly with the rocking of the shaft 230. The diverging arms on the forward end of the link 375 are provided with a pair of pins 378 and 379 which are adapted to register in corresponding slots 380 and 381 of a butterfly plate, or disk, 382. The control link is resiliently biased to cause the upper pin 378 to be seated in the upper slot 380 by any suitable means, such as spring 383, and thereby provided like sign registration in the counter and the accumulator. However, the pin 379 can be engaged in the lower slot 381, thereupon disengaging pin 378 from slot 380 to provide unlike registration in the counter, by means not shown because not pertinent to the present invention. The disk 382 is pivotally mounted on a control shaft 384. Adjacent the disk are a pair of scissors-type centralizing levers 385, both of which are pivotally mounted on the shaft 384. The two arms are resiliently biased to their retracted position by a suitable spring 386 tensioned between the forward arms of the two levers, thereby embracing an ear 387 formed on the rear side of the disk 382 between the rearward ends of the two arms. Associated with this assembly is a control lever 388 which is pinned on, or otherwise rigidly secured to, the shaft 384. A stud 389 on the rear end of this lever lies between the opposed arms of the centralizing levers 385. Thus, the rocking of the disk 382 from operation of link 375 is effective to rock the centralizer arms 385 through the medium of the ear 387. This rocking of the centralizer arms 385, operating through the media of pin 389, biases the lever 388 and shaft 384 in the same direction, and thereby sets the counting control mechanism.

It can be noted at this point that the counter control can be locked in a nonentry position by means of a nonentry control lever 390 which can be detented in the inoperative position shown in FIG. 7, or in an operative position in which a hook member 391 formed on the lower end of the lever engages a pin 392 on the control lever 388. When the lever 390 is rocked to its operative, or counter blocking, position (counter-clockwise of that shown in FIG. 7), the hook 391 embraces pin 392, thereby locking the lever 388 against operation and holding it in its centralized, and inoperative, position shown.

In that event, the rocking of disk 382 merely causes the scissors levers 385 to become extended against the force of spring 386, for the lever 388 is positively locked against movement by the hook 391 of the lever 390.

Inwardly of the disk 382 and immediately adjacent to the frame plate 88, the shaft 384 carries an arm 395, shown in FIG. 10. This arm is rigidly mounted on the shaft 384 and hence turns with it. The forward end of the arm carries the pin 396, previously mentioned as lying within the slot 346 of the counter actuator follower 342. Thus the rocking of shaft 384 is effective to raise or lower the rear end of the follower arm 342, and thereby time the rocking of the counter actuator assembly, as previously explained. On the other hand, if the counter is locked against operation, or if the machine is cycling in some operation, such as shifting of the carriage, in which the digitation control gate 228 is not operated, the counter control pin 396 remains in the central position shown in FIG. 11, and the counter is not operated.

12. Counter Actuator Block (FIG. 11)

It is conventional in the machine with which my invention is exemplified, to provide the right-hand counter spool 315 with a rearwardly extending arm 400 which is rigidly secured to the spool, preferably and conventionally on the left-hand end thereof and associated with the counting finger 305. The rear end of this arm is provided with a laterally projecting ear 401. It will be recalled that the operation of the counter spools 315 is secured by their individual springs 319, which bias these spools to follow the rocking movement of bar 317 of the counter assembly. Thus, the counter shaft 304 and bar 317 can rock through their normal path without rocking the various spools. It will be recalled that one method of so blocking the respective spools is by the engagement of the sensing fingers 306 with the solid face of the disks 302 of the counter dial assembly. Another method of blocking operation of the counter is by blocking the rocking of arm 400 just mentioned. It is conventional to secure such a blocking movement by means of a slide 402 shown in FIG. 11. The forward end of this slide is slidably held by a notch in the crossbar 86, while the rear end is supported on a lever 403 which is pivotally mounted on the frame plate 81 by any suitable means, such as stud 404—the slide and lever being connected by any suitable pivotal connection, such as stud 405. The lever 403 is resiliently held in the inoperative position shown by any suitable means, such as spring 406, tensioned between the upper end of the lever and a stud on the frame plate. This lever is operated in certain programmed operations, one of which will be later described under the heading "Carriage Tabulation" and another of which will be described in connection with the back transfer operation. For the moment it can be noted that when the lever 403 is in the counter-clockwise position shown, the arm 400 is free to rock without hindrance. However, if the level 403 is rocked (clockwise in this figure), then a shoulder 407 on the slide 402 lies in the path of travel of ear 401, thereby blocking any rocking of the right-hand collar 315 and thus effectively disabling the counter actuator in the units order on the keyboard and therefore entirely across the counter register.

13. Register Clearing (FIGS. 2, 8, 9, 16 and 17)

The accumulator register dials 71 may be cleared, or returned to their "0" registration position, by a conventional clearing means which is best shown in FIG. 17 and which comprises a mutilated clearing gear 242 on each dial shaft 236. In order to conserve space and make the ordinal spacing as small as possible, these gears are alternately arranged on their respective shafts. Associated with the mutilated gear 242 is a double clearing rack 243 which extends longitudinally of the carriage frame and is slidable therein. The rack can be operated by means of a clearing knob 74 (see FIG. 1) or by power through operation of a power-operated clearing bar 415 (best shown in FIGS. 9 and 16), the construction and operation of which will be shortly described.

Similarly, the counter dials 73 may be zeroized, or cleared, by a conventional clearing means best shown in FIG. 17 and which comprises a mutilated gear 308 rigidly mounted on each of the dial shafts 300. Associated with the mutilated gears 308 is a clearing rack 309 which extends longitudinally in the carriage. Likewise, these clearing gears are alternately staggered on their respective shafts and a double rack is provided to operate them. This rack can be operated by means of a clearing knob 75 (FIG. 1) which is attached to the rack, or by power through the clearing bar 415 mentioned in the preceding paragraph.

It will be noted by reference to FIG. 16 that the bar 415 is provided with a pin 416 which is adapted to be engaged by an arm 417 rigidly mounted on the shaft of clearing knob 74. When the arm 417 lies in the clockwise position shown in this figure, it engages the pin 416, whereupon the rightward movement of the clearing bar 415 is effective to move the knob 74 and hence the clearing rack 243 to the right to clear the register dials 71. If it is desired to disable the clearing of the register dials 71 upon operation of rack 415, this is readily done by the operator rotating knob 74 counter-clockwise to rotate arm 417 out of the path of travel of the pin 416. The right-hand end of the clearing bar 415 carries a bracket member 418, upon the forward extremity of which is mounted a stud 419 similar to the stud 416 previously mentioned. This stud is adapted to be engaged by an arm 420 rigidly mounted on the shaft of the counter clearing knob 75. When the knob is in the clockwise position shown in FIG. 16, the arm 420 engages the pin 419, so that movement of the clearing bar 415 likewise translates the clearing knob 75 to the right and hence clears the counter register. The clearing of this register can also be disabled by rocking the clear knob 74 counter-clockwise.

The clearing bar 415 is adapted to be driven by a power mechanism, to the right in FIG. 16 or to the left in FIG. 9, by a mechanism which is shown particularly in FIGS. 8 and 9. It should be noted that the bar 415 is mounted on the carriage frame bar 237 by a suitable pin-and-slot connection comprising the pins 421 on the rear side of the frame bar engaging slots 422 in the clearing bar 415. The clearing bar 415 is resiliently biased to the left (to the right in FIG. 9) by any suitable means, such as a spring 423 tensioned between one of the pins 421 and a corresponding stud on the clearing bar.

In the preferred form of clearing mechanism utilized in the machine with which my invention is associated, the left actuator shaft 252 is extended to the rear frame crossbar 87 (as shown in FIG. 8) and carries adjacent its rear end a conventional driving clutch member 430. This clutch member carries a driving tongue 431 pivotally mounted thereon, which, when rocked rearwardly, engages a notch in a driven plate 432. The position of the driving tongue 431 is controlled by a conventional control member 433 mounted on the rear end of a clutch control bar 434. The control bar, or pusher rod, 434 is journalled in cross plates 84 and 86 and is resiliently biased toward the front of the machine by a suitable compression spring 435, compressed between the crossbar 84 and a collar on the control rod, as shown. The control rod 434 can be moved rearwardly against the force of its spring 435 to rock the driver tongue 431 into engagement with the notch in the driven plate 432 to place the clutch in engaged, or driving, position by a pusher link 436. The rear end of the pusher link 436 is provided with a shoulder, not shown, that engages the front end of the clutch control bar 434, and the front end is pivotally mounted on an arm 437 rigidly mounted on a shaft 438. The shaft is rocked (clockwise if viewed from the right) from the depression of the clear key 60 (FIG. 1) or by certain control mechanisms not here pertinent; and when so rocked, the rocking of arm 437 and the translation of pusher link 436 translates the control bar 434 rearwardly to place the clutch in operative position.

The driven clutch disk 432 is mounted on the forward end of a shaft 441 which is journalled in the rear cross plate 87 and a supporting bracket 442 which is mounted thereon by suitable spacing studs 443. This shaft 441 carries a clearing cam 444 pinned on, or otherwise rigidly secured to, the shaft intermediate the cross plate and the bracket. Cooperating with the cam is a cam follower arm 445, which, in this instance, is formed as a bellcrank pivoted on a pivot stud 446 mounted on the bracket 442. This follower arm 445 is provided with a follower roller 447 which engages the periphery of the clearing cam 444, the arm and roller being biased into engagement with the cam by any suitable means, such as spring 448. The actuator shafts 252 of a Thomas-type machine conventionally rotate in a clockwise direction when viewed from the rear, as in FIG. 9, for in this type of machine, the main drive shaft 255 rotates in one direction only. It follows that the shaft 441 and clear cam 444 will likewise rotate in a clockwise direction, and that the shape of the cam provides a gradual rise from the full-cycle position to about 270° with an almost instantaneous drop in the final portion of the cycle. Thus, the follower arm 445 is pushed to the right (to the left in FIG. 9) for three-fourths of a cycle of operation and then is released to be snapped back to its full-cycle position by the spring 448.

The upper end of the follower arm 445 is pivotally connected to a rightwardly extending link 449 which is provided with an elongated slot 450 shaped as shown in FIG. 9. This slot embraces a pin 451 mounted on the rear cross plate 87. It is obvious that the rocking movement of the follower arm 445 (to the left in FIG. 9) moves the link 449 in the same direction—the movement of the link being first in a diagonal direction to lift the right end of the link in the first portion of movement, and then to give a linear translation to the right. The upper end of the link is provided with an ear 452 adapted to engage shoulders 453 ordinally spaced on the lower edge of the clearing bar 415, so that the ear 452 can engage the clearing bar 415 in any ordinal position of the carriage B, and hence clear the registers in any ordinal position.

It can be noted at this point that in the preferred form of my invention the register will be provided with a split clearing mechanism, such as that suggested in the patents to Moody, Re. 23,259 and Re. 23,260, both issued on August 22, 1950. In such an event, it is preferable that the split occur between the tenth and eleventh orders of the register. This position is preferred so that totals can be accumulated in the right-hand ten orders (there normally being ten orders in the selection and actuating mechanism of such machines), the accumulated values transferred back into the selection mechanism, the carriage shifted to the extreme right-hand position, and grand totals accumulated in the left-hand ten orders of the register. It is also assumed that this machine will be provided with a half-cent mechanism in desired orders of the register, or all of them, if desired, in order to round off totals to the closest cent. These mechanisms are not a part of the present invention and hence are not described herein. However, they are desirable accessories to the machine of my invention and it is to be noted that such conventional mechanisms do not interfere in any way with the construction and operation of the machine of the present invention.

The clearing, or resetting, operation is limited to the first machine cycle, even though the shaft 438 is held in a rocked position throughout a program, or series, of operations. This is readily accomplished. The pusher rod 436 carries a rightwardly extending pin 454, as shown in FIG. 8, the pin lying forwardly of a shaft 1427 when the clutch rod 434 is in its forward, inoperative, position. The shaft 1427, as shown in FIG. 13, is geared to a vertical shaft 1429 by means of miter gears 1430 and 1431, and shaft 1429 is geared to the main drive shaft by means of miter gears 327 and 1428, whereby the shaft 1427 rotates synchronously with the main drive shaft 255. The shaft 1427, as shown in FIG. 8, carries an eccentric cam 455, which, at approximately the halfway point of a cycle of operation, engages the pin 454 when the pusher rod 436 has been moved rearwardly to push the shift control rod 434 to its operative, or clutch-engaging, position. Upon such engagement of the pin by the cam, the pusher link is lifted from engagement with the clutch control rod 434, whereupon the latter is snapped forwardly by its compression spring 435. Thereafter, the cam releases the pin and permits the pusher link to drop under the force of its spring, not shown, toward its rod-engaging position. However, the rod will have moved forwardly in the interim so that the lower edge of the link will ride upon the top of the rod and thus the rearward position of the pusher link will have no effect on the clear clutch or its control rod. The clutch control rod is thus, therefore, positively disengaged at approximately the midway point of a clearing cycle and cannot become re-engaged until the shaft 438 is rocked backwardly to its original position to enable the shoulder on the pusher link to engage the forward end of the clutch control bar 434. By this means, in any programmed operation, the clear clutch may be operated once, but only once, during the program.

14. *Carriage Shift* (FIGS. 8 and 9)

It has previously been mentioned that the carriage is shiftable in either direction with respect to the frame, or body, A of the machine. The carriage is shiftable by power under the control of the manually operated keys 56 and 57, and also in certain automatic operations, some of which will hereinafter be described. The mechanism for shifting the carriage is shown particularly in FIGS. 8 and 9, and is essentially that shown and described in the patent to Carl M. Friden et al., No. 2,380,642, issued on July 31, 1945, as modified by the clutch mechanism shown in the patent to Matthew, No. 2,679,916, issued on June 1, 1954.

The movement of the carriage is controlled by a left shift clutch 460 and a right shift clutch 461 (see FIG. 8) of conventional construction, which preferably are mounted on the two rightmost actuator shafts 252. In the machine shown in this embodiment, it is conventional for these actuator shafts to be driven with each cycle of operation so that they rotate in every cycle of every machine operation, but are normally disengaged from the shifting mechanism. The operation of the left shift clutch 460, from its normally inoperative to its operative position, is controlled by movement of a shift rod 462, resiliently urged toward the front of the machine by a suitable compression spring 463 seated between the cross-frame 84 and a collar on the front end of the rod. The rear end of the clutch control rod 462 is provided with a clutch control member 464 which positions the clutch member 460 in its operative, or inoperative, position, depending upon the position of the control rod 462. Cooperating with the clutch member 460 is a driven member 465 having a notch in which the tongue of the driven member 460 may be engaged. This disk is mounted on a shaft 466 journalled in the rear frame plate 87 and a bracket 467 attached thereto by suitable spacing studs, as shown. This shaft carries a gear 468 which meshes with the larger gear of a compound gear assembly 469, the smaller section of the assembly meshing with a shift gear 470 which is rigidly pinned to, or otherwise mounted on, a shift shaft 471.

Similarly, the right shift clutch 461 is under the control of a right shift rod 474 carrying a clutch control member 475 and similarly biased toward the front of the machine by a compression spring 476. Rearward movement of the rod 474 and control member 475 rocks the tongue of the clutch member 461 into engagement with a notch in a clutch-driven member 477. This member is mounted on a shaft 478, likewise journalled in cross plate 87 and the bracket 467, which shaft carries a gear 479, located on the rear end of the shaft adjacent the bracket 467. This gear meshes with a wide idler 480, which also is in mesh with the large gear of the compound gear 469.

Rearward movement of the clutch control rod 462 or 474 operates the shift clutch 460 or 461, respectively, to connect an actuator shaft 252 to the shifting mechanism, which includes the driven plates and gear trains, just mentioned. It is obvious that operation of either of the rods will selectively drive the shift gear 470 in opposite directions, depending on which clutch is operated. The shaft 471, upon which the shift gear 470 is rigidly mounted, also carries a shift plate 484 which is provided with four equally spaced pins 485. These pins are adapted to engage in notches 486 of the conventional shift rack 487, mounted on the rear side of the carriage frame bar 237. In this manner, the rearward movement of left shift rod 462 causes the carriage B to be shifted to the left, while movement of the right shift rod 474 causes the carriage to be shifted to the right.

The operation of the left shift control rod 462 is controlled by various means, one of which is the rocking of shaft 490. The shaft can be rocked by means, not shown, from the depression of the left shift key 56, or by certain power-operated means, not here pertinent. This shaft carries an arm 491 rigidly mounted thereon, upon which a rearwardly extending pusher link 492 is pivotally mounted. This pusher link has a shoulder, not shown, which engages the front end of the pusher rod and is resiliently biased downwardly into engagement with the front end of the control rod by any appropriate means. Thus, the rocking of the shaft 490 (counterclockwise if viewed from the right) is effective to translate the left shift control rod 462 rearwardly to engage the left shift clutch and hence drive the carriage toward the left. Similarly, the right shift rod can be operated by the rocking of a sleeve 493, which is rotatably mounted on the shaft 490 and which carries an arm 494 rigidly mounted thereon. A pusher link 495 is pivotally secured at its front end to the arm 494 and at its rearward end engages the right shift control rod 474. This link, as is true of link 492, is resiliently biased into engagement with the push rod 474 and is provided with a suitable shoulder which engages that rod.

Terminal notch 486 on the right end of the shift rack 487 (at the left side of FIG. 9), is formed by an override pawl 500 pivoted on the rack by any suitable means, such as by stud 501. The pawl is resiliently biased into alignment with the notches by any suitable spring, not shown, but which is conventional in this type of mechanism, in which position a notch formed in the pawl constitutes the terminal notch of the rack. The lower edge of the pawl is provided with a cam face adapted to be engaged by one of the rotating pins 485 when the drive plate 484 attempts to move the carriage to the left beyond the extreme left-hand position, thereby rocking the override pawl on its pivot 501 (counter-clockwise when viewed from the rear, as in FIG. 9). The outer, or right-hand, end of the pawl 500 is formed as a nose 502, which, in the extreme left-hand position of the carriage, overlies an ear 503 of a vertical slide 504 mounted on the rear side of the cross plate 87 by suitable pin-and-slot connections, such as constituted by screws 505 threaded into the cross plate 87, embraced by slots 506 in the slide member. The slide 504 is reisliently biased to its upper position by any suitable means, such as spring 507 (FIG. 18). The lower end of the slide overlies a horizontal arm of a bellcrank 508 which is pivotally mounted on any suitable means, such as the digitation control shaft 230. The vertical arm of the bellcrank is connected to a forwardly extending link 509, as shown in FIG. 8, which link is connected at its forward end to the upstanding arm of a transverse bail 510. The bail 510 is pivotally mounted on a transverse shaft 511 and carries a curved arm 512 which bends around the shaft and extends rearwardly and upwardly to a point immediately underneath the rear end on the left shift control pusher link 492. The rocking of the override pawl 500, by means of the rocking of the bellcrank 508 and the translation of link 509, rocks the bail 510 (counter-clockwise when viewed from the right side of the machine) and thereby causes the arm 512 to lift the left shift pusher link 492 from engagement with the push rod 462 to disable the left shift clutch.

Similarly, the terminal notch on the left end of the shift rack 487 (toward the right in FIG. 9) is formed by an override pawl 515, which is a mirror image of override pawl 500, and is also pivotally mounted on the shift rack 487, as by stud 516. This pawl is operative, through mechanism not here pertinent, to terminate a right shift operation when the carriage is in the extreme right-hand position.

15. *Carriage Tabulation (FIGS. 6, 7, 9, 18 and 19)*

Preferably, the machine of the present invention is provided with what is commonly known as a "carriage tabulating" mechanism, i.e., an automatic mechanism for shifting the carriage to a preselected ordinal position. Conventionally, such mechanisms have been used to shift the carriage to a desired ordinal position and thereupon enter a dividend into the accumulator, such as shown in the patent to Carl M. Friden et al., No. 2,403,273 of July 2, 1946. In the present invention, it is desired to use the tabulating mechanism without the clearing of the register, as was conventional in that programmed operation, or the entry of the keyboard factor into the register as soon as the carriage had reached the preselected ordinal position. In the present invention, I prefer to use an automatic tabulating, or carriage shifting, mechanism to shift the carriage to a preseletced ordinal position before operating the back transfer operation, for by such means I am enabled to automatically accumulate grand totals around a preselected decimal point in the storage register. The mechanism of the Friden patent just mentioned could be used in connection with the present invention, but I prefer to use the tabulating mechanism shown and described in the patent of Malavazos et al., S.N. 595,471, filed July 2, 1956, now issued as Patent No. 2,926,846 of March 1, 1960, for this mechanism provides means for shifting from any carriage position directly to any other carriage position by the shortest possible means and the fewest number of cycles, and if no ordinal position has been selected, then to the extreme left-hand position of the carriage. It will be understood that this mechanism is not essential to a back-transfer or interregister transfer operation, but, when combined with the mechanism of the present invention, it provides means for entering the accumulated values of either register into a storage register around a preselected decimal point from the depression of a single key. The detailed description of the mechanism of the construction and method of operation of this tabulating mechanism is fully shown and described in the Malavazos et al. patent just mentioned, but will be briefly described herein.

It is conventional, as shown in the Friden and the Malavazos et al. patents above-mentioned, to provide a series of ordinally spaced tabulator keys 76 to enable the operator to select the predetermined ordinal position to which the carriage is to be shifted. In this conventional mechanism, the tabulator keys, or buttons, 76 are mounted on key stems 535, as shown in FIGS. 18 and 19, slidably mounted in the front carriage rail 238. The key stems are resiliently biased to a raised position by suitable springs and are adapted to be latched in a depressed position by a conventional latching means, as is indicated by the highest order (extreme righthand) key in FIG. 19. The engagement of a depressed key stem 535 with a stud 536 mounted on a lever 537 is effective to terminate a shifting operation, and in a dividend entry mechanism described in the above patents initiates the entry of the keyboard factor into the register. This lever 537 is pivotally mounted on the rear side of the crossbar 85, as on stud 538. The rocking of this lever 537, resulting from the engagement of a depressed key stem 535 with the pin, or stud, 536, is effective to terminate a shifting operation, as will later be described.

It should be mentioned that in the tabulating mechanism of the Malavazos et al. patent, the shift clutch operating mechanism is normally in a right shift condition, so that when operated, it would cause a right shift of the carriage. However, at a point approximately 90° from the start of the cycle, a shift controller resiliently endeavors to put the shift control mechanism into a left shift condition. If movement of the shift operator is prevented by the sensing means now to be described, the shift mechanism will cause a right shift of the carriage, as is required when the depressed tabulator key lies inboard, or to the left, of the operating stud 536; but on the other hand, if the attempted shift of the shift controller to the left shift position is permitted, then the carriage is shifted to the left, as is required when an outboard key 76 is depressed, i.e., when to the right of operated stud 536. The sensing means just mentioned is best shown in FIG. 19, and comprises an operating bar 540 upon which are mounted an ordinally arranged series of pins, or studs, 541. The bar 540 is pivotally mounted on a pair of bellcranks 542, the bellcranks being pivotally mounted on the crossbar 85, as by screw studs 543. The other legs of the bellcranks are connected by a link 544, which, on its left end (to the right in FIG. 19), terminates in a downwardly directed extension carrying a pin 545. This pin is embraced within a slot formed in the upper end of a rocker 546, which is pivotally mounted on the forward side of crossbar 86. The lower end of the rocker 546 is pivotally connected to an ear 547 formed on a bail 548, rockably but nonslidably mounted on a cross-shaft 549. The shaft 549 is biased to the right (to the left in FIG. 19) by a coaxial compression spring 550, seated between the left frame plate 82 and the collar on the bail 548.

At approximately one-fourth of the way through the initial cycle of a tabulating operation, the shaft 549 is resiliently biased to the left (to the right in FIG. 19) by the operation of a shift arm 552, best shown in FIG. 9. The shift arm 552 is formed as a bellcrank pivotally mounted on the rear bracket 442, as shown in FIG. 9, by any suitable means, such as screw stud 553. The upper arm of the bellcrank carries a roller 554 which engages the periphery of a cam 555 mounted on extended actuator shaft 252. In the full-cycle position, the cam and follower roller are positioned as shown in FIG. 9, the cam rotating in a clockwise direction. The lower end of the bellcrank 552 (see FIG. 19) abuts against an end plate 556 of a bail 557 slidably mounted on the shaft 549. The end plate 556 of the bail is held against a collar fixed to the shaft by means of a relatively strong spring 559. Thus, when the bellcrank 552 is rocked, at approximately the 90° point of a cycle, the bail 557 is shifted to the left (to the right in FIG. 19). If the shaft is free to move, the relatively strong spring 559 forces the shaft also to the left. If, on the other hand, the translation of the shaft 549 is blocked, then the spring compresses and the shaft remains in its original position. The blocking or unblocking of the shaft 549 is determined by the engagement or lack of engagement of a depressed key stem 535 with one of the pins 541 on the sensing bar 540. It is obvious that movement of the shaft 549 to the left (to the right in FIG. 19) will rock the rocker 546 (counterclockwise in this figure) to shift the link 544 and thereby elevate the sensing bar 540. However, if the bar 540 is not permitted to rise by engagement of any one of the pins 541 with the lower end of a depressed key stem 535, then the shaft 549 is prevented from shifting and the spring 559 yields. In that event, the shift actuator 560 remains in its right shift position, for the depressed key stem is inboard. If the sensing bar 540 is not blocked from rising, then the shaft 549 is shifted to the left, along with the shift actuator 560, and in that event, the left shift clutch is operated at the start of the shifting phase of this program.

The shift actuator 560 comprises a bail 561 pivotally mounted on the shaft 549, the legs 562 and 563 rising to a point in front of the clutch control plates 475 and 464, respectively. In all operations except tabulation, the shift control 560 is latched in the right shift position shown in FIG. 19, by means of a latch 564 carried by the bail and engaging a latching stud 565, which is mounted on a bracket member 566. The latch 564 is disengaged upon depression of the dividend entry, or tabulation control, key 55, as will shortly be explained. In this unlatched position following depression of the dividend entry key and prior to the shifting of shaft 549 by the means heretofore described, the right shift arm 562 lies in front of the right shift clutch control member 475, as shown in FIG. 19. In that condition, the left shift arm 563 lies to the right (to the left in FIG. 19) of its associated control plate 464. If the shaft 549 can be shifted, then the shift actuator 560, which is held against longitudinal displacement on the shaft by suitable collars 567, is moved to the left. In that event, the arm 563 lies in front of its associated control plate 464 and arm 562 lies to the left of its associated control plate 475. In the first instance, the rocking of the actuator 560 will engage the right shift clutch 461, and in the latter event, its rocking will cause the engagement of the left shift clutch 460.

The operation of the dividend entry program is initiated by the depression of a dividend entry, or tabulation control, key 55. This key is latched in a depressed position by a latch mechanism, not shown herein, until the last cycle of operation, i.e., the cycle in which the keyboard value is entered into the accumulator register, at which time the latch is positively released. The key, while locked in its depressed position, closes the motor switch and activates the main drive clutch, activates the clear clutch and operates a light key touch mechanism which controls the shifting of the carriage. In an interregister transfer operation, in accordance with the present invention, the key 55 is not depressed, so a description of those mechanisms is not necessary. However, it should be noted that the depression of an interregister transfer (sometimes called a "back-transfer") key does operate the tabulating mechanism, which is also controlled by the dividend entry key 55, so that a description of this mechanism is deemed advisable.

It will be noted in FIG. 18 that the key 55 is mounted on the upper end of a long key stem 571, the lower end of which engages a roller 573 on the forward end of a rocking lever 574. The lever 574 is pivotally mounted on the frame plate 81 by any suitable means, such as screw stud 575. The rear end of the rocking lever 574 carries a second roller 572 which engages the underside of one arm 576 of a three-armed lever, or bellcrank, 577 which forms the right leg (left leg when viewed from the rear as in FIG. 19) of a bail 578. It is obvious that the depression of key 55 rocks the lever 574 (clockwise in FIG. 18) and that, in turn, rocks the bellcrank 577 and its bail 578 (counterclockwise in this figure); and holds it in the rocked position so long as the key is latched in its depressed position. It should also be noted that the bellcrank 577 has a second arm 579, carrying a pin 580 on its lower end, which pin is engaged by a cam nose on a back transfer control slide to be described hereafter.

The rocking of the bail 578 initiates a programmed carriage shifting, or tabulation, operation, which may be initiated by depression of the key 55 just described, or by operation of a back transfer key, as will be disclosed under the proper heading. It should also be noted at this point that the third arm 581 of the lever 577 carries a pin 582 which engages the forward edge of the rocker lever 403. It will be recalled that the upper end of the lever 403 is pivotally connected to a counter blockout slide 402, previously described; and that this slide carries a nose 407, which, when the slide is moved forwardly (to the right in this figure) by the rocking of lever 581, underlies the ear 401 of the counter assembly previously described. It is thus obvious that one of the things accomplished by the rocking of the bellcrank 577 is to disable the counter actuator so that no values may be entered into the counter during the tabulating program.

The bail 578 is rotatably journalled on a short shaft 583, mounted in the right frame plate 81 and the intermediate bracket 566. The left leg 585 of the bail 578 (shown on the right in FIGS. 19 and 37) carries a live tip, or pawl, 584, which engages an arm 586 pivotally mounted on the shaft 583 (see FIG. 37), which is fully shown and described in the Malavazos et al. patent referred to. This pawl is operative, when the bail 578 is rocked to initiate a tabulating operation, to rock the arm 586 rearwardly to an operative position. The arm 586 is resiliently biased toward the front of the machine by a spring 594, but is forced toward the rear by the rocking of arm 585 at the start of a tabulation operation, to be released from the live pawl during the first cycle of operation so that it may return to its normal inoperative position. This arm 586 is provided with an upwardly and rearwardly extending nose section 587 normally lying forwardly of a cam follower rocker 588 (shown in FIG. 9) mounted on the rear cross-member 87. This rocker is pivotally mounted on the rear cross-member by any suitable means, such as stud 589, and on its left-hand end carries a roller 590, engaging the periphery of a cam 591 mounted on the extended third actuator shaft 252, adjacent the cam 555 previously mentioned. This cam has a short rise, as shown, thereby momentarily rocking the follower arm 588 to depress the arm 587, 586 when it has been rocked rearwardly to underlie the right end of the follower. Incidentally, this rocking of the arm 586, among other things, releases the arm from the live pawl 584 previously mentioned. The arm 586 carries a long pin 592, which, in the rearward position of the arm, engages the forward edge of a latch-releasing member 593. This latch-releasing member is pivotally mounted on the bracket 566 by any suitable means, not identified, and is effective, when the arm 586 is rocked by the cam follower 588, to release the latch 564 of the shift actuating member previously described. Thus, a second effect of the operation of arm 586 is to release the latch 564 from the latching stud 565, and thereby release the shift actuating bail 561. It will be seen from the shape of the cams in FIG. 9, that this arm 586 is rocked slightly after the sensing mechanism, controlled by operation of cam 555 and follower 552, has attempted to shift the shaft 549 to the left. However, cam 555 has a much longer lobe, so that pressure is exerted on the shaft 549 to shift it throughout the entire period that the lach 564 is released. Thus, if a left shift is required, the shift actuating bail 561 is released for a leftward shift movement by the rocking of arm 586, whereupon the bail shifts as required. However, if a right shift is required, the release of latch 564 is ineffective as the shaft 549 is held in its leftward position and the latch re-engages as soon as the roller 590 has passed from a high point of cam 591 and will remain so latched throughout the tabulating operation.

The upwardly extended end 587 of arm 586, when rocked rearwardly by arm 585, overlies a pin 596 mounted on an arm 597 which forms the left-hand leg of a bail 598 (right as viewed in FIG. 19). Thus, the arm 597 and consequently bail 598, are rocked at approximately the halfway point of the first cycle of a tabulating operation. The right leg of the bail 598 is formed as a bellcrank, as shown in FIG. 18, one arm 599 of which is provided with a latching ear adapted to be engaged by a three-armed latch 600. The latch 600 is pivotally mounted on the frame plate 81 by any suitable means, such as pivot stud 601, and is biased to a latching position by any suitable spring 602. The bellcrank 598 is resiliently biased to an inoperative position by a spring 603 tensioned between the arm 599 and the latch 600. Thus, the bellcrank 598 is latched in its operative position (counter-clockwise of that shown in FIG. 18) when the arm 597 and bail 598 are rocked rearwardly by the depression of arm 587 by cam follower 588.

The arm 597 of bail 598 also carries an arm 642, as shown in FIGS. 19 and 37. This arm is pivotally mounted on arm 597 by any suitable means, such as pivot stud 643. The two arms are connected by a spring 644 tensioned between opposed ears on the two arms, so that the arm 642 is resiliently biased to follow arm 597 when it is rocked by the operation of cam follower 588 previously mentioned. This arm 642 carries a pin 645, which extends to the left to lie in front of the arm 562 of the shift actuator bail 561. There is an interlock which prevents the operation of the shift clutches during another cycle of operation, so that the operation of these clutches is blocked during the first cycle of a tabulating operation. The arm 597, however, is rocked at about the midpoint of that cycle, so that it is necessary to provide the resilient connection comprising arm 642 and the spring 644 to operate pin 645.

The other arm 604 of the bellcrank forming the right-hand leg of bail 598 abuts a pin 615 on an arm 605 rotatably mounted on shaft 583, the arm being biased into engagement with arm 604 (clockwise in FIG. 18) by a spring 595. The arm 605 is therefore rocked to an operative position (counter-clockwise from that shown in FIG. 18) by the rocking of bail 598. This arm 605 is pivotally connected to a forwardly extending link 606. The forward end of link 606 is pivotally connected to an arm 607 that is pivotally suspended from a projection on a tabulation slide 608. The slide 608 is slidably mounted inside of the frame plate 81 by any suitable means, such as a pair of pin-and-slot connections comprising slots 609 in the slide, embracing pins 610 carried by the frame plate. A spring 611 resiliently biases the slide to an upward position, in which position a bracket 612 formed on the upper end of the slide engages an extension 539 of the lever 537. It will be recalled that the lever 537 carries the pin 536 (see also FIG. 19) which is engaged by a depressed tabulator key stem 535 to rock lever 537 (counter-clockwise in FIG. 19), whereupon the slide 608 is forced downwardly against the bias of its spring 611. When this occurs, a rearwardly projecting and laterally formed ear 613 engages a roller 614 mounted on the forward arm of latch lever 600 to rock the latch (clockwise in FIG. 18) and release the bail 598.

The depending arm 607 of slide 608 normally lies in the inoperative position shown in FIG. 18. However, the rocking of the bail 598 (counter-clockwise in this figure), by means of link 606, pulls the arm 607 rearwardly. The arm 607 carries a roller 616 on its lower end, which roller is adapted to engage the cam edge 617 of a latch-releasing arm 618. Thus, although the slide 608 will be operated every time the carriage is shifted in either direction past a depressed tabulator key 76, it is normally ineffective to rock the arm 618. However, when the depending arm 607 has been rocked rearwardly, so that the roller 616 thereon overlies cam edge 617 of the arm 618, the depression of the slide 608 then becomes effective to rock arm 618. This arm, as shown in FIGS. 6 and 37, forms a part of a small bail 619, the other arm of which carries a pin 620. This pin engages the sloping cam face of a latch arm 622 pivoted on the outside of the frame plate by any suitable means, such as screw stud 623.

This latching arm 622 is provided with a notch, the shoulder of which underlies an ear 628 extending from a dividend entry trigger 629. This trigger is pivotally mounted on the frame plate 81, as by stub shaft 630, and is biased by a relatively strong spring 636 (shown in FIG. 7) in a counter-clockwise direction when viewed from the right, as in FIGS. 6 and 7. The trigger is normally latched against rocking movement by the latch 622, but is released when this latch is rocked by the means just described, from the depression of slide 608. Incidentally, while the slide 608 operates whenever the carriage shifts to the desired ordinal position, it is effective to release the latch 622 only when the machine has been conditioned for a tabulating operation by the rocking of bail 598.

The trigger, when rocked, engages a roller 631 mounted on the lower end of a lever 632 (FIGS. 6 and 7). This lever is pinned on, or otherwise rigidly secured to, the digitation control shaft 230, so that the rocking of the trigger 629 rocks lever 632 and shaft 230 to position the digitation control gate 228 (FIG. 2) in the additive position.

The trigger is connected by means of a link 633, as shown in FIG. 7, with a cam follower 634 pivotally mounted on the auxiliary control plate 88 by any suitable means, such as screw stud 635. This follower is biased by the strong spring 636 to cause the follower roller 637 on the upper end thereof to engage the periphery of cam 638, which is rigidly mounted on the right end of the main drive shaft 255—the spring also being effective to rock the trigger 629 as previously mentioned. It can be noted that it is conventional in machines of the kind described, to provide an interlock between digitation operations and shifting, so that in the cycle in which shifting occurs, the digitation control gate is positively locked in its neutral position. This interlock provides that the assembly of the trigger and cam follower is held in the position shown in FIG. 7 until the end of the cycle in which the trigger is released. However, there is enough lost motion in the assembly to enable the trigger to rock a slight distance to prevent its relatching.

It is desirable to provide means for terminating a shifting operation in either extreme position of the carriage. In the event no inboard order tabulator button 76 is depressed, the carriage will be shifted to the left. Normally, this shifting operation will be terminated when the carriage shifts to the ordinal position determined by a depressed outboard order tabulator key 76. However, if no tabulator key 76 is depressed, the carriage will be shifted to the extreme end position and there will then be no depressed key which could be effective to engage pin 536 and operate lever 537. Thus, it is essential to provide means for terminating the shifting operation in that position, and preferably to enter the dividend. Similarly, if an inboard order tabulator key is depressed upon the initiation of a dividend entry operation, and that key is released by the operator before the carriage reaches the predetermined tabulated position, the machine is locked in a right shift operation and it is desirable to terminate this program when the carriage reaches the extreme right-hand position. The means necessary to effect such termination is rather simple and is shown in FIGS. 6, 9 and 18. It will be noted that the slide 504 is provided with an ear 650. This ear overlies an ear 651 formed on the rear end of a lever 652. The lever is pivotally mounted on the right side of the frame plate 81 by any suitable means, such as screw stud 649 shown in FIG. 6. It will be obvious that as the slide 504 is operated by the right shift override pawl 500, the lever 652 will be rocked downwardly (counter-clockwise in FIG. 18 or clockwise in FIG. 6).

The lever 652, as shown in FIG. 6, is connected by a downwardly extending link 661 to a rocker 662, which rocker is pivotally mounted on the frame plate by any suitable means, such as stud 663. The forward end of the rocker 662 has a pin-and-slot connection 664 with the rear end of a bellcrank lever 665, pivotally mounted on the frame plate as by screw stud 666. The forward arm of this bellcrank 665 carries a pin 667 extending through an aperture in the frame plate, and as shown in FIG. 18, which overlies a forwardly projecting nose 668 on the lower end of the termination slide 608. Thus, the rocking of lever 652 by the override pawl is effective to depress the tabulation control slide 608, thereby terminating the shifting of the carriage and unlatching the dividend entry trigger 629, as previously described.

The left-hand override pawl 515 will also be effective to rock the lever 652 when the carriage is in the extreme right-hand position and a further shift to the right is attempted. This can be secured by means of a lever 653 pivotally mounted on a bracket 442, as on stud 654. The upper end of this lever, which is formed as a bellcrank, carries a pin 655 which is adapted to be engaged by the rocking of the nose of the override pawl on the left end of the carriage shift rack when the carriage is in the extreme right-hand position and a further shift is attempted. A link 656 is pivotally connected to the other arm of the bellcrank lever 653, its right end being supported on the lower arm of a bellcrank 657 pivotally mounted on the rear bracket 467, as by stud 658. The right arm of this lever (to the left in FIG. 9) is provided with a forwardly turned ear 659, which also overlies the ear 651. This lever is biased to a raised position by any suitable spring 660, as shown. It is apparent that the operation of the override pawl, upon attempted overshift to the right, rocks the bellcrank 653, which, through link 656, rocks the bellcrank 657 (counter-clockwise in FIG. 9), whereupon the ear 659, through its engagement with ear 651, rocks the lever 652 to terminate the tabulating operation, as previously explained.

In connection with the tabulating mechanism, it should be noted that if the carriage is in the predetermined ordinal position, no shift of the carriage is possible and the dividend will be entered in the second cycle of operation. In this event, the depressed tabulator button 76 will overlie the pin 536, whereby the lever 537 is in a rocked condition. In such a condition, the slide 608 is held depressed, thereby preventing the latching of the bellcrank 598 by the latch member 600. In that event, the rocking of the bail 598 in the first cycle of operation will be effective to rock the arm 605 on the left end thereof, rearwardly (counter-clockwise in FIG. 18), thereby pulling the roller 616 on the dependent arm 607 rearwardly to engage the cam face 617 of latch-releasing arm 618. The rocking of this arm releases the dividend entry trigger 629, so that it will operate in the next cycle of operation. However, the rocking of bellcrank 598 will not be effective to operate the shift actuator 560, for spring 603 will be effective to return the bail 598 to its inoperative position as the latch 600 is held inoperative.

This operation of the tabulating mechanism will be effective, in connection with the preferred program of interregister transfer operations to be described hereafter, to shift the carriage to the preselected ordinal position. It will not clear the registers, as is done by depression of the dividend entry key 571, for the clearing control mechanism is operated by that key and not operated by any of the transfer keys. However, the operation of either transfer key will, through the engagement of the pin 580 on arm 579 of bail 578, rock the tabulation control mechanism to effect the predetermined shift. If the depressed tabulator key lies outboard, i.e., to the right of the units order of the actuating mechanism, then the carriage is shifted to the left. If an inboard tabulator key is depressed, i.e., one lying to the left of the units order of the actuating mechanism or keyboard, then the carriage is shifted to the right. When the carriage reaches the preselected position, the engagement of the depressed key stem with the pin 536 rocks lever 537 to depress slide 608. This terminates the shifting operation and initiates the dividend entry, as heretofore suggested. In the event the carriage is in the preselected ordinal position, then the depressed tabulator key overlies the pin 536, so that the shifting operation is blocked, but the dividend entry latch is released to enable the entry of a dividend in the second cycle of operation.

In either interregister transfer operation, the dividend entry trigger 629 is locked against operation, but an auxiliary trigger 815, to be described under the appropriate heading hereafter, is released by the latch 622 and is enabled to operate to effect the transfer operation. However, insofar as the tabulating mechanism is concerned, the operation is the same to, and including, the release of the latching arm 622, as heretofore described.

II. TRANSFER FROM ACCUMULATOR TO STORAGE

One of the major aspects of the present invention is to provide a mechanism for transferring values from the accumulator, or product register, into a storage mechanism, which, in its preferred embodiment, contains storage dials with a visual indication of the value transferred, and also contains a control mechanism which may be operated to set such a value into the selection mechanism. Referring to FIG. 1, it will be seen that across the front of the machine, i.e., in front of the "0" keys 61, are three control keys, one of which, the key 700, is marked "Product Storage." Depression of this key is effective to transfer the value standing in those orders of the accumulator, or product register, dials 71, aligned with the keyboard into ordinarily arranged storage dials 701 which are visible through windows 702 in the cover of the machine. In view of the fact that only the values of the product register dials 71 which are aligned with the selection mechanism will be transferred into the storage dials 701, it is preferred that the mechanism of the present invention include an automatic shift of the carriage B to an ordinal position determined by depression of one of the tabulating buttons 76, prior to the actual transfer operation, thereby permitting the operator to work around fixed decimal points or to transfer such significant figures as he desires, automatically. The mechanism of my invention readily lends itself to one in which the transferred value may be set into the selection mechanism and therefore it is preferred to so construct it.

It would perhaps be well at this point to indicate broadly the type of interregister transfer, or, as it is sometimes called, "back-transfer" mechanism involved in the present invention. It is common to classify such interregister, or register to selection, transfer mechanisms into two general classes: (1) those in which the two registers or mechanisms are interconnected and the accumulator register cleared back to "0" to set a like value into the storage mechanism, which necessarily results in the register being cleared in the process of the transfer operation; and (2) those in which the register dials are provided with value cams of one kind or another, which cams are sensed by a sensing mechanism which controls the operation of an actuating mechanism, thereby automatically setting the actuating mechanism to the value corresponding to that in the coordinal dial and thereafter actuating the value into the second register or selection mechanism. The present mechanism is not properly classifiable in either of these classes, but in one respect or another has a point common to both. Briefly, the operation is as follows: Each register dial is provided with a value cam representative of the values "0," "1," and "2," the first two values each extending through one ordinal position of the dial representative of the value "0" and "1," while the portion representing the value "2" extends through all other positions, i.e., from "2" to "9," inclusive. A sensing mechanism senses the angular position of the value cam and is effective to hold the selection gears in a disabled position, or to represent the value of "1" or "2," respectively. The actuating mechanism is then connected to the storage register and the machine given five cycles of operation. Incidentally, such operation of the actuator also enters the value of "0," "1" or "2" into the coordinal accumulator register dial subtractively so as to return that dial to a "0" position. If a dial represents a value of "0" at the start of the transfer operation, the sensing mechanism blocks operation of the selection gear 220, so that the cycling of the machine subtracts nothing from the product register and adds nothing to the storage register; if a dial stands in a position representative of a value of "1," the sensing means moves the coordinal selection gear 220 to lie opposite the disk representative of the value of "1" in the actuator 250 or 251. Then, in the first cycle of operation, that value of "1" is subtracted from the accumulator and added into the storage register, whereupon the value cam is rotated to the "0" position to disable the sensing means and return the selection gear 220 to its normal, inoperative position. If the coordinal dial registers a value of "2" or more, the sensing means positions the coordinal selection gear 220 opposite the "2" section of the respective actuator and subtracts a value of "2" from the product register and adds it into the storage register, the selection gear standing at a value of "2" while, or so long as, the dial is rotating from the "9" to "2" positions, after which it may be turned to "1" or "0" with the result that the machine will operate in the next cycle to take "1" or "0" from the product register and add the same value into the storage register. It should be noted that in this method, the positioning of a dial and its value cam in a "0" position operates the sensing means to move the selection gear 220 to its normal, inoperative position, so that thereafter throughout the cycles of the transfer program nothing can be taken away from the accumulator register and nothing can be added to the storage register. It might also be mentioned that the peculiar arrangement of the actuator drums 250 and 251, previously mentioned, is important in this process of transferring operation, for it definitely separates the value "2" from the value "1" and avoids errors that might arise if the selection gear were not properly centered, as the selection gear moves from "2" to "0" position. It can be noted that during the digitation phase of a cycle, the friction resulting from engagement of the actuator with the selection gear prevents a selection gear from dropping from its value "2" position, either to "1," or "0," even though the dial and cam are simultaneously being rotated to the "1" or "0" position. It can be mentioned that in a transfer operation, by the means and mechanism here described, the value cams can have additional value positions, such as "3" or even "5," and will operate satisfactorily in a transfer from the product register to the storage register. However, when, as is done in my preferred form of machine, the same mechanism is used to transfer values from the counter register dials 73 to the storage register, a count of "3" in a single cycle sometimes becomes inaccurate. It is for this reason, therefore, that I prefer a maximum of a count of "2" in any cycle, and utilize five cycles of machine operation to complete the program.

In its preferred form the mechanism for this purpose will comprise the following elements, which will be described in detail in sequence:

(1) *Storage Register.*

(2) *Key Mechanism.*—In this connection it is desirable to provide a latch and interlock which will hold the product transfer key 700 in a depressed position and at the same time prevent operation of other conflicting control keys, such as the "Quotient Storage" key 1240.

(3) *Operate the Main Clutch and Motor Switch Control.*—The "Product Storage" transfer key 700 should also initiate machine operation, and this is done by simultaneously causing engagement of the main clutch and closing of the motor switch. It is also necessary to provide means for latching the motor switch and clutch engaged.

(4) *Primary Auxiliary Clutch.*—A primary auxiliary clutch is engaged by depression of the transfer key, which operates for one revolution (two machine cycles), during which time it is effective to:

(a) Hold the main clutch engaged and the main switch closed to continue machine operation, whereupon the clutch and switch control is latched in its operative position;

(b) Clear the Keyboard. It is essential that the key mechanism be provided either with means for preventing depression of the product to storage key 700 if a value stands in any order of the keyboard, or to automatically clear the keyboard upon the depression of the key and before the machine is permitted to start the transfer operation. The present invention utilizes the latter mechanism of automatically clearing the keyboard from the depression of the transfer key prior to the operation of the transfer, as will be described under the appropriate heading. Either method is equally satisfactory, but it is obvious that some means should be provided to prevent operation of the transfer mechanism while a value stands in any order of the selection mechanism.

(c) Clear the Storage Register. Operation of the primary auxiliary, or clearing, clutch initiates operation of a means for clearing the storage register. It can be noted that in the preferred form of the present invention, no tens-transfer mechanism is provided between the various orders of the storage register dials 701. It is thereby essential to clear the storage register before a transfer of values to it from the accumulator.

(5) *Tabulating Mechanism.*—It is desirable, but not essential, that the register carriage B be shifted to the selected ordinal position prior to the transfer operation, so that the operator is relieved from responsibility for manually shifting to the proper ordinal position. It is therefore preferred that, so far as is consistent with a transfer operation, the regular direct tabulating mechanism previously mentioned be operated from the depression of the control key 700. However, it should be noted that not all portions of the dividend entry mechanism can be used, for it is undesirable to operate the actuating mechanism to set a keyboard value into a register in an interregister transfer operation even though the keyboard has been cleared. Therefore, I provide an auxiliary means for conditioning the tabulating mechanism which does not include operation of the dividend entry trigger 629. Briefly, this phase of the program involves the operation of the direct tabulating mechanism and the disabling of the conventional gate-setting trigger 629, while enabling an auxiliary trigger for operation, preferably by the conventional latch releasing means, so as to initiate the transfer operation and set the digitation control gate to cause meshing of the subtractive gears 227 with the accumulator gears 235.

(6) *Transfer Drive Clutch.*—Depression of the product to storage transfer key 700 also conditions a transfer drive mechanism for operation, which operation is initiated by the release of the auxiliary trigger mentioned in the preceding heading. The transfer drive mechanism is effective to control a number of separate but interrelated operations. Specifically, the operation of the interregister drive mechanism rotates a cam, or control, shaft to its operative position (180°); then holds it in that position for the five cycles required for the transfer operation; and then, at the end of the fifth transfer cycle, returns the cam shaft to its full-cycle position, which operates the accumulator register clearing mechanism and restores all of the mechanisms to normal. This cam shaft carries ten cams which are effective to:

(a) Set the digitation control gate 228 for subtraction.

(b) Enable counter clear mechanism (not used in the present accumulator to storage transfer).

(c) Condition the counter actuator (not used in the present accumulator to storage transfer).

(d) Set the sensing mechanism to operative position.

(e) Condition selection slide lock for operation.

(f) Clutch the storage mechanism to the square shafts 222.

(g) Condition accumulator register clear mechanism for operation at completion of transfer operation.

(h) Condition counter sensing control (not used in the present accumulator to storage transfer).

(i) Operate gate centralizer at the end of transfer operation; and (j) Operate machine through five digitation cycles.

(7) *Terminate Operation.*—At the end of the fifth digitation cycle, the cam shaft is driven to its full-cycle position, which restores all the transfer mechanisms to normal, operates the register clearing mechanism, and terminates machine operation.

1. *Storage Register* (FIGS. 10, 20 and 22)

The storage register comprises a series of ordinally arranged dials 701, in my preferred form there being the same number of storage dials as there are orders in the selection mechanism. I prefer to arrange these dials in the forward part of the machine in front of the "0" keys 61, as best shown in FIGS. 1 and 2. The dials and their mountings can be of any suitable type but I prefer to use an ordinally spaced series of dials, rotating in a substantially vertical plane, and mounted on longitudinally extending shafts. The several dials are mounted on individual shafts, not clearly shown in the drawings, which shafts (as best shown in FIGS. 20 and 22) are suitably mounted on a flange member 705 bolted on, or otherwise rigidly secured to, a front transverse frame plate 706. Each dial is formed with an integral drive gear 707, as shown in these figures.

It has already been mentioned that the storage dials are driven from the square selection shaft 222. The mechanism for so driving the several storage dials 701 comprises a series of ordinally arranged drive shafts 710, preferably located immediately below the selection slides 210 and 211 and coaxial with the square selection shafts 222. These shafts are connectable to the square shafts through their several clutches, indicated generally at 711. The forward ends of the shafts 710 are journalled in a bearing plate 712 rigidly mounted on the front end of the base plate 80. Several forms of mounting the rear end of these shafts and of clutching them to the square shafts could be suggested, but I prefer the simple arrangement illustrated in the figures mentioned. In this form, the several square shafts 222 are extended through the cross plate 84 and the forward ends 720 are made circular and of reduced diameter. A cylindrical driven clutch member 713, preferably provided with ten equal angular spaced notches, as shown, and with an axial bore extending throughout the length thereof, is pinned to, or otherwise rigidly mounted on the rear end of each of the several shafts 710. The forward ends 720 of the several squares shafts lie within the central bore of the clutch member 713, the forward ends 720 forming bearings for the clutch members 713 and drive shafts 710 which are rotatable with respect to the square shafts. The several shafts 710 and their respective clutch members 713 are thus rotatably mounted with respect to the selection, or square, shafts 222 on which they are mounted and are driven by a driving clutch plate 714, preferably formed with two diametrically opposed jaw teeth adapted to fit snugly into the notches formed in the driven members 713, this driving plate being slidably, but nonrotatably, mounted on the respective selection shafts 222. The means for shifting the driving plate 714 into engagement with the driven clutch member 713 will be described under the appropriate heading below.

The various shafts 710 also are provided with a miter gear 715 rigidly secured thereto, and located adjacent the bearing bracket 712. These gears 715 severally mesh with corresponding miter gears 716 mounted on the lower ends of a series of substantially vertical shafts 717. The shafts 717 are journalled at their upper ends in the cross plate 706 and adjacent their lower ends in a second cross plate 718 rigidly mounted between the left and right frame plates 82 and 81, respectively. Each vertical shaft 717 carries a miter gear 719 which is constantly in mesh with the gear 707 secured to the coordinal dial 701. Thus, the operation of the clutches 711 connect the various dials 701 to their respective square shafts 222, whereby incremental rotation of the latter will provide a corresponding rotation of the dial.

The storage dials can be cleared by any suitable clearing mechanism, preferably of the type utilized in clearing mechanisms associated with the accumulator and counter registers. Such a clearing mechanism, in its preferred form, comprises a mutilated clearing gear 860 on each shaft 710. Associated therewith is a pair of clearing racks 861. These racks are mounted for longitudinal movement transversely of the machine as by mounting them on the forward crossbar 91 by a suitable pin-and-slot connection, not shown. The mechanism for operating this rack will be described under subsection "4(c)" hereafter, entitled "Clear Storage Dials."

2. Key Mechanism (FIGS. 2 and 24)

The key 700 is mounted on the upper end of a substantially vertical key stem 725, shown in FIG. 2, which extends through aligned apertures in the cross plates 706 and 718. The key is resiliently biased to its raised position by any suitable means, such as the spring 726 encircling the key stem and seated between the upper face of the cross plate 706 and the lower face of the key button 700. The lower end of the key stem 725 is formed as an ear, or bracket, 727 on which is riveted a pin 728.

The pin 728 lies in a slot 733 (see particularly FIG. 24) formed in the forward end of an arm 734. The arm 734 forms one leg of a bail 735 pivotally mounted on a cross-shaft 736. Incidentally, the shaft 736 can be journalled by any suitable means, but as it is shown in FIG. 2, has been rotatably mounted in brackets 741 mounted on the rear side of the front cross plate 91. The other leg 737 of the bail 735 supports the forward end of a tabulating control link 738. It is obvious that the depression of the key 700, through the engagement of the pin 728 with the lower edge of the slot 733, will rock the bail 735 (counter-clockwise in FIG. 24). This rocking of the bail translates the link 738 rearwardly, which movement is effective to initiate operation of the tabulating mechanism, as will be described in subsection 6, and condition certain control mechanisms, as will be described in subsection 7 below.

It should be mentioned at this point that the link 738 is latched in its rearward position until the last cycle of the transfer operation, which latching means is effective to hold the key 700 in its depressed position until the operation is completed and also to hold the shaft 736 in its rocked position. The latching means is shown particularly in FIG. 25, and preferably comprises a two-armed latching lever 745. This lever is pivotally mounted on a pin 746 riveted on, or otherwise rigidly secured to, a bracket member 747 formed on the intermediate bracket, or frame plate, 566. This arm is biased to a latching position (counter-clockwise in FIG. 25) by any suitable means, such as spring 748 tensioned between the forward end of the arm and the link 738. The forward arm of the latching member 745 is provided with a notch 749 adapted to engage a pin 750 mounted on the link 738. Thus, when the link moves rearwardly, the pin 750 moves into engagement with the notch 749, the spring 748 pulling the arm 745 down to engage the pin. This holds the link 738 in its rearward position until the latching arm is released at the end of the operation, as will hereinafter be described in subsection 8 below.

Preferably, the latching arm 745 is provided with a projection 751, immediately forwardly of the notch 749, which projection is provided with a cam edge engaging the pin 750. It is desired that the latch 745 be maintained in the position shown in full lines in FIG. 25, in order to keep a shoulder 752 on the rear end of the latch lever out of possible engagement with a switch control arm 909. The switch control arm is moved to operative position by an auxiliary clutch mechanism, at the start of interregister transfer operations only, and in a transfer from the accumulator to the storage register, controlled by key 700, the shoulder 752, is to hold the switch control arm 909 in its operative position. It is thus desirable to keep the shoulder 752 removed from the switch control arm 909, except when the machine is operating to transfer a value from the accumulator to the storage register—controlled by operation of key 700 and link 738.

The rocking of the bail 735 is also indirectly effective to rock the shaft 736 on which it is pivotally mounted. It should be noted that this shaft is rocked by the other interregister control key 1240, hereafter described in connection with the interregister transfer from the counter dials 73 to the storage dials 701. Thus, neither of these keys can be directly connected to the shaft 736, but either of them must be effective to rock it. This is accomplished by means of a pin 739, riveted to, or otherwise rigidly mounted on, the arm 734. This pin engages the forward edge of a short arm 740 pinned to the shaft 736. Thus, the rocking of arm 734, through the effect of pin 739 on the forward edge of arm 740, is effective to rock the shaft 736. Incidentally, the rocking of this shaft is effective to initiate the operation of an auxiliary clutch which operates mechanism to clear the keyboard and clear the storage register, as described in subsections 4 and 5 below.

3. Main Clutch and Motor Switch Control (FIGS. 2, 7 and 24)

The depression of the transfer key 700 is also effective to initiate machine operation by causing the engagement of the main drive clutch 270 (FIG. 6) and the closing of the motor switch. It should be mentioned that the other two control keys pertinent to the present invention, i.e., the "Quotient Storage" key 1240 and the "Storage to Keyboard" key 1400, utilize the same means for initiating machine operation, and that the latter of these operations is a single cycle operation. Thus, the depression of the "Product Storage" key 700 will be effective to initiate a single cycle of machine operation, during which cycle the latch 745, just discussed, becomes effective, not only to hold the link 738 in its rearward position, but also holds a switch lever 909 in its operative position to hold the motor switch closed and indirectly maintain the engagement of the clutch 270 through the linkage previously described.

This switch and clutch control mechanism comprises an arm 757, shown in FIGS. 2 and 24, which is pinned to, or otherwise rigidly mounted on, a transverse rockshaft 758. The rockshaft is journalled in bearing brackets 759 (FIGS. 7 and 24) mounted on the base plate 80. The arm 757 is provided at its distal, or free, end with a slot 760 adapted to cooperate with the pin 728 previously mentioned. The slot 760 is provided with a projecting lower jaw 761 which lies against the pin 728 and a shortened upper jaw 762. The upper jaw 762 is so formed that when the shaft 758 is rocked by one of the other keys, which causes rocking of arm 757 away from pin 728 without moving key 700 or lever 734, the upper jaw 762 passes beneath the pin 728 and thereby blocks depression of that key while one of the others is operated.

An arm 767 (FIGS. 7 and 24) is rigidly mounted on the extreme right-hand end of shaft 758, to the right of the right control plate 88, as shown in FIG. 7, and hence rocks with the shaft. This arm carries a pawl 768, shown in FIG. 7, pivotally mounted thereon by any suitable means, such as pin 679. The pawl is biased to an operative position (clockwise in FIG. 7) by any suitable means, such as a spring 770 tensioned between an ear on the pawl and a pin on the arm, as shown. The rearward end of the pawl is provided with a shoulder 771 normally abutting against a pin 772 carried by the rearwardly projecting portion 774 of a rocker arm 773. The rocker 773 is pivotally mounted on the right-hand control plate 88 by any suitable means, such as screw stud 784. The upper arm of the rocker 773 supports the forward end of a rearwardly extending link 775 which is pivotally connected thereto by any suitable means, such as pin 776. The rear end of this link is provided with a slot 778 which embraces a stud 779, to provide a pin-and-slot connection permitting forward and rearward translation of the link 775. The link is provided with an upwardly extending shoulder 777 adapted, when the link is moved rearwardly, to engage the ear 280a (see FIG. 6) on the link 280 which connects the main clutch control lever 274 to the switch control lever 281. Hence, the rearward translation of the link 775, occasioned by the rocking of shaft 758, causes the shoulder 777 to engage ear 280a and push the control link 280 to its operative position to cause engagement of the clutch and the closing of the motor switch, as previously described.

It is obvious that the rocking of shaft 758 (counter-clockwise in FIG. 7) pulls the pawl, or link, 768 forwardly, or to the left. Such movement of the pawl causes the shoulder 771, which engages the pin 772, to rock the rocker 773 (clockwise in this figure) to translate the link 775 rearwardly. In the preferred form of my invention, the rocking of the rocker 773 is assisted by a light key touch mechanism which becomes effective as soon as the rocker has moved through a slight angle. This mechanism preferably comprises a V-shaped sear, or latch lever, 790. This member, as shown in FIG. 7, is pivoted at the extremity of its lower arm to the right-hand control plate 88 by any suitable means, such as stud 791, and is biased to an effective position (clockwise in this figure) by a relatively strong spring 792 connected between the divergent end of the other arm and a stud on the frame plate. A roller 793 located at the elbow of the sear, or latch member, 790, normally lies in a notch 794 formed in the lower end of the rocker 773. Rearwardly of the notch 794, the rocker is provided with a cam edge 795. Normally, the sear is latched in the position shown by the engagement of the roller 793 with the shoulder of notch 794. However, slight movement of the rocker causes the roller to pass from under the shoulder of notch 794, whereupon the spring 792 becomes effective to rock sear 790. Such rocking, through the engagement of the roller 793 with the cam edge 795, rocks the rocker 773 to its extreme position to cause engagement of the clutch and the operation of the motor.

The mechanism just described is restored to its original, inoperative position at the end of the first cycle of operation. Additional cycles of operation, such as is necessary upon depression of the "Product Storage" key 700, are secured by auxiliary means which will be described in the next subsection, and which are operated during the first cycle of machine operation. The restoring means preferably comprises a roller 780 mounted in the full-cycle position on gear 781. The gear 781 is rotatably mounted on the control, or auxiliary frame, plate 88 by any suitable means, such as screw stud 782, and constantly meshes with a driving gear 783 rigidly mounted on main drive shaft 255. Thus, shortly before the end of the first cycle of operation, the roller 780 engages the end of the link 775, forcing it forwardly, or to the left in FIG. 7, so as to recock the rocker 773 and release the clutch and switch control mechanism. When this happens, the cam edge 795 forces the roller, and sear on which it is mounted, downwardly to their normal, cocked position.

4. Primary Auxiliary Clutch (FIGS. 13, 24, and 27 to 30)

One of the first things that occurs after the initiation of the machine operation, through the closing of the motor switch and the engagement of the main clutch, is the operation of a primary auxiliary, or clearing, clutch, which is effective to condition the machine for the transfer operation. It has been mentioned that the arm 734 (FIG. 24), which is rocked by depression of key 700, carries a pin 739 engaging the forward edge of an arm 740 that is pinned on, or otherwise rigidly secured to, the shaft 736. The shaft 736 carries a second arm 866 pinned thereto, or otherwise rigidly mounted thereon, adjacent the left side of the machine. The lower end of this arm supports the forward end of a link 867 extending rearwardly to the right end of a two-armed lever 868. This lever is pivotally mounted on the base plate 80 by any suitable means, such as stud 869, and is biased to an inoperative position (clockwise in FIG. 24) by a suitable spring 870. The rocking of arm 734, therefore, rocks the shaft 736 (counter-clockwise in this figure), thereby translating link 867 rearwardly and rocking the lever 868 (counter-clockwise in this figure) against the tension of spring 870. The left end of the lever 869 is pivotally connected to a clutch control link 871, the rear end of which is shown in FIGS. 27 and 30. This clutch control link is pulled forwardly, or to the left in FIG. 24, or to the right in FIGS. 27 and 30, by the depression of the control key 700. The rear end of the link 871 is provided with an angular slot 872 which embraces a pin 877 carried by the lower arm of a clutch pawl 878. This pawl is pivotally mounted on a cross-shaft 854 journalled in the left-hand frame plate 82 and the adjacent auxiliary control plate 89, as shown in FIG. 27. The clutch pawl 878 is biased toward its clutch-blocking, or disengaging position by a suitable spring 879 tensioned between a projection on the pawl and a crossbar 876, but is rocked to its clutch-engaging position by forward movement of the clutch control link 871 (to the right in FIGS. 27 and 30). The slot 872 is angularly shaped so that the link, which will be held in its forward position by the latching down of the control key 700 throughout the entire multicycle program, can release the clutch pawl to return to its clutch-engaging position toward the end of the clutch cycle, which is the equivalent of two cycles of machine operation, for this clutch is driven at one-half the speed of the main drive shaft, as will be explained in the next paragraph. The clutch control link is resiliently held in the upper, pawl-engaging position shown in FIG. 30, by a suitable spring 873, but is rocked downwardly in the second half of the clutch cycle (in the second machine cycle), as will be explained shortly. In the blocking position shown in FIG. 30, the upper end of the clutch pawl engages a clutch dog 880 pivotally mounted on a driven plate 881. The clutch dog is biased by spring 882 toward engagement with one of two driving keys 847 formed on the left end of a quill shaft 848, as best shown in FIG. 29. Thus, the rocking of clutch pawl 878 from depression of key 700 causes the clutch pawl to release the clutch dog, and thereby enables the clutching of the driven member 881 to the quill shaft 848 for one complete revolution of the quill shaft and driven member.

The quill shaft 848 is rotatably mounted on a transverse shaft 851 extending across the rear of the machine, being journalled in the right and left frame plates 81 and 82, respectively. A miter gear 888, shown particularly in FIGS. 13, 27 and 29, is mounted on the right end of the quill shaft and is connected to the main drive shaft 255 through the gearing and shafting shown in FIG. 13. This gearing is driven from the counter control shaft 325, which is mounted in the machine as a sixth actuator shaft but which carries no actuator drums as it is utilized entirely for the drive of certain auxiliary mechanisms, such as the interregister transfer means of the present invention. A miter gear 889 on this auxiliary shaft 325 meshes with a similar miter gear 890 mounted on the upper end of a short shaft 891. This shaft is journalled in any suitable means, such as bracket 892 mounted on the right side of the lefthand frame plate 82. The lower end of the shaft carries a miter gear 893 meshing with a similar miter gear 894 on the forward end of a rearwardly extending shaft 895. This shaft is journalled in a pair of brackets 896 and 897 and, at its rear end, carries a miter gear 898, which meshes with the miter gear 888, previously mentioned. Preferably, the gear ratio between the main drive shaft 255 and quill shaft 848 is 1:2, so that the quill shaft and consequently the clutch 848, 881 will rotate at half the speed of the main drive shaft 255, and hence take two machine cycles for a complete revolution of the clutch plate 881.

The driven side of the clutch, as shown particularly in FIG. 29, comprises the cam plate 881, previously mentioned, which is shaped as a cam with the profile as shown in FIG. 30. Integrally associated with this cam is a second cam plate 901, the profile of which is shown in FIG. 31—the two cams being separated by an integral spacer 902, as shown in FIG. 29. This member, comprising the two cams 881 and 901, and the integral spacer 902, is rotatably mounted on the quill shaft 848 and is, therefore, driven for a full revolution upon engagement of the clutch dog 880 with a ratchet tooth 847, this revolution taking two machine cycles for completion. The complete rotation of this driven member 881, 901 is effective to: (a) hold the main switch and main clutch engaged for a second cycle of operation; (b) clear the keyboard; (c) clear the storage register; and (d) release the clutch control link 871 by depressing it against the tension of its spring 873 so that the pin 877 rides in the long part of the slot 872.

(a) *Hold Switch Closed and Clutch Engaged for Second Cycle.*—It is seen in FIG. 31 that the cam plate 901 has a single depression 903 of short angular extent and lying in the full-cycle position of the driven member. This notch embraces a roller 904 mounted on the upper end of a rocker lever 905. This rocker is rotatably mounted on the shaft 854 previously mentioned, and is biased into engagement with the periphery of the cam 901 by a spring 906 tensioned between an arm of the rocker and the crossbar 876. The lower end of the rocker is provided with a pin 907 which is embraced within a slot 908 formed in an upstanding ear on the left-hand end of a transverse lever 909 (see also FIG. 27). This lever, as shown in FIG. 9, is pivotally mounted on the base plate by any suitable means, such as stud 910, and on its right-hand end, is provided with an upstanding ear 911.

The ear 911 bears against the forward edge of a lever 916 pivotally mounted on a stud 917 carried by a bracket mounted on right side frame plate 81. The left-hand end of this lever 916 carries a roller 918 which abuts against the switch control arm 919 of the micro-switch 291 that controls the flow of power to the motor, not shown. The rocking of the lever 916 (counter-clockwise in FIG. 9) not only closes the switch 291, but pushes the conventional switch controlling link 284 forwardly, and thereby maintains the main clutch open until the end of the second cycle, the lever 916 embracing the rear end of link 284, as shown in FIG. 11. At the end of the second cycle, the clutch disk 901 returns to the full-cycle position shown in FIG. 31, and the clutch is disengaged. However, the movement of lever 909, which occurs immediately, has enabled it to be latched in the operative position by latch lever 745 which latches the control link 738 in its operative position, so that the machine continues to cycle until the latch lever 745 is released at the end of the operation.

(b) *Keyboard Release.*—Obviously, if a value stood in the keyboard while the mechanism of the present invention tried to set the selection mechanism to transfer values into the storage register, the machine could not operate accurately and might be damaged. It is, therefore, necessary that the keyboard be cleared on the first cycle of a transfer operation, before anything else occurs, and while the machine is going through the idle cycle that precedes every tabulation operation.

It is also seen in FIG. 31 that the cam member 901 carries a roller 925 preferably located diametrically opposite the notch 903. This roller, in the full-cycle position of the plate 901, engages the upper end of a rocker arm 926 rotatably mounted on a stub shaft 927 secured to the left-hand frame plate 82. The lower end of the rocker arm 926 is pivotally connected to a forwardly extending bar 928 (see also FIG. 10, where the forward end of the bar is shown). The forward end of the bar is pivotally connected to a two-armed lever 929 pivotally mounted on the base plate by any suitable means, such as stud 930. The forward edge of the righthand end of the lever 929 abuts against the rearward edge of an arm 931 which is pinned to, or otherwise rigidly secured on, the transverse keyboard clearing shaft 131, and extends downwardly therefrom. It has already been mentioned, particularly in reference to FIG. 4 and in the discussion of the conventional keyboard clearing mechanism under the heading "Keyboard Clearing" above, that the rocking of this shaft is effective to clear the keyboard. It is thus obvious that the keyboard is cleared at the start of the first cycle of operation.

(c) *Clear Storage Dials.*—It was mentioned previously that this register is designed primarily for the storage of a factor and therefore is not provided with tens-transfer mechanisms between the various orders. It is, therefore, essential that before each interregister transfer operation, this register be completely cleared so that the transfer of a value from another register will accurately show the amount transferred. It will be seen by reference to FIG. 30 that the driven plate 881 comprises a cam with a very gradual rise from the full-cycle position shown in this figure, through an angle of about 330°. This rise is followed by an abrupt drop, or shoulder, 884 approximately 30° before the full-cycle position. The periphery of plate 881 is engaged by a roller 935 mounted on the upper end of a rocker, or two-armed lever, 936, also pivotally mounted on the stub shaft 927. The lower end of the rocker 936 is pivotally connected to a storage dial clear link 937. The forward end of the link 937, as shown in FIGS. 10 and 24, is pivotally connected to the left-hand arm of a bellcrank 938 which is also mounted on the stud 869 which pivotally supports the two-armed lever 868. The bellcrank 938 is rocked to its inoperative position (counter-clockwise in FIGS. 10 and 24) by a suitable tension spring 939 tensioned between the left-hand arm of the bellcrank and a stud, not shown, on the base plate. The spring also pulls the link 937 forwardly to rock the cam follower lever 936 (counter-clockwise in FIG. 30) to keep the roller 935 against the periphery of the cam. The forwardly extending arm of the bellcrank 938 is pivotally connected to a short link 940, the right-hand end of which is pinned to a bracket 941 attached to the left end of the clear racks 861, as best shown in FIG. 10. Thus, the rotation of the clutch plate 881 rocks the bellcrank 938 (clockwise in FIGS. 10 and 24) against the tension of its spring 939, to pull the storage dial clear racks 861 slowly to the left—this operation taking about one and five-sixths cycles of machine operation. This results in clearing of the storage dials back to a "0" registration. Immediately after the high point of cam 881 is reached, the clearing mechanism is returned to its normal, inoperative position by spring 939 as the roller 935 passes by the shoulder 884. The storage dials are thereby cleared and are ready to receive a new registration from the transfer operation which takes place immediately.

(d) *Release Clutch Control Link.*—The pin 925 (FIG. 31), as it reaches approximately the 270° position of cam 901, engages the upper oblique-shaped end of a right-angular lever 932. This lever is pivotally mounted on the shaft 854 immediately adjacent the cam follower 905, previously mentioned. The lever carries a pin 933 at its elbow, which, as shown in FIG. 30, overlies, and is immediately adjacent to, the upper edge of the clutch control link 871. Thus, the lever 932 is rocked at approximately halfway through the second cycle of machine operation, for it must be remembered that shaft 851 and hence cam 901 rotate at half the speed of the main drive shaft. This rocking of the lever 932, through the engagement of pin 933 with the upper edge of clutch control link 871, rocks the rear end of the link downwardly, which movement is permitted by the angular shape of slot 872. When this occurs, the rear end of the slot enables the pin 877 on the lower end of the clutch pawl 878 to rock to engaging position (clockwise in this figure) through the force of its spring 879. Thus, the clutch 848, 881 is automatically disengaged at the end of a full revolution of the driven side of the clutch, or at the end of the second machine cycle.

5. *Tabulating Mechanism* (FIGS. 25, 7, 9, 18 and 26)

The transfer control link 738 is provided, adjacent its rearward end, as shown in FIG. 25, with an upwardly projecting cam nose 800. This projection is provided with a rearwardly and upwardly facing cam edge which abuts against the roller 580 on arm 579 of bail 578, previously described. It will be recalled that the rocking of this bail 578 (clockwise in FIGS. 25 and 37 or counterclockwise in FIG. 18) initiates operation of the tabulating mechanism already described. It is thus obvious that the rearward translation of link 738, resulting from depression of the "Product Storage" key 700, is effective to rock the tabulating mechanism to its operative position and to hold the initiating bail in its operative position until the key is released. It will be recalled, however, that the bail 578, while initiating a tabulation operation, becomes disabled by the means previously described when the tabulated position is reached, or is immediately disabled if the carriage happens to be in the predetermined ordinal position.

It has previously been mentioned that in the interregister transfer operation it is advisable to disable the conventional final cycle of a dividend entry operation, i.e., the entry of the keyboard value into the product register, even though the first cycle of machine operation will have cleared the keyboard, as has already been described. In the present invention, this is readily accomplished by the translation of the link 738 caused by depression of the control key 700. It is seen in FIG. 25 that the rear end of the link 738 is pivotally connected to an arm 801 by any suitable means, such as pin 802. The arm 801 is pinned to, or otherwise rigidly mounted on, a short transverse shaft 803 journalled in the auxiliary bracket 566 and the auxiliary bracket 804 (shown in FIGS. 7 and 9) on the right side of the right frame plate 81 and rearwardly of the auxiliary, or control, plate 88. Adjacent its right end the shaft 803 carries a lever 805 (see particularly FIG. 7, but also FIG. 9) which is rigidly mounted thereon. The forward end of this lever 805 overlies an ear 806 on a latch 807. The latch is mounted on the frame plate 81 by any suitable means, such as pivot stud 808, and is biased to the clockwise position shown in FIG. 7 by any suitable means, such as spring 809 tensioned between a seat in the lower end of the latch and an ear on the frame plate, as shown. The forward end of the latch is provided with a square notch 810, which, in the normal position of the latch, lies above a square spacing stud 811 that connects the dividend entry trigger 629 with its restore link 633. It is obvious that the rearward translation of link 738 rocks arm 801, shaft 803 and lever 805 (counter-clockwise in FIGS. 25 and 7). Such rocking of the arm 805 lowers the notch 810 into a position to engage the square spacer 811, and thereby blocks operation of the dividend entry trigger 629 when the tabulated position is reached. This results in disabling the final cycle of the conventional dividend entry operation.

The rocking of the latch 807 to disable the dividend entry trigger 629 is also effective to release an auxiliary trigger 815, located on stud 630 immediately adjacent, and to the right of, the dividend entry trigger 629. The auxiliary member is a three-armed lever, as best shown in FIG. 7, comprising a downwardly extending arm 816 provided with a notch 817 adapted to engage the ear 806 when the latching arm 807 is in its normal clockwise position; a forwardly extending arm 818 adapted to overlie an ear 820 on the tabulating latch lever 622 already described (see FIG. 6); and a rearwardly and upwardly extending arm 819. It will be obvious that the operation of the latching arm 622, described in connection with the tabulating mechanism, releases both the tabulating trigger 629 and the auxiliary trigger 815. However, in normal tabulating operations, the latch lever 807, being in its clockwise position shown in FIG. 7, prevents operation of the auxiliary trigger 815 for its shoulder 817 engages the ear 806 of the latch lever. However, the rocking of the latching lever 807 (counterclockwise by operation of the arm 805) moves the ear 806 away from the shoulder 817 and moves the notch 810 in the forward end of the latching arm into registration with the square spacing stud 811 of conventional trigger 629. Thus, in normal tabulating operations, the latch 807 blocks operation of the auxiliary trigger 815; while in an interregister transfer operation, the latch releases the auxiliary trigger 815 and blocks operation of the tabulating trigger 629.

The lower arm 816 of the trigger supports the rearward end of a link 824 pivotally mounted thereon by any suitable means, such as stud 825. The forward end of the link is pivotally connected to the lower end of a rocker arm 826, which is rockably mounted on the frame plate 88 by any suitable means, such as screw stud 827. A strong spring 828 is tensioned between the lower end of the rocker 826 and a stud on the frame plate, as shown, and is effective, when the auxiliary trigger 815 is released by ear 806, to rock the auxiliary trigger in a counterclockwise direction in FIG. 7. It can be mentioned at this point that the rocking of the auxiliary trigger 815 is effective to cause engagement of the interregister transfer clutch, as will be described in the next subsection, and that clutch drives the program shaft which controls the program required for the interregister transfer.

The trigger is restored to its normal latched position in the latter part of the cycle in which it is rocked. A simple form of such restoring mechanism comprises a cam 833 rotatably mounted on the control plate 88, as by means of screw stud 834. Attached to the cam is a gear 835 constantly in mesh with the gear 783, already mentioned. The gear and cam assembly are constantly rotated whenever the machine is in operation, for the gear 783 is rigidly mounted on the drive shaft 255. The cam 833 is formed as shown to provide a depression beginning just before the full-cycle position and for a short distance thereafter, followed by a gradual rise to a prolonged lobe. Associated with the cam is a follower roller 836 mounted on the upper end of the rocker 826, the roller being adapted to engage the periphery of the cam 833, the cam rotating in a counter-clockwise direction in FIG. 9.

Thus, the latch arm 622 can release the auxiliary trigger in the cycle in which the carriage reaches the tabulated position, but the trigger is held inoperative by the engagement of the roller 836 with the lobe of cam 834 until the very end of that cycle. When the auxiliary trigger rocks, it causes engagement of the interregister transfer clutch and thereby initiates the interregister transfer operation. The auxiliary trigger 815 is restored to its normal, latched position later in that cycle, by which time the program clutch, next to be described, will have become operative to initiate the actual transfer operation.

6. *Transfer Drive Clutch* (FIGS. 7, 9, 27 and 28)

It was mentioned in the preceding section that in an interregister transfer operation the shafting of the carriage to the preselected ordinal position was effective to release the auxiliary trigger 815 so that it could be rocked by its spring 828, or if the carriage was already in the preselected ordinal position, the trigger is rocked in the second cycle of operation without shifting of the carriage. The rocking of the auxiliary trigger 815 is effective to initiate the operation of the transfer drive mechanism. It has already been mentioned that the trigger 815 has a rearwardly and upwardly extending arm 819 (see FIGS. 6 and 7). The forward edge of this arm engages a pin 840 riveted to, or otherwise secured on, the lower end of an arm 841. This arm is rigidly mounted on a clutch control shaft 842 which extends from the right side frame plate 81 to the left side intermediate bracket 90, as shown in FIG. 28. The rocking of the auxiliary trigger 815, therefore, is effective to rock the transfer shaft 842. On its left end, seen in FIG. 28, the shaft 842 carries a bellcrank clutch pawl 843 rigidly mounted thereon. The clutch pawl, and consequently shaft 842, are resiliently biased to an inoperative position by a spring 844, as shown in this figure. In this position, the lower end of the clutch pawl 843 engages the end of a clutch dog 845, pivotally mounted on a program clutch plate 846 that is rigidly secured on a program shaft 851. The clutch dog is resiliently biased into engagement with one of two ratchet teeth 847 mounted on the quill shaft 848, previously mentioned. Thus, the rocking of shaft 842 causes the clutch pawl 843 to release clutch dog 845, whereby the driven plate 846 is clutched to the driving spool 848 to impart rotation to shaft 851, which shaft controls the programming of the interregister transfer operation, as will hereafter be described under the various subheadings of this subsection.

It can be noted at this point that a secondary clutch pawl 853 is associated with the clutch 847, 846. This clutch pawl is rigidly mounted on a short shaft 854 extending between the left side frame plate 82 and the left side control plate 89. The clutch pawl 853, and consequently shaft 854, are biased toward engagement with the clutch dog 845 by a suitable spring 855. It should be noted that the two clutch pawls 843 and 853 are practically 180° apart with respect to the driven plate 846, so that the release of the clutch dog 845 by pawl 843 enables the driving of clutch plate 846 and consequently the program shaft 851, through an angle of 180°. At this point, the second clutch pawl 853 engages the dog 845, thereby disengaging the clutch and stopping the shaft 851 in its half-cycle, or effective, position. Then, at the end of the interregister transfer operation, the clutch pawl 853 will be operated to release the clutch dog 845, as explained under subheading "(j)" hereafter.

It should also be noted that the clutch pawls 843 and 853 are provided with rollers 849 and 856, respectively, which engage the periphery of plate 846. These rollers are adapted to seat in a depression 850 in the plate 856 when the clutch plate 846 is in the respective half-cycle position, and to hold the clutch pawls from engaging the dog when the clutch plate is out of either respective half-cycle position.

It is obvious that the operation of the clutch 848, 846 (FIG. 28), resulting from the operation of the auxiliary trigger 815 and its rocking of shaft 842, causes 180° rotation of the program, or cam, shaft 851, and its retention in that position by the disengagement of the clutch by clutch pawl 853. It will be recalled that the main clutch is locked in an engaged position and the motor switch is held closed by the latching of the switch control lever 909 operated by the primary auxiliary clutch, previously mentioned, and held by the latch 745 associated with the control link 738, as shown in FIG. 25. Thus, the motor is held energized and the clutch engaged until the latch 745 is released, so that even though the cam shaft 851 is held in its midway position, the machine will continue to function until the program is completed.

The program control, or cam, shaft 851 carries ten cams which have already been referred to. These cams, reading from right to left (from left to right in FIGS. 9, 26 and 27, which are rear views) control the following operations:

(a) Set digitation control gate for subtractive operation.

(b) Enable counter clear mechanism (blocked from operation in the accumulator to storage transfer here under discussion).

(c) Condition the counter actuator for substractive operation (likewise blocked against operation in the present accumulator to storage transfer).

(d) Set the sensing mechanism to operative position.

(e) Condition the selection slide locks for operation.

(f) Clutch the storage mechanism to the accumulator drive, or square, shafts 222 by operating the clutches 711.

(g) Lock the carriage against shifting and condition the register clear mechanism for operation at the completion of a transfer operation.

(h) Operate the counter sensing control, i.e., shift the sensing mechanism to sense the value in the counter (likewise blocked against operation in the accumulator to storage transfer hereunder discussion).

(i) Operate the gate centralizer at the end of the transfer operation.

(j) Operate the machine through five digitation cycles and, at the end of the last of these five cycles, to trip the clutch pawl 853 to enable the drive mechanism to return the program shaft 851 to its full-cycle position.

These various elements will now be described in this sequence:

(a) *Set Digitation Control Gate for Subtraction (FIGS. 7 and 26).*—One of the first and most important things that the 180° rotation of shaft 851 must accomplish, is the setting of the digitation control gate 228, shown and described in connection with FIG. 2, to its substractive position so that the valve standing in the product register dials 71 can be subtracted therefrom to control the transfer of the accumulator values into the ordinally aligned storage dials 701. This operation is controlled by a cam 945 located on the extreme right end of the program, or cam, shaft 851. The periphery of this cam is engaged by a roller 946 which is mounted on the forwardly extending arm of a three-armed lever 947 that is pivotally mounted on a short transverse shaft 948. The upwardly directed arm of this lever extends forwardly and upwardly to a point adjacent the pin 374 which connects the counter control link 375 with the digitation control slide 376. This upper arm is provided with an abutment face 949 adapted to engage the pin 374 when the lever 947 is rocked to its operative position. A relatively strong spring 950, tensioned between a stud on this upwardly directed arm and a stud on the frame plate as shown in these figures, strongly biases the lever 947 into such engagement with the pin 374. Normally, the three-armed lever 947 is held in an inoperative position by the high point of the cam 945 engaging the roller 946, as shown in FIG. 7. This arm 947 is also held in an inoperative position by a hook 951 on the rear end of latch lever 805 which controls the selective operation of tabulation control trigger 629 or auxiliary trigger 815, as previously described, the hook 951 engaging an ear 952 formed on the lower end on the downwardly extending arm of the lever 947. Thus, the lever 947 is held in the inoperative position shown in FIG. 7 by the latch 951, 952 in all operations of the machine, except that initiated by the depression of key 700 to cause the transfer of a value from the product register to the storage register, and is also held against operation from depression of the key until the program shaft 851 rotates to its 180° position. Obviously, the lever 947 will remain in its operative position throughout the program until the shaft 851 is rotated to its full-cycle position at the end of the transfer operation.

(b) *Enable Counter Clear Mechanism (FIGS. 7 and 26).*—In connection with a transfer of values from the counter register dials 73 to the storage dials 701, it is necessary to clear the counter register at the termination of the transfer operation regardless of the setting of the conventional counter clearing control mechanism. The mechanism for this purpose will be described under the corresponding heading of Section III. However, in connection with the transfer of values from the quotient register dials 73 to the storage dials 701, it should be noted that in certain types of operation the automatic clearing of the counter register is disabled by the rotation of the counter control knob 75, as is conventional in this art and as was heretofore explained under the heading "Register Clearing." Regardless of this setting, when a value is transferred from the counter to the storage dials, it is necessary to operate the clearing mechanism and a mechanism is provided therefor, operated by a second cam 955, preferably being the second cam from the right, as shown in FIGS. 7, 9 and 26.

However, while this mechanism should not be described at this point, it should be noted that in transfers from the accumulator, or product register, it is desirable to disable this automatic conditioning means, for if the counter clear mechanism is set to a nonclearing position, it can be assumed that transfers from the product register should not supersede that setting. It will, therefore, be mentioned at this point that this mechanism for conditioning the counter clearing mechanism for operation at the end of the transfer program, regardless of the conventional setting of the clearing knob 75, is under the control of this second cam 955. Associated with this cam is a follower slide 956, which is mounted on the frame plate 81 for vertical movement by any convenient means. As shown, the slide 956 is provided with a pair of slots 957, the lower one of which embraces the shaft 851, while the upper one embraces a stud 958 riveted to, or otherwise fixed on, the frame plate 81. A relatively strong spring 959 biases the slide to an upward position in which it will be operative to condition the counter clearing mechanism for operation. This follower slide is provided at its lower end with an ear 960 which engages the periphery of the cam 955. In the normal position of the parts, when the cam shaft 851 lies in its full-cycle position, the lobe of cam 955 engages the ear 960 to hold the follower slide in its depressed, or inoperative, position shown in FIG. 7. Rotation of the shaft 851 to its half-cycle position, on the other hand, enables the slide 956 to rise to its fully operative position from the force of spring 959 when the machine is operating to transfer a value from the counter register to the storage register. However, when the machine is operating to transfer a value from the product register, the movement of slide 956 is blocked by a latch member 961 pinned on, or otherwise rigidly secured to, the control shaft 803, previously described, and which is rocked by the depression of the "Product Storage" key 700. It will be recalled that the rocking of this shaft rocks the latch member 805 to release the gate setting arm 947 for operation and to disable the conventional tabulating trigger and enable the auxiliary tabulation control trigger 815. Thus, when the shaft 803 is rocked by the depression of the "Product Storage" key 700, the latch arm 961 is rocked (counter-clockwise in FIGS. 7 and 26), so that the nose 962 thereof engages over the ear 960 of the follower slide 956, thereby preventing lifting of the follower slide 956 from the force of spring 959, regardless of the position of cam 955.

It probably should be mentioned at this point, in connection with the counter mechanism in this transfer operation, that the counter actuator is disabled throughout the cycling of the machine during the transfer operation so that any value standing in the counter will not be changed as a result of this program. It will be recalled that the depression of the "Product Storage" key 700 translates the link 738 rearwardly, which movement of the link, through the cam nose 800 and its engagement with the pin 580 of the tabulating mechanism, as shown in FIG. 25, holds the tabulating control bail 578 in its operative position throughout the transfer operation. The rocking of this bail, as was described in connection with the tabulating mechanism in Section I, subsection 15 above, holds the disabling slide 402 (see FIGS. 11 or 18) in its forward, or operative, position, to block rocking of the counter actuator 303, as previously described. The link 738 is not released until the end of the program, so that throughout all the cycles of the machine resulting from depression of the key 700, the counter will be disabled.

(c) *Counter Control Cam (FIG. 11)*.—The third cam 967 from the right end of shaft 851 is effective to control the reverse positioning of the counter actuator, and is utilized only in an interregister transfer from the counter register dials 73 to the storage dials 701. The mechanism controlled by this cam is locked against operation in the program here under consideration, i.e., transfer from product to storage. This cam 967 is shown in profile in FIG. 11, and comprises a disk cam flattened in the half-cycle position, as shown. Associated with the cam 967 is a follower bellcrank 968, pivotally mounted on a shaft 969 journalled in the right side frame plate 81 and an auxiliary bracket, such as bracket 566. The follower bellcrank 968 carries a roller 970 which engages the periphery of the cam, being biased into such engagement by a relatively strong spring 974 tensioned between the bellcrank and a stud on the frame plate, as shown. The bellcrank is also provided with a pin 971, which, in the operation here under consideration, is engaged by a hook-shaped latch member 972 pinned to, or otherwise rigidly secured on, a shaft 973. It can be noted that this shaft 973 is rocked by depression of the "Quotient Storage" key 1240 to disengage the arm 972 from the pin 971, whereupon the follower 968 can be operated by its spring 974 in accordance with the positioning of cam 967. However, in a product to storage operation, initiated by depression of key 700, the latch arm 972 remains in the position shown in FIG. 11, and thereby prevents operation of the follower from force of its spring as a cam 967 rotates from the full-cycle position shown to a 180° position.

(d) *Set the Sensing Mechanism to Operative Position (FIGS. 9, 16, 17, 25 and 32 to 34)*.—The rotation of the shaft 851 from its full-cycle to its 180° position is also effective to operate the sensing means so that it will sense the "0," "1" or "2" value in the inboard orders of the register and set the selection means accordingly. This operation is under the control of cam 980, which can be formed integral with cam 967, as shown in FIG. 9, the profile of the cam being shown particularly in FIG. 25. As the cam 980 rotates from the full-cycle position shown to its 180° position (clockwise in this figure), a roller 981 thereon engages the contact face, or edge, 982 on the extremity of one arm of a bellcrank follower 983. The bellcrank is pivotally mounted at its elbow on the short shaft 969, previously mentioned. It is obvious, from the arrangement of the parts shown in FIG. 25, that the follower bellcrank 983 is rocked (counter-clockwise in this figure) as the shaft 851 and cam 980 thereon come to rest at their 180° position. The other arm of the bellcrank 983 is pivotally connected to a forwardly extending link 984, the forward end of which is pivotally connected to the lower end of a rocker 985. This rocker is pivotally mounted on a stud 986 carried by a bracket 987 which is bolted to the cross plate 84. A slot 988 in the upper end of the rocker 985 embraces a pin 989 (see also FIG. 17), riveted to, or otherwise rigidly secured on, the downwardly extending arm 990 of a bail 991. It is obvious that the rocker 985 and the bail 991 are rocked (counter-clockwise and clockwise, respectively) as the cam 980 comes to its 180° position—and that these parts are held in this rocked position so long as the cam remains in the 180° position and are released to the normal position shown only when the transfer operation is completed and the cam continues on to the full-cycle position shown.

Bail 991, as shown in FIGS. 16, 17 and 32 to 34, is pivotally mounted on a shaft 995, which is slidably journalled in brackets 996 secured to the forward face of crossbar 85 by any suitable means. A frame 997 for the sensing mechanism is also mounted on the shaft 995, being shiftable longitudinally with the shaft 995. This frame may be of any desired construction but preferably contains a top plate 998, a bottom plate 999, end plates 1000 and a series of ordinally arranged separator and spacer plates 1001. It can be mentioned at this point that the frame 997 is normally held in its right-hand position shown in FIGS. 16 and 34, in which case the sensing means is operative to sense the value standing in the inboard accumulator register dials 71, but can be shifted a partial step to the left to enable sensing of the value standing in the counter dials 73. It should be noted here that the frame 997 is resiliently biased to the left by a tension spring 1002 tensioned between a stud on the crossbar 85 and a complementary stud or spring seat on the bottom plate 999, and is held in the right-hand position by a slidable pin 1003 engaging an ear 1004 on the left end of the bottom plate 999, as shown in FIG. 34. The mechanism for enabling a shift of the sensing frame 997 to the left will be explained under the heading "Counter Sensing Control," subsection (h) under Title III "Transfer From Counter to Storage," hereafter.

The sensing mechanism comprises a series of ordinally arranged sensing levers 1010 rotatably mounted on the shaft 995 and preferably lying immediately adjacent, and to the left of, the respective separator plates 1001. Each operating lever 1010 is provided with a downwardly extending toe 1011 adapted to engage a pin 1012 riveted on, or otherwise rigidly secured to, the ordinally related selection slide 210 for the "1" to "4" keys when the operating levers 1010 are rocked from the inoperative position of FIG. 32 to the operative position of FIG. 33. Each lever is resiliently connected to the bail 991 by a spring 1013 tensioned between a seat in the bail and a stud 1014 on the lower end of the operating lever. The bail is normally held in the retracted, or inoperative, position shown in FIG. 32 by a spring 1015 connecting it to a stud 1016 riveted to the bottom plate 999 of the sensing frame 997, as shown in FIG. 33. When in this position, the lower edge of the bail 991 engages the forward edge of the several operating levers 1010, rocking them to the counterclockwise position shown in FIG. 32. However, when the bail is rocked by the rocking of arm 985, previously described, to the position shown in FIG. 33, the several springs 1013 resiliently bias the operating levers in the same direction.

A pair of scissor arms 1017 and 1018 are pivotally mounted on the upper end of the operating levers 1010 by any suitable means, such as studs 1019. The forward ends of these levers (to the left in FIGS. 32 and 33) are connected by a tension spring 1020. The rearward end of the levers 1018 ride upon a crossbar, or the rod, 1021, as shown particularly in FIGS. 32 and 33, whereby the scissor arrangement, due to the force of the springs 1020, severally maintain the sensing fingers 1017 resiliently in the upper position shown in which they engage slots formed in the top piece 998. The upper scissor arms, or sensing levers, 1017 extend rearwardly (to the right in these figures) to enable sensing of the value position of ordinally related sensing slides which are effective to sense the ordinal position of the related accumulator dials 71 or counter dials 73.

Each register dial 71 (see FIGS. 16 and 17) is provided with a sensing slide 1025 adapted to sense the angular position of the respective dial. Similarly, each of the counter dials 73 is provided with a sensing slide 1352. As shown particularly in FIG. 16, the sensing slide 1025 for the accumulator dials is superimposed over the sensing slides 1352 for the counter dials 73, the slides of each pair being slidably mounted in the carriage by ordinally spaced notches 1027 in the carriage rail 238 and by a pin-and-slot arrangement comprising screw studs 1028 threaded into a bracket 1029 mounted on the carriage frame bar 237, which studs 1028 are embraced within aligned slots 1030 in the sensing slides 1025 and 1352. The sensing slides 1025 and 1352 are provided at their forward ends with noses 1026 and 1351, respectively, offset one to the right and one to the left, as shown in FIG. 16. This offsetting of the forward noses 1026 and 1051 enables accurately sensing the two sets of slides by shifting the sensing frame 997 to the right, or left, as the case may be. Each of the sensing slides 1025 is resiliently biased to its forward position shown in FIG. 16, by a relatively weak spring 1031 tensioned between seats formed in the carriage rail 238 and on the rear end of the slide. Such springs are unnecessary on the counter sensing slides 1352 since the two slides are in frictional engagement with each other, one spring being sufficient for both. The two slides 1025 and 1352 are provided with aligned windows 1032 and 1354, enabling the operator to see the counter dial 73 below each pair of sensing slides, as is particularly shown in FIG. 16.

Each of the accumulator dial shafts 236 is provided with a value cam 1035. These cams have a long nose 1036 adapted to engage the nose 1033 on the rear end or the ordinally related slide 1025 when the corresponding dial 71 registers a value of "0"—this nose extending through an arc equivalent to one digit space, or 36°. Immediately adjacent the "0" nose 1036 and forming a shoulder thereof, is an intermediate shoulder, or nose, 1037, lying in the "1" position, so that it will be engaged by the nose 1033 when the coordinal sensing slide is moved rearwardly and the dial registers a value of "1." The balance of the cam 1036 is of a minimum radius, which extends around the periphery of the cam from the "2" to the "9" value positions, so that in registration of values of "2" to "9" the sensing slide 1025 can be moved to its extreme rearward position. It is obvious that when the bail 991 is rocked, as previously described, it resiliently biases all of the operating arms 1010 clockwise from the position shown in FIG. 32 to that shown in FIG. 33. Such rocking of the operating arms 1010 causes their respective sensing fingers 1017 to move rearwardly until the rear ends thereof engage the forward noses 1026 of the coordinal slides 1025, forcing these slides to the rear into engagement with their corresponding cams 1035. If the aligned dial stands at the value of "0," the slide is held in its forward position, as indicated by "0" in FIG. 32, thereby blocking translation of sensing finger 1017 and rocking of lever 1010, so that the toe 1011 of the latter is unable to engage the associated pin 1012 on selection slide 210. In that situation, the rearward nose 1033 on the coordinal sensing slide is in engagement with the "0" nose 1036 on the associated cam 1035. On the other hand, in the event the aligned dial registers a value of "1," rocking of lever 1010 urges the sensing finger 1017 rearwardly against the associated nose 1026 of sensing slide 1025, thereby pushing the rear nose 1033 of the sensing slide against the intermediate shoulder 1037, or to the position indicated by "1" in FIG. 32. In that event, the toe 1011 of lever 1010 engages the pin 1012 and pushes the selection bar forwardly to its "1" value position. Finally, if a value of "2" to "9" is registered on the aligned dial, the sensing slide 1025 is biased rearwardly as before, but in this event its nose 1033 will engage that portion of the cam with a minimum radius, in which case the sensing slide will have moved to its extreme rearward position equivalent to the value of "2," as indicated in FIG. 32, whereby the translation of sensing finger 1017 and rocking of operating lever 1010 enables the toe of the latter to engage pin 1012 of the associated selection bar 210 and push that selection bar forward to correspond to a value of "2."

It will be recalled that in this machine five cycles of operation are taken to transfer values, which values are transferred in increments of "0," "1" or "2." It should be noted that as a value of "2" or more is reduced by increments of "2" in each cycle of machine operation, the respective cam 1035 rotates backwardly (counterclockwise in FIG. 16) so that as a value of "1" is reached, the intermediate shoulder 1037 engages the nose 1033, forcing the slide forwardly to the "1" position, and as the cam rotates further to the "0" registration, the "0" cam nose 1036 will force the slide 1025 forwardly to a position in which the associated selection slide 210 returns to its "0" or "no-value" position. Thereafter, in further cycles of the machine, this dial remains at rest, for the selection mechanism stands at "0" and can cause no change in the value registered therein. It should be noted that the clockwise side of the intermediate step 1037 or the "0" nose 1036 is formed with a sufficient angle to enable the cam to translate the engaging slide 1025 as the dial returns to its "1" and then to its "0" position. It perhaps should be mentioned again that the "1" and "2" segments of the actuator drums 250 or 251 (FIG. 2) are separated, as shown in various figures such as FIG. 2, so that as the sensing slide 1025 moves from "2" to "0," it cannot accidentally pick up a value of "1," thereby insuring the transfer of the correct values from the accumulator dial 71 to the storage dial 701.

It can be mentioned again that the transfer operation, whether from the accumulator dials 71 or the counter dials 73, requires five machine cycles, as the maximum value that is transferred in any cycle is "2." Thus, if the value in an accumulator dial is "0," the nose 1036 of the cam 1035 of that dial blocks movement of the aligned slide 1025, thereby blocking the rocking of the operating lever 1010, and the associated selection slide 210 stands in the "0" position to which it is biased by its spring 218; and this condition exists throughout the five cycles of operation, for the dial does not rotate from its "0" position as nothing is subtracted from it. If the value in the dial is "1," then the corresponding cam shoulder 1037 allows a single increment of movement of this associated slide 1025, whereupon the operating arm 1010 can rock the associated selection slide 210 to the "1" position, thereby subtracting "1" from the accumulator dial and inserting it in the aligned storage dial. During this cycle of operation, the dial is rotated from the "1" position to the "0" position, thereby positively camming the slide 1025 forwardly and hence rocking the operating arm 1010 to its "0" position and thereby releasing the slide 210 to return to its "0" position from the force of its spring. If the value is "2" in the accumulator dial, then the sensing slide 1025 will engage the part of the cam of least diameter extending from the "2" to the "9" position, whereupon the slide 1025 is forced rearwardly to its extreme position and the operating lever 1010 rocks to its extreme, or "2," value position. As the machine cycles, "2" is therefore subtracted from the accumulator dial and inserted in the storage dial, during which operation the rotation of cam 1035 forces the slide 1025 to its forward position, rocking operating arm 1010 to its inoperative position and thereby releasing the corresponding selection slide to the force of its spring whereupon it is returned to its "0" position. If a value is greater than "2" then "2" will be subtracted in the first cycle of operation while the dial is being returned two increments or digital values toward its "0" position. If the value originally was odd, the dial and cam will return to the "1" position in one of the succeeding cycles, and in the next, it will be returned from the "1" to the "0" position; while if the value originally was even, it will be returned in succeeding cycles to the "2" position and thence to "0." It can be noted that I have found in transfers from the accumulator to the storage register that greater increments are practical, such as values of "3" or more in a cycle. However, I have found that the transfers from the counter by the method hereinafter described, a cam with more than three value positions, i.e., "0," "1" and "2," sometimes becomes impractical. Therefore, in order to keep the programmed cycles identical in both transfer operations, I prefer to use the cam herein shown and described, which is effective to set the selection mechanism to values to either "0," "1" or "2."

(e) *Zero Locking Bail* (*FIGS. 9, 10 and 25*).—The fifth program cam 1043 is located on shaft 851 immediately adjacent cam 980 described in the preceding section. This cam controls the operation of a zero block mechanism for the "1" to "4" selection slides 210. It can be mentioned that these zero blocks are not necessary for the "Product Storage" operation being described but they are essential in the "Counter Storage" transfer to be described under Section III. This zero blocking cam 1043 is preferably formed as a disk cam with a depression at the 180° position, followed by a short rise to the major radius of the cam. The profile of this cam is shown in FIG. 25, the shaft 851 and cams rotating in a clockwise direction in this figure. Associated with this cam is a bellcrank follower 1044, also pivotally mounted on the shaft 969. The bellcrank carries a roller 1045 on the lower end of its vertical arm, the roller being biased into engagement with the periphery of the cam 1043 by a suitable tension spring 1046, as shown. A forwardly extending link 1047 is pivotally mounted at its rear end to the bellcrank follower lever 1044, and at its forward end to a second bellcrank 1048 mounted on a transverse shaft 1049 journalled in the brackets 741, previously mentioned and as shown in FIGS. 2 and 10. The bellcrank 1048 supports a transverse bail 1050 which preferably is formed integral with the bellcrank 1048 as shown, the left end of the bail 1050 being supported on shaft 1049 by a similar arm, not shown. Preferably, the two arms are pinned to, or otherwise rigidly secured on, the shaft 1049 so that the rocking of the follower 1044 from the rotation of cam 1043 and consequent rocking of bellcrank 1048 will cause a rocking of the bail 1050 without distortion or warping which might otherwise occur. It is obvious from this construction that the bail 1050 is rocked in a clockwise direction upon rotation of the program shaft 851 to its 180° position.

A series of ordinally arranged latch levers 1055 are arranged in the forward part of the selection mechanism and are effective to severally latch their coordinal selection slides 210. These latch levers are individually mounted on ordinally arranged brackets 1056 carried by the front crossbar 91, as shown in FIGS. 10 and 25, as by pivot studs 1057. A spring 1058, tensioned between a seat in each of the latch levers 1055 and a seat in the coordinal bracket member 1056, severally biases the latch members to an operative position (clockwise in FIG. 25). Preferably, the latch arms are provided with an extended, downwardly projecting nose 1059 adapted to engage the bail 1050. The rear ends of the latches are provided with a pair of spaced shoulders, or steps, 1060 and 1061, respectively, each adapted to engage an ear 1062 riveted on, or otherwise rigidly secured to, the coordinal "1" to "4" selection slide 210. Normally, the latches 1055 are maintained in their elevated positions shown in full line in FIG. 25, by the bail 1050, but upon rotation of the program shaft 851 to its 180° position, the bail is dropped and the latches 1055 are thereupon severally free to drop under the influence of their individual springs 1058. If the coordinal selection slide stands at a value of "2," as a result of the sensing operation, the ear 1062 will engage the lower edge of the arm 1055. If the selection slide registers a value of "1," then the ear 1062 will be in an intermediate position in which it engages the edge of the latch rearwardly of the shoulder 1061, in which event the arm 1055 will assume the position indicated in phantom and marked "1" in FIG. 25. In that event, the registration of the ear 1062 with shoulder 1061 prevents the slide 210 from ever moving further forwardly and thereby registering a value greater than "1." Finally, if the selection slide 210 assumes a position equivalent to a value of "0," then ear 1062 will engage shoulder 1060 and thereby block any forward movement of the selection slide 210. It can be noted that as the coordinal selection slide 210 is moved rearwardly as the value changes from "2" to "1" to "0" between cycles, the various latch arms 1055 will be enabled to drop to the corresponding position, and thereafter the setting of the selection slides cannot be changed until the program is completed and cam 1043 returns to its full-cycle position shown in FIG. 25. This mechanism is particularly pertinent and desirable in connection with the counter to storage transfer operation to be described hereafter. However, it does not interfere with the operation of the "Product Storage" transfer program and does furnish an additional means of preventing any rotation of the dials, or transfer of values, once the coordinal accumulator dial 71 has returned to its "0" position.

(f) *Clutch Storage Drive Shaft 710 to Selection Square Shafts 222 (FIGS. 2, 9, 8 and 20).*—The sixth cam 1068 is mounted on program shaft 851, preferably immediately to the left of cam 1043 described in the preceding section. Preferably also, as shown particularly in FIG. 9, the two cams 1043 and 1068 are formed integrally with an interconnecting collar 1069. This cam has a lobe 1070 located in the 180° position, as shown in FIG. 2. A cam follower bellcrank 1071 is rotatably mounted on shaft 969 immediately adjacent the cam 1068, this follower carrying a roller 1072 engaging the periphery of the cam. The downwardly projecting arm of the follower 1071 is pivotally connected to a forwardly extending link 1073, the forward end of which is pivotally connected to the lower end of a two-armed lever 1074. This lever is pinned to, or otherwise rigidly mounted on, a short transverse shaft 1075 journalled in brackets 1076 mounted on the forward face of the crossbar 84. The shaft 1075 carries a pair of arms, as shown in FIG. 8, the other being a duplicate of lever 1074 shown in FIG. 2. These arms, including the upper end of lever 1074, support a bail 1077 (see particularly FIG. 20) which is effective to control the engagement of the clutch members 713, 714 which comprise the driven and driving components of clutch 711 previously mentioned. Preferably, the bail 1077 is formed as a comb, the teeth of which engage approximately half of an annular notch 1078 formed in the collar of driving member 714 (see also FIG. 10). Thus, the rocking of the bail 1077 from operation of the cam 1068 and the linkage, comprising the cam follower 1071, link 1073 and lever 1074 (the latter rocking counter-clockwise in FIGS. 2 and 20), is effective to move the driven members 714 forwardly on the circular forward portions of the square, or selection, shafts 222. When the driving member 714 is so positioned, the teeth thereon engage the notches of the driven member 713, which, it will be recalled, are pinned to the respective shafts 710, thereby effecting a driving connection between the selection shafts 222 and the storage drive shafts 710. Thus, whatever values are subtracted from the accumulator dials 71 by operation of the actuating mechanism under control of the sensing mechanism, described under subsection (d) above, enter like values into the coordinal storage dial 701. It can be mentioned that the gear train between shaft 710 and the coordinal dial 701 is so arranged that the unidirectional rotation of shafts 222 and 710 enters the values additively into the storage dial 701.

The clutch control bail 1077 is resiliently biased to an inoperative position, shown in FIG. 2, by means of a relatively strong spring 1079 tensioned between a seat formed in the lower arm of the lever 1074 and a shaft 1448. By this means, the follower roller 1072 is maintained in engagement with the periphery of the cam 1068, and the clutch 711 held disengaged at all times, except when the program shaft 851 is in its 180° position. In this condition, the lobe 1070 of the cam will be in engagement with the follower roller 1072, and as the shaft 851 is locked in this position for the five machine cycles necessary to effect the transfer of values, the clutch 711 will be held engaged for this period.

It can also be noted here that the cam 1068 carries a roller 1084 on the right-hand face thereof, which roller is adapted to engage the nose 1086 of a cam follower arm 1085 about midway in the cycle in which the cam 1068 rotates from its 180° position back to its "0," or full-cycle, position. This return of the program shaft 851 and the cams mounted thereon, including cam 1068, takes place immediately following the five cycles required for the transfer operation. This cam-operated mechanism is effective to operate a second clutch dog controlled by the operation of the "Storage to Keyboard" key 1400 which is used to set a stored value from the storage dial 701 into the selection mechanism. This mechanism will be described hereafter in detail under Section V, entitled "Transfer From Storage To Selection," but this much has been mentioned at this point because it is possible in the preferred form of my invention to depress the "Storage to Keyboard" key 1400 simultaneously with the "Product Storage" key 700 or the "Quotient Storage" key 1240. In this situation, the operation of the "Storage to Keyboard" key operates a first clutch pawl which controls this one cycle of operation, but operation of the clutch is blocked by a second clutch pawl which is operated by the follower 1085.

(g) *Lock Carriage and Condition Register Clearing Mechanism (FIGS. 9, 13, 15 and 27).*—The seventh cam 1091 mounted on the program shaft 851 preferably lies immediately to the left of the secondary, or 180°, clutch 846 (to the right as shown in FIGS. 9 and 27). This cam is utilized primarily to condition the register clearing mechanism for operation in the cycle following completion of the transfer operation, but also serves to lock the carriage in position during the five machine cycles of the transfer operation. This cam is formed as an eccentric, the profile of which is shown in FIG. 15. It is adapted to positively rock its follower in one direction as the program shaft 851 and cams are rotated from the "0°" to the 180° position, and to positively rock the follower in the opposite direction as the shaft and cam return to their full-cycle position after the completion of the transfer operation. The follower associated with this cam is formed as a pronged bell-crank member 1092 pivotally mounted on a short shaft 1093 extending between the left-hand frame plate 82 and an intermediate bracket 90, as shown in FIG. 9. The lower arm of this bellcrank follower is divergently pronged, the extremities of the two prongs carrying follower rollers 1094 and 1095 which engage the periphery of the cam in substantially diametrically opposed positions. The upper arm of the follower bellcrank 1092 is pivotally connected to an upwardly extending link 1096 by any suitable means, such as long spacer pin 1097 (see particularly FIGS. 9 or 27). The upper end of the link 1096 is pivotally connected to a transversely extending, two-armed centralizing lever 1098 pivotally mounted on the rear crossbar 87 as by stud 1099. It is obvious that the rotation of cam 1091 (the cam being shown in its full-cycle position in FIG. 15 and rotating in a clockwise direction) is operative at about the midpoint of the shaft setting cycle (as it moves from its "0°" to its 180° position) to pull the link 1096 downwardly and thereby rock the two-armed lever 1098, clockwise as viewed from the rear as in FIG. 9.

The rocking of the centralizing lever 1098 is effective directly to centralize the carriage B in the proper ordinal position, and to lock it in that position throughout the five-cycle transfer operation; and to condition the register clearing clutch for operation in the cycle in which the programmed shaft 851 and cam 1091 return from the 180° position to the full-cyle position shown. This is the cycle following the series of five transfer cycles, previously mentioned, the actual register clearing taking place in the next succeeding cycle. As an incidental feature of the register clearing operation, the latch 745 (see FIG. 25), which holds the control link 738 in its operative position, is released. These operations will now be described in order.

The centralizing and locking of the carriage B is readily accomplished by providing the right end of the lever 1098 (the left end in FIG. 9) with a pair of ordinally spaced notches 1100 with slightly divergent cam-shaped mouths. These notches 1100 are adapted to engage pins 488 carried on the teeth of the carriage shifting rack 487, previously described. It is obvious that as the centralizing lever 1098 is rocked (clockwise in FIG. 9) by the rotation of cam 1091 from its "0°" to its 180° position, the notches 1100 will engage the respective pins 488, thereby holding the register locked in that ordinal position so long as the centralizing lever 1098 is held in its rocked position. The lever, of course, is held in a rocked position throughout the five cycles required for the transfer operation and is not released until that program has been completed and the shaft and cam complete their revolution to their full-cycle position.

The linkage for conditioning the register clearing mechanism for operation at the end of the transfer program is shown primarily in FIGS. 9 and 13. As shown in FIG. 9, a vertically extending link 1105 is pivotally connected to the right arm of the locking lever 1098. The lower end of this link is formed with a forwardly offset lower arm, as shown in FIG. 13, in order to extend forwardly and around shaft 842, previously mentioned. The lower end of this link carries a pin 1106 which is embraced within a slot 1107 formed in the forwardly projecting extension 1108 of the left arm of a bail 1109 (to the right in FIG. 9). A spring 1110, tensioned between the pin 1106 and a seat in a nose on the projection 1108, resiliently maintains the pin-and-slot in the position shown, but permits relative movement between the link and bail upon the initiation of the shifting operation. The right-hand leg of the bail 1109 is formed with an upwardly projecting extension 1111 which carries a laterally projecting pin 1112. This pin is embraced within an offset slot 1113 adjacent the rear end of a slide 1115. The slot 1113 is formed with a forwardly facing shoulder 1114 against which the pin 1112 may be latched. A spring 1116, tensioned between the pin 1112 and a seat formed on the rear end of the slide 1115, holds the pin 1112 resiliently against the rear end of the slot 1113. The forward end of the link is notched at 1117 to embrace the digitation control shaft 230 and thereby maintain the forward end of the link in its proper position. Rearwardly of the slot 1117, the link is provided with a shoulder 1118 adapted, on rearward translation of the link, to engage the clear clutch control plate 433, and thereby cause engagement of the clear clutch previously described.

The downward translation of link 1105, resulting from the rocking of the locking lever 1098 from the operation of cam 1091 as the cam goes from its "0°" to its 180° position, obviously rocks the bail 1109 (counter-clockwise in FIG. 13). This causes the pin 1112 to move forwardly in slot 1113 against the force of spring 1116 until the pin passes the shoulder 1114. Thereupon, the spring 1116, which has a downward component on the rear end of the link 1115, causes the shoulder to drop over the pin and thereby latch the slide forwardly and downwardly, which will condition the mechanism to engage the clutch control rod when the cam rotates back to its full-cycle position. At the 180° position, the link, or slide, 1115, is latched to the bail, so that when the bail is rocked in the opposite direction, the slide will be moved rearwardly. This happens, of course, when the cam 1091 rotates from its 180° to its full-cycle position, thereby lifting link 1105 and rocking the bail 1109 (clockwise in FIG. 13). This rearward translation of the slide 1115 causes the shoulder 1118 to engage the clear clutch control plate 433 and thereby engage the clear clutch as the programmed control shaft 851 rotates from its 180° position to its full-cycle position following the five-cycle program above-mentioned.

The dropping of the rear end of the slide 1115 conditions a restore mechanism, which will be effective, after the clearing cycle is initiated, to restore the slide to the position shown in FIG. 13. It is seen in both FIGS. 9 and 13 that an ear 1123 is formed on the upper and rearward end of the slide 1115. This ear is embraced within a slot 1124 formed in the lower left-hand end of a semicircular, or L-shaped, rocker 1125, as seen in FIG. 9. This rocker is pivotally mounted on the rear mounting bracket 442 by any suitable means, such as pivot stud 1126. The dropping of the rear end of the slide 1115, as the spring pulls the shoulder 1114 into engagement with the pin 1112, rocks the semicircular rocker 1125 (clockwise in FIG. 9). In this position of the rocker, a pin 1127, mounted on a cam 1128 mounted on the clearing cam shaft 441, engages the lower edge of the upwardly extending arm of the semicircular rocker 1125, thereby rocking it in the opposite direction (counter-clockwise in FIG. 9). This cam, as well as the clear cam previously described, rotates after the clear clutch has been engaged following the completion of the transfer operation and hence occurs after the bail 1109 has returned to its normal, or full-cycle, position, such as that shown in FIG. 13. The rocking of the semicircular rocker from the pin 1127, of course, lifts the rear end of the slide 1115 through the effect of the slot 1124 on ear 1113, thereby lifting the shoulder 1114 away from pin 1112 and against the force of spring 116. As soon as this happens, the spring 1116 pulls the slide to its forward inoperative position shown.

Preferably, a positive means is provided to restore the clear clutch to its inoperative position during the clearing cycle so as to positively disengage the clear clutch and limit the clearing operation to a single cycle. A simple means for this purpose is shown in FIGS. 9 and 13. It is seen in FIG. 9 that a bellcrank 1133 is pivoted on the rear bracket 442, adjacent the cam 1128, by any suitable means, such as pin 1134. One arm of this rocker carries a pin 1135 which is held in engagement with the peripheral edge of the cam 1128 by some suitable means, such as spring 1136. The other arm of the bellcrank is provided with an oblique leg, or cam face, 1137 adapted to engage the rear end of a pin 1138, slidably mounted in the rear cross plate 87 and the auxiliary bracket 442. This pin is resiliently biased to its rearward position, as shown in FIG. 13, by any suitable means, such as compression spring 1139 concentrically seated on the pin between a shoulder, not shown, and the crossbar 87. In the normal position of the cam illustrated in FIG. 9, the cam face 1137 lies laterally adjacent the rear end of the pin 1138. However, after the cam 1128 has rotated slightly more than 180°, the pin 1135 rides off the high lobe of the cam, whereupon the spring 1136 rocks the bellcrank follower 1133 (clockwise in FIG. 9). This movement of the cam follower 1133 causes the oblique cam face 1137 to force the pin forwardly (to the left in FIG. 13) so that it engages the clutch control member 433 and positively forces it forwardly to its clutch-disengaging, or inoperative, position. By this means, the clear clutch is positively disengaged at a point slightly past the midpoint of the clearing cycle, thereby positively limiting the clearing operation to one cycle.

Preferably, I provide means operated by the clearing mechanism for positively disabling the latch 745 (FIG. 25) which holds the transfer control link 738 in its rearward and operative position, thereby enabling the return of the key 700 to its normal raised position and permitting the machine to come to rest. The mechanism for this purpose is shown particularly in FIG. 9. It is seen in this figure that a link 1143 depends from the lower arm of the bellcrank 445 which comprises the cam follower for clear cam 444, and the operating interponent between that cam and the clearing slide 449 already described. Conventionally, this follower is a single armed lever pivoted at its lower extremity, but in my invention I prefer to modify it to form a bellcrank so that the rocking of the follower from the cam 444 (the follower moving to the left or counter-clockwise when viewed from the rear, as in FIG. 9), will lift the link 1143 just mentioned. The lower end of this link is pivotally connected to a forwardly extended portion of the left-hand leg of bail 1144. Thus, the lifting of the link 1134, resulting from operation of the clearing arm 445, will rock the bail 1144 (clockwise if viewed from the right-hand side of the machine as in FIG. 25). A vertical link 1145 is pivotally connected to a rearwardly extending projection of the right-hand leg of the bail 1144, as shown in FIG. 25, so that the lifting of link 1143 causes a corresponding depression of link 1145. This link carries a long pin 1146 extending to the right from the lower end of the link, as shown in FIGS. 9 and 25. The pin 1146 will engage the rear end of the latch lever 745 when that lever is in its latching position indicated by the phantom lines shown in FIG. 25. Thus, the depression of link 1145 is effective to rock latch 745 to its releasing position, thereby enabling the control link 738 to move to its original inoperative position which it occupied prior to the depression of the key 700. Incidentally, the link 1145 can be held against lateral movement by the simple means shown in FIG. 25, which comprises a pin 1147 on the link which is embraced within the long slot 1148 formed in the auxiliary bracket 566.

(h) *Counter Sensing Control (FIGS. 9, 27 and 35).*—
The eighth cam 1155, affixed to the program shaft 851, is effective in transfers from the counter to the storage register, such as initiated by depression of the "Quotient Storage" key 1240. This sensing mechanism shifting cam 1155 is seen in profile in FIG. 35, and comprises a circular plate with a high lobe starting about 90° from the full-cycle position shown in this figure. The periphery of this cam is engaged by a roller 1156 rotatably mounted near the rear end of a rocker arm 1157. This rocker is pivotally mounted on the auxiliary frame plate 90, as by screw stud 1158; and the roller 1156 is resiliently biased into engagement with the periphery of the cam by any suitable means, such as the spring 1159 tensioned between a seat on the forward arm of the rocker 1157 and a stud on the frame plate as shown. In the transfer operation here under consideration, i.e., one initiated by depression of the "Product Storage" key 700, the rocker arm 1157 is latched against rocking from the force of spring 1159 by a suitable hook latch 1160 formed as an extension of the left-hand leg of bail 1161 engaging a pin 1162 mounted on the rear end of the rocker arm 1157. This bail is affixed to shaft 973 which is rocked by the rotation of cam 1084 when machine operation is initiated by depression of the "Quotient Storage" key 1240, the right end of the bail being pivotally mounted on a screw stud 1163 threaded into plate 90 and axially aligned with shaft 973. Normally, however, the bail and shaft 973 on which it is fixed, are maintained in the angular position shown in FIG. 35 and rocker 1157 is thereby latched against operation.

(i) *Operate Gate Centralizer (FIGS. 9, 27 and 36)*—
The ninth cam 1170 on the cam shaft 851 is utilized to restore the digitation control shaft 230 and hence the gate 228 to its neutral, or inoperative, position at the end of five cycles of a transfer operation. This centralizing cam 1170 is pinned to, or otherwise rigidly secured on, the program shaft 851 adjacent the left end thereof. As shown particularly in FIGS. 27 and 36, this cam is, in effect, simply an arm secured to the shaft, for it is formed as an extremely high and sharply pointed lobe in approximately the full-cycle position of the parts. When in the full-cycle position, as shown, this cam has just passed operative engagement with its follower roller 1171, the shaft 851 and cam rotating in a counter-clockwise direction in these figures. Thus, the rotation of the cam 1170 has no effect on the follower roller 1171 during the cycle in which the shaft 851 moves from its "0°" to its 180° position, nor while the shaft is in that position. However, in the cycle in which the shaft 851 is returned to its full-cycle position and just before the end of that cycle, the lobe of cam 1170 engages roller 1171, thereby rocking the follower rocker 1172 on which the roller 1171 is mounted (in a clockwise direction in these figures). The rocker 1172 is pinned to, or otherwise rigidly secured on, a short shaft 1173 journalled in bearings in the intermediate frame plate, or bracket, 90 and the left-hand control plate 89. The upper end of the rocker 1172 carries a pin 1174 which engages either a shoulder 1175 or a notch 1176 adjacent the rear end of a centralizing lever, or rocker, 1177. This centralizing lever is mounted on a second shaft 1178 extending between the intermediate bracket 90 and the left-hand control plate 89. A relatively strong spring 1179, tensioned between the rear end of the lever 1177 and the shaft 1173, strongly biases the lever to an operative, or gate-centralizing, position (counter-clockwise of that shown in FIG. 36). A notch 1180 formed in the forward end of the centralizer lever is adapted to engage a pin 1185 on the upper end of a lever 1186, pinned to, or otherwise rigidly secured on, the left end of the digitation control, or gate setting, shaft 230. The end of the notch 1180 adjacent the pin 1185 is chamfered to provide divergent cam faces 1181, whereby the rocking of the lever 1177 (counter-clockwise in FIG. 36) will cause one or the other of the cam faces to engage the pin 1185 if the shaft 230 is out of its neutral, or centralized, position. The spring 1179 is sufficiently strong, upon such engagement, to cause the cam faces 1181 to cam the pin 1185 into the central, neutral position in which the pin will be seated at the bottom of the notch 1180.

Normally, the centralizing lever is latched in the position shown in FIG. 36 in which the pin 1174 on the upper end of the cam follower 1172 is in engagement with the shoulder 1175. However, when the cam 1170 kicks the lower end of the follower rocker 1172 outwardly (clockwise in this figure), the pin 1174 will register with notch 1176. Thereupon, the spring 1179 will rock the centralizer lever 1177 to cam the pin 1185 and its arm 1186 into the centralized position in which neither the plus nor minus gears engage with the dial shaft gears.

The centralizing lever 1177 is returned to its normal, in operative position, and the lever 1172 is returned to its latching position in which the pin 1174 engages the shoulder 1175, immediately thereafter. This is caused by a pin 1213 mounted on the inner face of a compound drive gear 1210 affixed to the left-hand end of the main drive shaft 255. Immediately after the cam 1170 has operated the centralizing mechanism to centralize the gate setting shaft 230, the pin 1213 engages the forward end of a link 1215, the rear end of which is pivotally mounted on an arm 1216 affixed on the left-hand end of the shaft 1173. The forward end of the link 1215 is supported by a suitable pin-and-slot mounting, including the slot 1217 in the forward end of the link, engaging a pin 1218 mounted on the frame plate. In the normal position of the centralizing mechanism in which the pin 1174 engages shoulder 1175, the forward end of link 1215 is retracted and is not engaged by the pin 1213. However, when the cam 1170 operates the centralizing mechanism, the link 1215 is projected forwardly by the rocking of lever 1172, and thereupon the forward end of the link lies in the path of travel of pin 1213. Thus, the centralizing mechanism is operated at the proper time and is immediately returned to its latched, and inoperative, position.

It is obvious that this centralizing operation takes place just as the shaft 851 returns to its full-cycle position, which occurs in the machine cycle following the five-cycle transfer program already mentioned. It is returned to its normal, and inoperative, position immediately afterward by means described in the next subsection.

*(j) Five Cycle Program Control (FIGS. 9, 27 and 36).*—The tenth cam 1190 on the program shaft 851 controls the five-cycle program necessary in the present embodiment to effect the transfer of values from the product register into the storage register. In my preferred embodiment, the program cam 1190 is pinned to, or otherwise rigidly secured on, the extreme left end of the program shaft 851. The profile of this cam is best shown in FIG. 36 and comprises a circular plate cam with a lobe 1191 with a sharply rising leading edge and a gradually receding trailing edge which extends over an angle of about 90°. A follower roller 1192, mounted at an intermediate point of a cam follower lever 1193, engages the periphery of the cam 1190, lying against the leading face of the lobe 1191 when the cam is in its full-cycle position, as shown in FIG. 36. The initial rotation of the cam, or program, shaft 851, and consequently the cam 1190, causes the lobe to rock the follower lever 1193 (clockwise in this figure) against the retracting force of a spring 1195 tensioned between a seat on the upper arm of the follower and an ear formed on the left-hand control plate 89. The follower lever 1193 is pivotally mounted on the left-hand control plate 89 by any suitable means, such as broad-headed stud 1194. The upper end of the follower arm 1193 is pivotally connected to a forwardly extending link 1196, the forward end of which is slotted to embrace a pin 1197 riveted to, or otherwise secured on, the control plate. The forward end of this link is provided with an upwardly facing cam edge 1198 adapted to engage a pin 1205 on a mutilated counting gear 1200. It is obvious from FIG. 36 and the above description that, in the first few degrees of rotation of shaft 851 and cam 1190, the link 1196 is kicked forwardly, whereupon the cam face 1198 engages the pin 1205, camming it and its gear 1200 (in a clockwise direction in FIG. 36) and that the link will remain in this position to hold the gear in its rocked position long enough for the gear to be engaged by the teeth of a mutilated gear 1210 mounted on the main drive shaft 255 which, incidentally, is rotating at twice the speed of the shaft 851.

The mutilated counting gear 1200 is pivotally mounted on a stud 1201 riveted to, or otherwise secured on, the control plate 89. Actually, this gear is a compound gear having an outer plate upon which are formed six pairs of equiangularly spaced teeth 1202; a separating detent plate 1203 and a second gear plate, not shown, but having a radius equal to the outer gear plate 1200 upon which are formed five teeth 1204 located at intervals of 60° throughout a portion of the periphery of the gear plate. These teeth 1204 are located one tooth-space angularly in advance of the pairs of teeth 1202 on the outer gear plate 1200, there being no tooth 1204 in the full-cycle position of this compound mutilated gear. These two gears and the intermediate detent plate 1203 are riveted together so that they operate as a single compound gear, the inner plate carrying the pin 1205 which is engaged by the forward end of link 1196.

The counter gear assembly 1200 is driven by a driving gear assembly 1210 which is rigidly mounted on the extreme left end of the main drive shaft 255. The driving gear assembly comprises two single-tooth gears, separated by a spacing plate lying in the plane of the detent plate 1203. The outer of these gears, as shown in FIG. 36, has a single tooth 1211, in front of which is a toothless space 1214 equivalent to the width of approximately two teeth and the balance of the gear having a diameter equal to the extreme diameter of the tooth 1211, whereby the balance of the plate acts with the space between sets of teeth on counting gear 1200 as a Geneva wheel and block which positively prevents rotation of the compound counting gear assembly, except when the teeth thereof are in engagement with the teeth of the driving gear 1210.

The interior gear plate of the compound gear assembly 1210 has a single tooth 1212, one tooth-space in advance of the tooth 1211, as shown in this figure. This second tooth 1212 is adapted to engage the inner tooth 1204 of the compound driven gear assembly 1200, after the latter has been driven to its first counting position, but is ineffective in the home position of the driven gear assembly 1200, for in that position it will be recalled that there is no tooth 1204. Thus, in other than the transfer operations, the driving gear assembly 1210 will rotate freely, without engaging the driven gear 1200. In fact, the outer plate of the driving gear assembly 1210 forms a Geneva block with the outer plate of the assembly 1200, as shown, thereby blocking improper rotation of the driven gear during other machine operations. In this position, the gear tooth 1211 of the outer plate of the driving gear assembly will be ineffective to engage a tooth on the respective driven gear. However, when the driven gear assembly 1200 has been rocked by the effect of the cam on the forward end of link 1196 and its engagement with the pin 1205, the gear tooth 1211 will engage in the interdental space between the pairs of teeth 1202 on the driven plate 1200 and therefore rotate the driven gear through an angle of 60°. In the following cycles, the inner tooth 1212 will engage the inner tooth 1204 and therefore effect the necessary rotation of the assembly to permit gear tooth 1211 to engage in the interdental space between the pairs of teeth 1202.

The detent plate 1203, previously mentioned, is provided with six equally spaced detent notches 1206. In addition, there is a seventh notch 1207 in the periphery of this detent plate immediately adjacent the home position notch 1206, as shown in FIG. 36. A detent roller 1220, mounted on a detent arm 1221, engages the periphery of the detent plate 1203 and seats in the notches 1206 or notch 1207 to hold the plate in any adjusted position. The detent arm 1221 is pivotally mounted on the frame plate by any suitable means, such as screw stud 1222; and is biased into engagement with the detent plate 1203 by a suitable spring, such as the tension spring 1223 tensioned between a seat in the rear end of the arm and the stud 1197, previously mentioned. Thus, when the link 1196, through its engagement with pin 1205, cams the driven gear assembly 1200, the roller 1220 engages the first notch 1206 immediately adjacent the home notch 1207 to hold the gear assembly in the cammed, or adjusted position. In this position, the single tooth 1211 of the driving gear assembly engages the interdental space between the pair of teeth 1202 on the outer plate of the driven gear assembly and rotates the gear through an angle of 60°. This first partial rotation of the driven gear assembly takes place in the cycle in which the program 851 and the cams thereon, including cam 1190, are rotated from the "0°" to the 180° position. Thereafter, the inner tooth 1212 of the driving gear assembly engages its corresponding tooth 1204 of the driven gear assembly to initiate a 60° rotation of the driven gear assembly, which 60° rotation is completed by the engagement of tooth 1211 with the pair of teeth 1202 to drive the driven gear assembly through the remainder of the angle of 60°. Thus, the driven gear assembly 1200 is effective to rotate through five increments of 60° each in the succeeding five cycles to return the driven gear assembly to its full-cycle, or home, position, shown. Just before this gear assembly returns to its home position, the pin 1205 engages a cam face 1228 on the forward end of a second link 1229 located adjacent the first link 1196 on pin 1197. This second link is supported at its forward end by a slot 1230 which embraces the pin 1197, and at its rear end is pivotally mounted on an arm 1231 which is pinned, or otherwise rigidly secured on, the extreme left end of the clutch control shaft 854, already described in connection with FIGS. 27 and 28. Thus, the return of a counter gear assembly 1200 to its full-cycle position rocks the clutch control shaft 854 that controls the positioning of the 180° clutch pawl 853, to disengage the pawl from the dog 845. Thereupon, the program control shaft 851 and the cams mounted thereon, are rotated from the 180° position to the full-cycle position shown in the various figures. This rotation of the program shaft, it will be recalled, initiates the operation of the clearing clutch already described. As the program shaft 851 returns to its full-cycle position, the first clutch pawl 843 engages the clutch dog 845 and the program mechanism comes to rest in its full-cycle position. The machine, however, continues to cycle for the clearing operation, as already mentioned.

7. *Terminate Operation and Clear Registers (FIGS. 9, 27, 28 and 36)*

This second step of rotation of the program shaft 851, and all of the cams mounted thereon, is effective, through the mechanism described in connection with the sixth, or storage register clutch cam 1068 to, among other things, return the storage register clutch gate 1077 to its neutral position; through the mechanism described in connection with the seventh, or carriage clear, cam 1091 to release the carriage block and initiate operation of the clearing mechanism; and through the ninth, or gate centralizing, cam 1170 operates the gate centralizer to positively restore the digitation control gate to its neutral, or inoperative, position. It should also be mentioned, in connection with the return of the clutch gate 1077 controlled by cam 1068, that the latch on the storage cam clutch is released to permit the "Storage Keyboard" operation if the key 1400 has been depressed simultaneously with the depression of the "Product Storage" key 700.

The operation of the machine in a register clearing phase occurs in the second cycle following completion of the transfer program. It will be recalled that the link 1229 is cammed rearwardly (FIGS. 27 and 36) to release the second clutch dog 853 (FIG. 28) late in the fifth cycle of the transfer operation. However, the clutch does not become operative until the end of that machine cycle, for the clutch ratchet 848, as shown in FIG. 28, has only two teeth and hence can engage the tooth of the clutch dog 845 only in the "0°," or full-cycle position, or in the 180° position, either of which constitutes the full-cycle position of the main drive shaft 255. Thus, the clutch 846 does not become operative until the fifth cycle of the transfer operation has been completed. The shaft 851 returns to its full-cycle position in the first succeeding machine cycle, which return conditions the clearing clutch for operation at the end of that cycle. The second succeeding cycle is therefore utilized to clear the registers through the clearing mechanism previously described.

It will be recalled that the rocking of the clear operating arm 445 (FIG. 9), which occurs during the clearing operation, through the linkage comprising the link 1143, bail 1144 and link 1145, is effective to release latch 745, as previously described. Thus, the clearing cycle is effective to release the latch 745 and hence permit the control link 738, and hence key 700, to return to their original, inoperative positions. This terminates the machine operation and the machine comes to rest at the completion of that cycle of operation.

8. *The Transfer Operation*

The depression of the "Product Storage" key 700 is effective to initiate cycling of the machine by means of the mechanism shown in FIGS. 24 and 7, which mechanism alone would be sufficient only to cycle the machine once and then terminate operation. This initial cycling is accomplished by the rocking of arm 757 and shaft 758 (FIG. 24) which, through the medium of arm 767 and link 768 (FIG. 7), pulls the lower end of the rocker 773 forwardly. As soon as the shoulder 794 on the lower end of this rocker rides over the roller 793 of springpowered member 790, the roller becomes effective, through its engagement of cam edge 794, to move the rocker to its operative position. This rocker, through translation of link 775 and the latter's engagement with ear 280a of the power control slide 280 (FIGS. 7 and 6), is effective to engage the main power clutch and close the motor switch. It will be recalled that link 775 is restored to its normal latched position by means of roller 789 on gear 781 at the end of that first cycle of operation, so that the operation of the machine tis no longer under the control of link 775.

Simultaneously, with the operation of the motor drive from the rocking of shaft 758, the depression of the key has rocked the arm 734 of bail 735 (FIG. 24). The rocking of this arm, through the effect of pin 739 upon arm 740, has rocked shaft 736. The rocking of this shaft, through the effect of arm 866, link 867 and rocker 868, has pulled the primary clutch control link 871 forwardly. The rear end of this link 871 is connected to the clutch pawl 873 (FIG. 30), so that the forward translation of the link has released the primary auxiliary clutch dog 880. This occurs simultaneously with the engagement of the main drive clutch, so that, immediately upon the initiation of machine operation, the clutch 848, 881 begins to rotate, thereby rotating cams 901 and 881 simultaneously therewith. Rotation of the cam 901 (FIG. 31) rocks follower lever 905 which, through lever 909 (FIG. 9) and lever 916, which are latched in adjusted position by latch 745 (FIG. 25), continue machine cycling until the latch is released during the clearing operation. It will be recalled that the clutch ratchet 847 is driven at half the speed of the main drive shaft, so that two cycles of machine operation are required to rotate the clutch driven members 881 and 901 back to their full-cycle position. During these two cycles of operation, the main keyboard has been released through the effect of pin 925 on cam 901 which rocks the follower lever 926, thereby pulling the keyboard release link 928 rearwardly. This translation of the link rocks the two-armed lever 929 (FIG. 10), which, in turn, rocks the arm 931 attached to the keyboard clear shaft 131, so that the keyboard is immediately released. Simultaneously, the long, gradually rising lobe of cam 881 has slowly rocked its follower 936 (clockwise in FIG. 30) to pull the storage dial clear link 937 rearwardly. This link, through its operation of bellcrank 938 (FIGS. 10 and 24), and its connection through link 940 with the storage dial clear racks 861, has translated these racks to the left. These racks, through their engagement with the mutilated clearing gears 860, have returned all of the storage dials to their "0" position. At the end of the second machine cycle, the roller on follower 936 falls off the sharp shoulder 884 of the cam, whereupon the clear racks are snapped back to their normal, inoperative, position by spring means, not shown. Thus, the machine has been held in operation for two machine cycles during which time the keyboard has been cleared and the storage dials have been cleared. At the end of these two cycles, the rear end of link 871 has been cammed downwardly by the rocking of angular lever 932 (FIG. 31) by its engagement with pin 925 attached to cam 901. The primary auxiliary clutch pawl 878 is enabled to return to its blocking position and this clutch becomes disengaged—and remains disengaged throughout the completion of the cycle of operation.

Simultaneously, with the operation of the primary auxiliary clutch through the rocking of shaft 736, the rocking of the bail 735 has forced the control link 738 rearwardly (FIGS. 24 and 25). This link is latched in its rearward position by the latch 745 which also latches the switch control arm 909 in its effective position, thereby holding the motor and main clutch in operation. The rearward movement of this control link 738, through the engagement of the cam nose 800 with pin 580 of the conventional tabulating mechanism, has conditioned the tabulating mechanism for operation and simultaneously has rocked arm 801 and its shaft 803 (counterclockwise in FIGS. 25 and 7). The rocking of this shaft rocks the latch 805 (FIG. 7) so that it releases cam follower lever 947 for control by rotation of cam 945 and has also blocked operation of the conventional tabulating control member 629 and enabled operation of transfer control lever 815 in its stead. If the carriage is in the preselected ordinal position, as determined by depression of one of the ordinal tabulation control keys 76, the latch 622, which controls operation of the tabulation control lever 629 or transfer control lever 815, is moved to its releasing position, whereupon the control member, or trigger, 815 is released for operation in the latter part of that second cycle. If, on the other hand, the carriage is not in the position determined by the depressed tabulation control key 76, the machine goes into a tabulating operation, which continues until the desired carriage position is reached. The operation of the power control member 815 rocks the secondary clutch control shaft 842, thereby clutching the program control shaft 851 to its drive and rotating it from its "0°" to its 180° position. Such rotation of the program shaft, through the various cams mounted thereon, does the following: (a) cam 945 actuates the gate setting lever 947 to put the digitation control gate in its subtract position; (b) the second and (c) third cams 955 and 967 control operating mechanisms related to the "Quotient Storage" transfer and play no part in the present operation; (d) cam 980 rocks the sensing control bail 991 (FIGS. 25, 17 and 32 to 34) to enable the sensing mechanism, which mechanism senses a "0," "1" or "2" value in the aligned register dials and controls the amount of digitation in each order throughout the next five cycles; (e) cam 1043 enables the selection locking levers 1055 to fall into blocking position, whereby they can latch the respective selection slides 210 in a "0" or a "1" value position; (f) cam 1068 operates the clutching mechanism which clutches the square selection shafts 222 to their respective storage dial drive shaft 710 (FIGS. 2 and 20); (g) cam 1091 latches the carriage in the proper ordinal position and positively holds it against any shifting movement during the five transfer cycles, and conditions the clearing mechanism for operation in the second cycle following completion of the transfer operation (FIGS. 9, 15 and 13); (h) counter sensing control cam 1155 controls a mechanism utilized in transfers from the counter only, and thus remains inoperative in the present operation; (i) the gate centralizer cam 1170 also remains inoperative during this phase as it becomes effective only as the program shaft 851 returns to its full-cycle position; and (j) the program control cam 1190 initiates the five-cycle program for transferring the value from the register to the storage dials, so that five cycles are counted by the gear mechanism shown in FIG. 36. These cams all stay latched in this position through the five cycles in which the counting gear assembly 1200 is counting out the five cycles. The counting gear assembly is effective in the fifth of such cycles to release the second pawl of the program, or second auxiliary, clutch for the second step of operation in which it, and the program shaft, goes from its 180° position to its full-cycle position. This operation of the clutch returns the cams to their full-cycle position in this sixth cycle of operation, which is effective to initiate operation of the clearing mechanism in the next cycle and is also effective to operate cam 1170 to temporarily operate the gate centralizer so that the gate is positively restored to its neutral, or inoperative, position prior to the clearing operation.

During the seventh, or clearing, cycle, the operation of the clearing mechanism is effective to release the latch member 745, whereby the control link 738 is enabled to return to its forward inoperative position and the machine comes to rest at the end of that cycle.

III. TRANSFER FROM COUNTER TO STORAGE

The transfer of a value from the counter, or quotient register, is accomplished by the same mechanisms, and in the same type of operation, with one important exception. In this operation, the counter actuators are rocked forwardly (counter-clockwise when viewed from the right, as in FIGS. 2 and 13, or clockwise, as viewed from the left, as in FIG. 11), so that the counter actuating fingers 305 are enabled to mesh with the gears 307 on the forward end of the counter dial shafts. In this operation, all of the fingers 305 mesh with all of the gears 307 aligned with the actuators to effect an entry of a value of "1" subtractively from the counter in each cycle of operation. In this operation, the counter dials are not returned to "0" and operation then stopped, for these dials are not operated by the digitation actuators. In this operation, the value of "1" is entered five times subtractively, so that these values in each order at the end of the operation are "5" less than they were at the start, and if the values were less than "5" at the beginning, they will have gone through the "0" position to register values from "6" to "9," inclusive. Further, if the value in any order stood at "0" at the start of the operation, at the end the value will be "5." Hence, the values in the counter register are completely inaccurate and must be cleared before the next operation. For this reason, means is provided in this mechanism to clear the counter register regardless of the setting of the counter clear knob 75.

During these subtractive operations, the actuators are set for values of "0," "1" or "2" as is required by the value to be transferred, so that values are being entered into the storage register 701 in like increments. For this purpose, the counter dial shafts 300 (see particularly FIGS. 16 and 17) carry a value cam representative of values of "0" extending through 36°, or an angle equivalent to one digit space on the counter dial; of a value of "1" extending through an angle of 180° or equivalent to the angle required for the values of "1" to "5," inclusive; while the balance of the cam registers a value of "2," equivalent to the angle taken for the values of "6" to "9," inclusive. As the cam rotates to a value of "5" to "1" and then "0," the selection locking arms 1055, previously described, become effective to latch the selection slide of that order in its "1" or "0" position, thereupon eventually disabling the actuator drive for that order. Specifically, if a value of "0" stands in an order of the quotient register, the value sensing mechanism, which in this program senses the quotient, or counter, register cams rather than the product register cams, will be brought in their "0" position and the selection slides will not be moved during the five-cycle transfer phase. In that situation, the latching lever 1055 will drop to its fully operative position, indicated by "0" in FIG. 25, and block any operation thereafter of the aligned selection slide 210. Thus, the rotation of the cam from its "0" position to its "9" and on to "5" in the succeeding five cycles has no effect upon the selection mechanism, so that the value standing in the aligned order of the storage register will be "0." Similarly, if the value in any order of the quotient register stands at "1," the came of that order will register a value of "1" which will be set in the selection slide. The latching lever in this case will drop so that the second shoulder 1061 will engage the ear 1062 of the selection slide, whereupon the latching lever assumes the "1" position of FIG. 25. This blocks the lever from ever having a greater value, so that "1" will be subtracted in the first operative cycle. In that cycle, however, the counter dial will be rotated subtractively from "1" to "0" so that the sensing mechanism will be pushed to its "0" position and the coordinal selection slide will return to its "0" position. At that time, the latching slide falls to the second step to its "0" position and shoulder 1060 blocks any further operation of the selection mechanism, even though the counter dial would be rotated to its "6" position at the end of the program. Similarly, if a value of "2" stands in the quotient register, the sensing mechanism will sense the portion of the cam representative of a value of "1," so that that value will be entered into the corresponding order of the selection mechanism (as the "1" value portion of the cam extends over an angle of 180°, or five digit spaces utilized for values of "1" to "5"). Thus, in the first two cycles of operation, the value of "1" will be added into the storage register, while a value of "1" is subtracted from the quotient register dial aligned therewith. At this time, the dial returns to its "0" position, thereby moving the sensing slide to its "0" position, whereupon the selection slide 210 becomes locked in its inoperative position and the rotation of the counter dial to the "9," "8" and "7" positions, consecutively, will have no effect upon the registration in the coordinal order of the dials. Similarly, the transfer of values "3," "4" and "5" will be accomplished by the addition of values of "1" into the aligned orders of the storage dials until the counter dial returns to "0," and then further entry of values is blocked in the succeeding cycles. If the value in any order stands at "6," the sensing mechanism will sense the lobe of the cam corresponding to a value of "2," which lobe extends over four incremental spaces corresponding to the values of "6" to "9" on this counter dial. Hence, in the first cycle of operation, a value of "2" will be entered into the corresponding order of the storage register while "1" is being subtracted from the counter dial. At this point, the cam rotates so that thereafter the sensing mechanism senses the "1" portion of the cam, whereby the value of "1" will be added to the storage dials, i.e., a value of "6" is transferred by inserting "2" in the aligned storage dial in the first cycle and "1" each in each of the four succeeding cycles. Similarly, the transfer of a value of "7" from the counter dials to the storage dials is accomplished by entering the value of "2" into the aligned storage register in the first two cycles, followed by three cycles in which the value of "1" is added; while the value of "8" will be transferred by three cycles in which the value of "2" is entered into the storage register followed by two cycles in which "1" only is entered; and a value of "9" is transferred by entering "2" into the storage register in each of the first four cycles of operation, and "1" in the fifth. By this means values are positively entered in the storage register corresponding to the value originally in the counter dials, although the counter dials are rotated an increment of "1" in each cycle of operation and at the end will register a value of "5" less than the original value with values of less than "0" being the complements of the true value.

In view of the fact that the operation of the interregister transfer mechanism for transfers from the quotient register, or counter, to the storage register is substantially the same as that of the product register, or accumulator, to storage, the operations being substantially parallel, with the exception of the mechanisms controlled by the second, third and eighth cams 955, 967, and 1155, respectively, the description of the mechanisms and operation will be broken down into the same subheadings as the previous section. These mechanisms will now be discussed in sequence.

1. Storage Register

The storage register per se is the same in both types of interregister transfer, and are driven through the same drive shafts 710 already described. It has been mentioned before that the interregister transfer operation here under discussion is parallel to that previously described. It is believed unnecessary to describe the storage register further.

2. Key Mechanism (FIG. 24)

The "Quotient Storage" key 1240 can be placed in any suitable position, but preferably is placed on the left-hand side in front of the storage register, as is shown in FIG. 1 and also in FIG. 24. This key is mounted on a key stem 1241 similar in all respects to the key stem 725 previously mentioned, slidably mounted in aligned slots in the cross plates 706 and 718 and biased to a raised position by a suitable spring, not shown. The lower end of this key stem is formed to provide an ear 1242 to which is riveted, or otherwise rigidly secured, a transverse pin 1243.

3. Main Clutch and Motor Control

The pin engages a slot in a forwardly extending arm, similiar in all respects to the slot and arm 760 and 757 described in connection with the "Product Storage" key 700. This arm is also rigidly secured on the shaft 758, so that the depression of the "Quotient Storage" key is effective to initiate a single cycle of machine operation exactly the same as that described in connection with the "Product Storage" transfer operation.

4. Primary Auxiliary Clutch

The pin 1243 also is embraced within a slot 1249 formed on the forward end of a leg 1248 of a bail 1250. The arm 1248 preferably is similar in profile to that of arm 734, previously mentioned, although the bail 1250 is considerably longer than bail 735, as is shown in FIG. 24. This bail is pivotally mounted on shaft 736, the right-hand leg 1251 thereof lying immediately to the right of the right-hand leg 737 of bail 735, while the left-hand leg 1248 lies a considerable distance to the left of leg 734. The leg 1248 carries an inwardly directed pin 1252, similar in location to pin 739 on arm 734 but shown as directed in the opposite direction. This pin engages the forward edge of an arm 1253, pinned to, or otherwise rigidly secured on, shaft 736. Thus, the depression of key 1240 will rock the shaft 736 in the same manner and to the same extent as a depression of the key 700.

It will be recalled that the shaft 736 carries the arm 866 rigidly secured thereto, so that the rocking of the shaft 736 (counter-clockwise in FIG. 24), through the medium of link 867, rocker 868 and clutch control link 871, will be effective to rock clutch pawl 878 (see FIG. 30) to cause the engagement of clutch 848, 881. The operation of this clutch was described in subsection 4 of the previous section and therefore need not now be described in detail. However, it can be mentioned that the operation of this clutch, through the rotation of cams 881 and 901 (FIGS. 30 and 31), is effective to: (a) rock follower 905 which holds the main clutch and motor operative for the second machine cycle in which it is latched; (b) rocks the follower 926 which operates the keyboard release mechanism; and (c) slowly rocks cam follower 936 which, through two machine cycles, slowly operates the storage register clearing mechanism.

5. Initiate Operation of Tabulating Mechanism (FIGS. 2 and 24)

The right-hand leg 1251 of bail 1250 supports the forward end of a control link 1258, which is identical in shape to that of link 738. This link, as is true of link 738, carries an upwardly and rearwardly facing cam shoulder 1259 which, on rearward translation of the link from the depression of the "Quotient Storage" key 1240, engages pin 580 of the tabulating mechanism already described. Hence, the rearward translation of the link is effective to initiate a tabulating mechanism and the tabulating mechanism, in turn, will be effective to initate the transfer drive mechanism through the operation of the auxiliary trigger 815 (FIG. 6), already described.

The link is latched in its rearward, operative position by a latch 745a identical in shape and operation to latch 745 shown in FIG. 25 and described in subsection 5 of Section II. Reference is therefore made to that subsection for a description of this latch.

6. Transfer Drive Mechanism (FIGS. 2, 9, 12 and 22)

The rear end of the control link 1258 is pivotally connected to a leg 1260 of a bail 1261 that is pivotally mounted on the shaft 803. The right-hand leg 1262 of the bail 1261 (see FIG. 6) lies immediately adjacent the latch lever 805, previously described, as shown in FIG. 9. This leg carries a forwardly projecting latch control member similar in size and shape to the forward end of the latch lever 805. Hence, the rocking of the bail 1261 from the translation of the link 1258 engages ear 806 of latch member 807, rocking it downwardly, or counter-clockwise in FIG. 6, to disengage auxiliary member 815 and to latch the tabulation control member 629 in an inoperative position. Thus, in the cycle in which the carriage B reaches the desired ordinal position, or in the first machine cycle if the carriage is in the desired ordinal position at the start of the transfer operation, the auxiliary member 815 will be released and hence will rock sharply to rock arm 841, and hence shaft 842, and thereby cause engagement of the secondary auxiliary, or program, clutch 848, 846, as previously described. This engagement of the program clutch becomes effective in the cycle following the shifting of the carriage to the desired ordinal position, or in the second machine cycle if the carriage is in that selected position, whereupon the clutch 846 rocks program shaft 851. The driven member 846 of the clutch will rotate 180°, thereby rocking the program shaft 851 through the same angle. At this point, the secondary clutch pawl 853 will become operative to stop the clutch plate 846, and hence shaft 851, in the 180° position, as already described. This 180° of rotation of the shaft 851 obviously will rotate all of the cams mounted thereon through the same angle, and hence place the machine in condition to effect the transfer into the storage register. In the program presently under discussion, some of the cams which were ineffective in the program initiated by the "Product Storage" key 700, will be effective to control a transfer from the quotient register into the storage register, and conversely some of those effective in the first operation will be ineffective in this. The distinction between the parallel operations in this transfer program can best be understood by comparing the cams one by one, in the same sequence as before.

(a) *Gate Setting Cam 945 (FIGS. 7 and 26).*—The gate setting cam 945 shown in FIGS. 7 and 26, is ineffective in the "Quotient Storage" transfer. It will be recalled that the follower lever 947 associated with this cam is latched in its inoperative position by the latching hook 951 on the rear end of latch 805. However, this latch is not rocked in the present operation, so that the follower member 947 is not released and therefore cannot have any effect on the program series of operations. The cam 945 hence rotates idly in the operation presently under discussion.

(b) *Counter Actuator Cam 955 (FIGS. 7, 16 and 26).* —It was mentioned in the previous section, which described the "Product Storage" transfer, that a cam follower link 956 is associated with the cam 955, which is effective to condition the counter clearing mechanism for operation, regardless of the setting of the counter control knob 75. In the previous operation, i.e., "Product Storage," this follower link 956 was latched in its ineffective position by means of latch hook 961, pinned to the shaft 803, which is rocked by the "Product Storage" control link 738. In the normal position of the parts, this latch 961 is ineffective to engage the ear 960 on the lower end of the follower link 956. Hence, in the present operation, i.e., "Quotient Storage" transfer, the link 956 would be positioned in accordance with the position of the cam 955.

This link 956 is biased to an upward position by a relatively strong spring 959. In the normal position of the parts, the ear 960 on the lower end of the link engages the high point, or lobe, of cam 955, but as the cam rotates to its 180° position, the ear comes to the low point of the cam, thereby permitting the cam follower link 956 to rise to its extreme upper position. In this position, the upper end of the link 956 will engage a bail 1276 pivotally mounted on the carriage mounting shaft 239. This bail extends to the left from a position immediately adjacent the right end plate 240 of the carriage for a distance approximately the width of the keyboard, so that this bail will be engaged by the follower link 956 in any ordinal position of the carriage. The right leg 1277 of the bail 1276 is formed as a bellcrank with a forwardly projecting arm, as shown particularly in FIG. 7. A pin 1278, riveted to, or otherwise rigidly secured on, the leg 1277, projects through an arcuate slot 1279 (best shown in FIG. 26) in the end plate 240. The pin is embraced in a slot 1280 in the rearwardly projecting end of a bellcrank 1281, which is pivoted at its elbow on the outer side of the right-hand carriage end plate 240, as upon pivot stud 1282. The upper end of the other arm of the bellcrank is pivotally connected to a forwardly extending link 1283 lying along the right-hand face of the end plate. The forward end of this link is provided with a slot 1284 which embraces a pin 1285 riveted to the end plate, thereby supporting the front end of the link 1283 for longitudinal movement.

The link 1283 is provided with a forwardly directed shoulder 1286, which engages the rear edge of a control lever 1291, as shown particularly in FIG. 16. This control lever is pivotally mounted on a bracket 1292 extending between the hollow crossframe member 237 and the front carriage rail 238, as shown in this figure, by any suitable means, such as pivot stud 1293. This control lever 1291 is resiliently biased to an inoperative position (the counter-clockwise position shown in FIG. 16) by a spring 1294 tensioned between a stud 1295 on the control lever 1291 and a stud on a latch lever 1310, as shown. A control plate 1300 is associated with the control lever 1291. This control plate is pivotally mounted on the column of knob 75, which, it will be recalled, is rockable to cause interponent 420 to engage or disengage the counter clearing racks 309 from the power-operated clearing bar 415. This control plate 1300 is provided with a slight notch, or shoulder, 1301 adapted to engage the pin 419 on the bracket 418 of power bar 415 when the control plate 1300 is rocked to its operative position (clockwise from the position shown in FIG. 16). Normally, this control plate, which is pivotally mounted on the column of knob 75, is biased to its inoperative position by means of a light tension spring 1302 tensioned between a stud 1303 riveted on the control plate and a stud 1304 attached to the bracket 1292. The rearward edge of the left end of the control lever 1291 engages the pin 1303 on the control plate 1300, so that the rocking of the control lever 1291 by the translation of link 1283 rocks the control plate 1300 clockwise to the position corresponding to the normal position of the interponent 420 which is rigidly mounted on the column of knob 75. Thus, when the control lever 1291 is rocked, the control plate 1300 is also rocked clockwise, so that regardless of the setting of the interponent 420, the pin 419 on the power-operated clearing bracket will engage the slight notch 1301 on the control plate. Operation of the register clearing bar will thereby, and invariably, force the clearing column 75 to the right to its extreme position and thus clear the counter register.

A latch lever 1310 is pivotally mounted on the bracket 1292 by any suitable means, such as screw stud 1309. This latch lever is shaped as a bellcrank, as shown in FIG. 16, the forward leg being provided with a shoulder 1311 adapted to engage the pin 1295 on the control lever 1291, the latch lever 1310 being biased to a latching position by the spring 1294 just mentioned. Thus, when the lever 1291 is rocked (clockwise in FIG. 16) by the operation of the control link 1283 effected by the rocking of bail 1276 by cam follower 956, the shoulder 1311 engages pin 1295 and holds the control lever in the operative position. The latching bellcrank 1310 is provided with a nose 1312 which lies in the path of travel of the counter clear knob 75 and adjacent the extreme position of such travel. Thence, the operation of the clear bar 415, which is automatic at the termination of the transfer operation, will always be effective to operate the counter clear knob 75 and hence the counter clear racks 309; and, at the extreme end of its throw, it will engage the nose 1312, rocking the latch 1310 against the force of its spring 1294 to rock the latch to its disengaging position in which it will release the control lever 1291. Thus, as soon as the counter has been cleared, which follows the return of the program shaft 851 to its full-cycle position, the control plate 1300 will return to its normal, inoperative, position and thereafter operation of the counter clearing mechanism will be under the control of knob 75 until a new "Quotient Storage" transfer is effected.

It is believed obvious, in view of what has been said of the method of operating the transfer mechanism when transferring a value from the quotient to the storage register, that it is essential to clear the counter at the end of the operation. It will be recalled that the counter dials are operated through five incremental steps subtractively, so that at the end of the transfer operation the counters will register a value of "5" less than the values at the start of the operation although the actual value will have been set into the storage register.

(c) *Condition Counter Actuator (FIGS. 2 and 11).*— Cam 967 (FIG. 11), which is the third from the right-hand end of the cam, or program shaft, 851, is effective to set the counter for subtractive operation in all orders. The cam follower 968 was latched against operation by the latching engagement of hook latch 972 with pin 971 on the end of cam follower 968. This latch is rocked (counterclockwise in FIG. 11) to release cam follower 968 for operation by the rocking of shaft 973. The rocking of this shaft is accomplished by means of the linkage shown in FIG. 2. It is seen in this figure that the left-hand leg 1260 of bail 1261 is provided with an upwardly extending arm 1263. This arm is pivotally connected to a link 1317 which, in turn, is pivotally connected to an arm 1318 which is rigidly mounted on the shaft 973. Thus, the rearward translation of control link 1258 rocks the bail 1261 (counter-clockwise in FIG. 2), thereby pulling the link 1317 forwardly and rocking arm 1318 and shaft 973 (clockwise in FIG. 2 and counter-clockwise in FIG. 11). This rocking of the shaft 973 causes the latch hook 972 to disengage pin 971 and thereby permits follower 968 to operate in accordance with the positioning of cam 967.

It will be recalled that the follower 968 is resiliently biased into engagement with the periphery of the cam 967 (counter-clockwise in FIG. 11) by the spring 974. Thus, as the cam rotates from the full-cycle position shown, to its 180° position, the roller 970 will ride onto the flat, or low point, of the cam, thus enabling the follower bellcrank 968 to rock to an operative position (counter-clockwise in this figure) from the force of its spring. The bellcrank is pivotally connected to a forwardly extending link 1323, the forward end of which is provided with an inclined slot 1324 which embraces a pin 1325 riveted to a mounting bracket 1326 (FIG. 25) attached to the rear face of the crossbar 84. The forward end of the link 1323 is provided with an upstanding nose which carries a roller 1327. This roller engages a lower edge of a link, or interponent, 1328 which is pivotally mounted at its forward end on a stud 1329 carried by the counter cam follower 342.

It is obvious that the rocking of the cam follower 968, which results from rotation of the cam 967 to its 180° position, translates the link 1323 forwardly. Such translation of the link, through the camming effect of inclined slot 1324 on pin 1325, lifts the forward end of the link, so the engagement of roller 1327 with the lower edge of the interponent, or link, 1328 lifts the rear end of that link to an operative position. In the operative position of interponent 1328, the rearwardly facing cam edge 1330 on the upper end thereof comes into register with a pin 1331 mounted on the lower end of an arm, or projection, 1332 formed integral with the right-hand counter actuator sleeve 315 (see also FIG. 12).

The rearward motion of the cam follower 342 will be effective, when the link 1328 is in its raised position, to cause the upper end thereof to engage pin 1331, thereby rocking the right-hand counter finger 305 forwardly (clockwise in FIG. 11 or counter-clockwise in FIGS. 2 and 13), whereby the counting finger 305 will engage in the interdental space between the teeth of the forward gear 307 on the forward end of the counter shaft 300. The rocking of each counter finger 305, through the engagement with the tens-transfer sensing finger 306 of the next higher order, is thereby effective to rock all of the counter actuator spools to their forward positions in which their noses 305 engage the gears 307. Thus, each counter actuator tooth, or finger, 305 is rocked into engagement with the forward gear 307 on each aligned counter dial assembly, so that, regardless of the position of the tens-transfer control cams 302, each counter actuator is effective to rotate its aligned counter dial one increment subtractively with each cycle of machine operation. It will be remembered that in the instant interregister transfer operation, the digitation control gate 228 remains in the neutral, or intermediate, position shown. In this situation, the normal counter control mechanism remains in the neutral position shown in FIG. 11, so that the shoulders 347 and 348 of the cam follower 342 will miss their respective pins 356 and 357 as the follower oscillates from the rotation of counter cam 340. Thus, the operation of the counter actuators, occasioned by the lifting of the interponent 1328, will not interfere with normal counter operation, but the interponent will rock all the counter actuators across the machine against the opposition of their respective springs 319. Hence, all orders of the counter will be operated subtractively for single increments of motion, in each of the five machine cycles incident to the actual transfer phase of the program operation.

(d) *Set the Sensing Mechanism to Operative Position (FIGS. 9, 16, 17, 25 and 32 to 34).*—The sensing bail operating cam 980, which is the fourth from the right end of the program, or cam, shaft 851, operates in exactly the same manner in both types of interregister transfer operations. It is therefore unnecessary to describe the linkage operated by cam 980, except to mention that it is effective to rock the sensing control bail 991 and that the rocking of this bail, through the force of the several springs 1013, resiliently rocks the several operating levers 1010, and hence the sensing arms 1017, toward a fully operative position equivalent to the value of "2." It should be mentioned, however, that in this event the sensing arms 1017 will be effective to sense sensing slides 1352 associated with the counter register.

(e) *Zero Locking Bail (FIGS. 7, 10 and 25).*—Cam 1043, which is the fifth cam from the right-hand end of the cam shaft 851, has already been described. This cam and the linkage controlled thereby is provided to positively lock the various selection slides 210 in their "1" and "0" positions when the selection bars represent such values. This mechanism was described in connection with the "Product Storage" transfer, as it does operate in such a transfer operation. However, in that operation this mechanism is not really necessary, as the return of an accumulator dial to "0" positively pushes the sensing means to a like registration, so that in succeeding cycles of operation nothing is subtracted from "0." However, in the interregister transfer from the counter, or quotient, register, the various dials are not blocked against operation as they return to their "0" position, but each dial is invariably given five increments in a subtractive direction to invariably arrive at a value of "5" less than the dial registration at the start of the operation. It has already been mentioned that the counter cams 1360 (FIG. 16) have a nose, or projection, 1361 corresponding to a value of "0" which forces the counting sensing finger 1352 to its forward position, thereby rocking the operation lever 1010 of the sensing mechanism to the inoperative position shown in FIG. 32; that the intermediate step 1362, which corresponds to a value of "1," extends from the "1" to the "5" positions of the dial, or through an angle of 180° in a ten-digit dial, and the lower portion, which is equivalent to a sensing of a value of "2," extends through the "6" to "9" positions of the dial. Obviously, when the value in the dial is "5" or more, the five subtractive operations will not return the dial to "0," although they will automatically set the corresponding selection bars 210 to the proper value to insert the proper value into the storage register 701. However, when a counter dial registers a value of "0" or "1" through "4," the five subtractive steps will cause the dial to pass through "0" and it is, therefore, very essential to lock the coordinal selection bar 210 in the "0" position as the dial returns to "0." Thereafter, the further rotation of the dial, which would place the low, or "2" value, portion of the cam in opposition to the sensing slide, will be ineffective to change the setting from "0." This locking mechanism, including the link 1047, bail 1050 and the locking slides 1055, has been fully explained in the similar heading of Section II.

(f) *Clutch Storage Mechanism to Square Selection Shafts (FIGS. 2, 9, 10 and 20).*—The clutching of the various ordinal storage register drive shafts 710 to the coordinal square, or selection, shafts 222 is controlled by cam 1068 and the linkage including link 1073, lever 1074 and bail 1077, shown in FIGS. 2 and 20. This mechanism is operated in exactly the same way and exactly the same time as in the product to storage transfer. It is, therefore, believed unnecessary to repeat the description of this mechanism, for that description can be found under subsection (f) of Section II above.

(g) *Lock Carriage and Condition Register Clear Mechanism for Operation (FIGS. 9, 13, 15 and 27).*— The transfer of a value from the quotient register into the storage register conditions the automatic clearing mechanism for operation in the cycle following the return of the cam, or program, shaft 851 to its full-cycle position. This operation is controlled from the rotation of cam 1091 (FIGS. 15 and 27). As the cam goes from its full-cycle to its 180° position, it rocks the carriage locking arm 1098 (best shown in FIG. 9) to positively lock the carriage in the proper ordinal position for the full five cycles of operation, and through the mechanism shown in FIG. 13, conditions the automatic clearing mechanism for operation in the cycle following the return of the shaft 851 to its full-cycle position. The operation of the clearing mechanism, through the means of link 1143, bail 1144 and link 1145 (FIG. 9), releases latch 745a and thereby releases the key 1240. All of these operations were described under subsection (g) of Section II above, and need not be repeated here.

(h) *Counter Sensing Control (FIGS. 9, 27 and 35).*— It will be recalled that the sensing mechanism, which is operated by the sensing bail 991 (FIGS. 16 and 17), is normally held in a position to sense the values standing in the product register, or accumulator, dials 71. In the interregister transfer presently under discussion, i.e., from the counter, or quotient register, into the storage register, it is necessary to shift the sensing mechanism a short increment in order to sense a value standing in the counter dials 73. This mechanism is under the control of cam 1155 (FIGS. 27 and 35), the existence of which was suggested in the preceding section. It was also suggested that in the preceding operation the cam follower 1157 was latched against operation by the cam by means of bail 1161, the left-hand leg of which formed a hook 1160 engaging a pin 1162 on the rear end of the cam follower. The left leg of the bail 1161 is pivotally mounted on the left-hand auxiliary control plate 90 by means of a screw stud 1163, which incidentally, is axially aligned with the shaft 973 previously mentioned. The right-hand leg of this bail, as shown in FIG. 27, is pinned to, or otherwise rigidly secured on, the left end of the shaft 973. It will be recalled that the shaft 973 is rocked by the mechanism shown in FIG. 2, from the rearward translation of link 1258 resulting from the depression of the "Quotient Storage" key 1240. The rocking of shaft 973 (clockwise in FIG. 2 or counter-clockwise in FIG. 35) causes the hook 1160 to rock away from the pin 1162, thereby releasing cam follower 1157 to the force of its spring 1159. In the full-cycle position of shaft 851 the high point of the cam 1155 engages the follower roller 1156, thereby holding the follower 1157 in the extreme clockwise position shown in FIG. 35. As the cam rotates to its 180° position (counter-clockwise in FIG. 35), the cam follower 1157 is permitted to rock from the force of its spring 1159 and this rocking is effective to shift the sensing mechanism the necessary increment to enable sensing of the counter value cams.

It is seen in FIG. 35 that the forward end of the cam follower 1157 is connected to an upwardly extending cam link 1340 by any suitable means, such as stud 1341. It is seen in this figure that this cam link lies on the right-hand side of the intermediate frame plate 90, and, as best shown in FIG. 34, is held away therefrom by suitable rollers 1342 which provide a frictionless bearing of the link against the intermediate frame plate, so that the force of spring 1159 will be sufficient to lift the link 1340 to its extreme upward position. The profile of the upper end of the link 1340 is shown in FIG. 34, and includes a diagonal cam face 1343 which separates the major section of the link from a short and wider section 1344 at the extreme upper end thereof. The upper end of the link 1340 lies within a slot 1345 formed in the left end of the pin 1003 and bears against a roller 1346 mounted within the slot 1345. The right end of this pin 1003 bears against the ear 1004 formed on the left end of the bottom plate 999 of the sensing assembly and normally holds the sensing assembly in the right-hand position shown in FIG. 34 against the force of the relatively strong spring 1002. Thus, when the link 1340 is lifted by spring 1159 as follower roller 1156 rides on to the low portion of cam 1155, the upper end 1344 of link 1340 is lifted out of engagement with roller 1346, thereby enabling the pin 1003, which is slidably mounted in apertures in the frame plates 82 and 90, to shift to the left from the force of spring 1002. In this situation, roller 1346 engages the edge of the narrow portion of the link 1340, and the sensing assembly is permitted to shift to the left from the force of the spring 1002.

It will be recalled that in the normal position of the sensing assembly, the several sensing links 1017 (FIGS. 32 to 34) are aligned with the ears 1026 (FIG. 16) of the sensing slides 1025 associated with the product register dials 71. However, when the sensing frame 997 is permitted to shift the short increment to the left, e.g., the distance betewen the lines indicated by arrows "X" and "Y" in FIG. 34, these sensing fingers become aligned with ears 1351 on counter sensing slides 1352. These slides are provided with slots 1353 which embrace the screw studs 1028 that hold the accumulator sensing slides 1025 in proper position, and the forward end of the counter sensing slides 1352 lie within the slots 1027 which embrace the forward end of the counter sensing slide. It is seen by reference to FIGS. 16 and 32 particularly, that the counter sensing slides 1352 lie immediately below the accumulator sensing slides 1025, and, in fact, the latter rest upon the counter sensing slides. The counter sensing slides likewise are provided with windows 1354 which correspond to the window 1032 to enable viewing of the counter dials 73 by the operator. These counter sensing slides 1352 are also provided with downwardly projecting pins 1355 which are adapted to engage the cam face of the counter value cams 1360 which are severally mounted on the counter shafts 300. These cams are provided with a high nose 1361 projecting forwardly along the shaft 300 in the "0" position of the shaft. This nose 1361, together with its angularly, or cam-faced sides, extends over an angle of approximately 36° corresponding to a single value on a ten-digit dial. The height of this nose 1361 is sufficient to force the associated sensing slide 1352 forwardly to the "0" position indicated in FIG. 32, thereby blocking rearward movement of sensing finger 1017 or rocking of the sensing lever 1010. In this position, the toe 1011 of sensing lever 1010 is held away from pin 1012 and enables the coordinal selection slide 210 to remain in its "0" value position. On the ascending side of the "0" position, the cam 1360 is provided with an intermediate land 1362 which enables movement of the aligned sensing slide 1352 to a "1" value position, whereby the sensing lever 1010 is enabled to move the coordinal selection bar 210 forwardly to a "1" value position. This land extends through the "1" to "5" positions of the dial, or roughly, 180°. The balance of the cam, which extends through the "6" to "9" positions, provides a low section 1363 which enables the associated sensing slide 1352 to move to a "2" value position.

This cam holds the sensing slide 1352 forwardly in a "2" value position so long as the pin 1355 is in engagement with the low section 1363, which is the number of cycles required to rotate the dial from its "6" to "9" position to the "5" position, and thereafter to hold the sensing slide in a "1" value position until the program is completed. In the event the dial rotates to, or through, a "0" position, the sensing slide 1352 is pushed to its extreme forward position, which holds the sensing finger and sensing lever in their inoperative positions and returns the coordinal selection bar 210 to move to its "0" position. It will be recalled that this selection bar is latched in this position and thereafter the selection bar is latched against forward movement from the sensing mechanism, even though the dial rotates to a position in which the low section 1363 lies opposite the pin 1355—the spring 1013 yielding in this circumstance.

By the means here described, a transfer from the counter or quotient register to the storage dials is effected by the sensing mechanism sensing the counter cams 1360. This mechanism is effective to enable the entry of a value into the coordinal storage dial throughout those cycles in which the cam is rotating from a "9" to "0" position—the counter dials and cams being moved a single increment, or value, position with each cycle of operation. When the cam rotates between the values of "9" to "6," the selection mechanism is set for a value of "2"; and when it rotates to the "5" value position, the sensing mechanism is held to a value of "1" and the corresponding selection slide is correspondingly set to this value. This value is held while the cam rotates subtractively from the "5" to the "1" position. As indicated above, when the cam rotates to the "0" position, the selection slide is locked in its "0" value position and the sensing mechanism is no longer operative.

In connection with the transfer of values from the counter dials 73 to the storage dials 701, it must be remembered that the carriage B may be in any ordinal position at the time of the transfer. There are customarily only eleven orders of counter dials in a twenty-order carriage, so that if the carriage is shifted from the home position shown in FIG. 1, there will be some orders on the left-hand side of the selection mechanism that will lie to the left of the highest order counter dial 73. It is, therefore, necessary to provide means for preventing operation of the selection slides 210 in the higher orders. Obviously, the orders of the selection mechanism aligned with the counter dials will have the setting of the selection mechanism controlled only from the sensing means here described. In order to block operation of the selection slides 210 lying to the left of the highest order dial 73, I prefer to provide a series of blocking shoulders 1530 formed on the front carriage rail 238, and lying in the lateral position which would be occupied by the noses 1351 of the counter sensing slides 1352, as is shown in FIGS. 1 and 32. The forward edge of these shoulders lie in the position which would be assumed by the forward nose 1351 of a counter sensing slide lying in a "0" value position. This blocking shoulder 1530 will positively block operation of the sensing levers 1010 in all orders lying to the left of the highest order dial 73.

(*i*) *Operate Gate Centralizer (FIGS. 9, 27 and 36).*— The gate centralizing cam 1170 and its associated follower and related mechanisms are permitted to operate at the end of the transfer operation presently under discussion, although it has absolutely no effect, for the gate is in neutral throughout these series of operations. This mechanism, therefore, need not be described.

(*j*) *Operate Machine Through Five Digitation Cycles (FIG. 36).*—The program here under discussion requires five cycles of operation, so that the same five-cycle program previously described is utilized in this interregister transfer operation. It is sufficient to note that this program is under the control of cam 1190 and the mechanism associated therewith, and illustrated in FIG. 36. As this program is identical with that relating to the interregister transfer from the accumulator to the storage dials, it is unnecessary to repeat that description.

7. *Terminate Operation and Clear Registers (FIGS 9, 27, 28 and 36)*

The program operation is terminated in the identical manner as that previously described. The return of the program, or cam, shaft 851 to its full-cycle position causes the engagement of the register clearing clutch, which clearing is effected during the cycle following. Toward the end of this cycle, the mechanism comprising link 1143 (FIG. 9), bail 1144, link 1145 and pin 1146, is operated by the clearing mechanism to release latch 745*a*, thereby enabling switch control lever 909 to return to its inoperative position and the control key 1240 to rise to its inoperative position. The machine operation thereby terminates with the completion of the clearing operation.

IV. ORDINAL TRANSFER LOCK (FIGS. 3, 10 AND 22)

It is preferred that the mechanism of the present invention be provided with means enabling the blocking of an interregister transfer into the storage dials 701 in any order, at the will of the operator. This result is valuable in disabling a transfer in selected orders, such as those utilized in half-cent, or rounding off, operations, and the like. Preferably, this mechanism is under the control of the ordinal "0," or clear, key 61 (best shown in FIG. 3). When depressed, this key is effective to engage the ordinal latching slide 108 to push it rearwardly to release any depressed key in that order. The key can also be lifted, and latched in the lifted position and then, in my preferred embodiment, becomes operative to blocks a transfer in that order of the storage dial 701.

It is seen by reference to FIG. 3 that the ordinal "0" key 61 is held in its normal, inoperative position by a spring 1370; but is latched against movement beyond this position by a spring-powered detent member 1371, the nose of which engages the upper tie rod 102 of the bank of ordinal "0" keys. Each of the ordinal "0" keys 61 is provided with a forwardly extending lip 1373 which enables an operator to lift the key stem against the force of the spring detent member thereof, and when so lifted it is held in its elevated position by the spring 1370 and the other side of the nose of the detent 1371. The detent member 1371 is pivotally mounted on the key stem and is held in a retracted or detenting position by means of a spring 1372. The key stem of the ordinal "0" key 61 extends below the lower frame plate 97 of the keyboard frame, as shown in FIG. 3, to a point in which the lower end of the key stem in its raised position almost coincides with the lower face of the lower frame plate 97.

There is a second selection slide lock 1378 associated with each of the ordinal "1" to "4" value selection slides 210, as shown particularly in FIGS. 10 and 22. These locking arms 1378 are pivotally mounted on studs 1383 secured to the brackets 1056 which support the first-mentioned selection slide locking bars 1055—the respective locking bars 1378 lying immediately adjacent the locking arms 1055 previously mentioned, as shown in FIG. 10. Each of these locking arms is provided with a downwardly projecting nose 1379 adapted to engage the bail 1050 when it is in its raised position, so that the latching bars 1378 will be held disabled, along with the latching bars 1055, in all operations of the machine except an interregister transfer, and in all parts of that operation except during the five cycles in which the transfer actually occurs. The latching arms 1378 are provided with a single shoulder 1382 adapted to engage the ear 1062 on the coordinal selection slide 210, thereby holding the slide in the "0" position when this locking arm is rocked (counter-clockwise in FIG. 22) to blocking position. These locking bars differ from those first described in that they are formed as two-armed levers (while the latching arms 1055 are a single-armed member extending substantially only to the rear of its pivot point 1057). That is, the second set of latching levers 1378 extend forwardly from their pivot points 1383, and at their extreme forward ends, are provided with ears 1380 which underlie and engage the lower end of the coordinal "0" key 61. Thus, each second latching arm 1378 is disabled, not only by bail 1050, but also by the ordinal clear key, or "0" key 61, when in its normal inoperative or in its lower clearing positions. However, if the key 61 is lifted, as described in the preceding paragraph, then the latching lever 1378 is enabled to rock from the force of its spring 1381, tensioned between it and the lower arm of the bracket 1056; and in that position, the shoulder 1382 engages the ear 1062 and holds the coordinal selection slide 210 in a "0" position. When this occurs, the spring means in the sensing mechanism yields, so that the sensing means is inoperative as the selection slide is latched in its "0" position. By this means, the operator is enabled to selectively disable a transfer of a value from either the accumulator or the counter into selected orders of the storage register. It is seen that the lifting of the "0," or ordinal correction, key 61, in other operations of the machine, will be ineffective to block the positioning of the selection slides, for in that instance the bail 1050 keeps the blocking lever 1378 disabled.

V. TRANSFER FROM STORAGE TO SELECTION

The mechanism heretofore described would be of considerable importance without any additional mechanisms associated therewith, for it would provide a simple grand total, or storage, register into which values from either the accumulator or counter registers could be transferred. However, it is a very simple matter to add a mechanism which will be operable, at the option of the operator, to transfer a value set into the storage dials into the selection mechanism, whereby it can be used as a keyboard factor in a subsequent operation. In the preferred embodiment of my invention, this mechanism for inserting the value in the storage dials into the selection mechanism without erasing the value from the storage register, is relatively simple, although it is commercially very important. Further, this selection setting can be done either simultaneously with the transfer operation, or as an entirely independent operation at any time or as many times thereafter as desired. In the former case, the control key for the selection setting is depressed simultaneously with either the "Product Storage" key 700 or the "Quotient Storage" key 1240, although the actual setting operation will be restrained until the last cycle of the interregister transfer operation, which is the cycle in which the carriage registers are cleared. The present operation is a single cycle operation so that it can readily be accomplished at this time without in any way interfering with the normal interregister transfer program.

Preferably, the selection setting mechanism will be under the control of an operating key 1400, marked with the indicia "Storage to Keyboard" in FIG. 1 and likewise located along the front of the keyboard. Preferably, this key is placed between the two interregister transfer control keys 700 and 1240 as shown, and preferably provided with the interlocking form shown in FIG. 1, so that a single finger can depress both the "Product Storage" key 700 and the "Storage to Keyboard" key 1400, or the "Quotient Storage" key 1240 and the "Storage to Keyboard" key, if it is desired to set the transferred value into the selection mechanism simultaneously with the transfer operation. The depression of this key will operate a mechanism which resiliently biases the selection slides to a registering position until they engage the steps of a storage cam 1480, preferably mounted on the storage drive shafts 710 immediately in front of the front cross member 91, as shown in FIGS. 2, 10, 20 and 22. Preferably, the steps of the cams 1480 are so arranged that if the value to be sensed is between "1" and "4," inclusive, the "1" to "4" selection bar can be operated but the "6" to "9" selection bar 211 will be blocked against operation; while if the value is from "5" to "9," inclusive, the "5" to "9" bar 211 will be operative, and the "1" to "4" bar 210 will be blocked against operation, and if the value is "0," both bars will be blocked against operation. In the preferred form of the present invention, the resilient rocking member is latched in its fully adjusted position, thereby holding all of the selection bars in their adjusted position so long as it is desired to maintain that value in the keyboard, thus avoiding an individual latching member for each selection bar. It can be noted in passing, that this setting operation does not involve the operation of the transfer mechanism controlled by the transfer clutch and the program shaft 851, and can be readily accomplished in a single cycle of the machine. Therefore, the mechanism associated with this operation will be effective to close the motor switch and cause engagement with the main clutch, and will simultaneously cause the operation of a selection setting clutch through a single machine cycle and which will operate such control mechanisms during this single cycle as will be necessary to set the selection bars to the proper differentially adjusted positions, but will not cause engagement of the interregister transfer clutches and the program shaft 851.

1. *Control Key (FIGS. 1, 20 and 24)*

It is preferred that the "Storage to Keyboard," or selection entry, key 1400 be placed between the "Product Storage" key 700 and the "Quotient Storage" key 1240 so that it can be depressed simultaneously with either one of these transfer keys. It should be noted at this point that the depression of either transfer key simultaneously with the "Storage to Keyboard" key 1400 will be operative to latch the mechanism controlled by the key 1400 against operation until the interregister transfer program shaft 851 returns from its 180° position to its full-cycle position. In that event, the control key 1400 is held in its operative or fully depressed position by the locking of the interregister transfer key 700 or 1240 in its depressed position, and will be released with the interregister transfer key in the last cycle of the interregister transfer operation. This will be more fully explained under heading "Simultaneous Operation With Transfer Control Keys" later in this section. It will probably be easier to understand the operation of the "Storage to Keyboard" setting mechanism, if, for the moment, this cooperating control from the transfer keys is ignored, and the operation described as if the key 1400 is depressed to set an already stored value into the selection mechanism.

As shown in FIG. 20, the key 1400 is mounted on a key stem 1401, slidably mounted in the cross plates 706 and 718, previously mentioned, being seated in aligned apertures therein. It is normally resiliently maintained in its upward position by a spring 1402 coaxially mounted on the key stem above the plate 706. At its lower end, it is provided with an angular ear 1403 corresponding in size and location to the ear 727 on key 700 and ear 1242 on key 1240. A stud 1404 riveted on this ear, engages in the slot of a third arm 1406 (FIG. 24), similar to arm 757, mounted on the clutch control shaft 758. Thus, the depression of the key 1400 will rock the clutch control shaft 758 (FIG. 24) to close the main switch and hold the main clutch engaged for a single cycle of operation. Also, the arm 1406 engaged by the stud 1404 on the lower end of this key stem will hold the key depressed so long as the shaft is maintained in its rocked position by the locking of one of the transfer keys in its depressed position. The rocking of shaft 758 is effective, therefore, to close the main clutch and engage the motor switch through the mechanism previously described in Section II, subsection 3, above.

2. *Selection Setting Clutch (FIGS. 20, 22, and 24)*

The stud 1404 also lies within a slot 1409 (FIGS. 20 and 24), formed in the forward end of an arm 1410 pivotally mounted on the shaft 736. It is undesirable that the primary auxiliary clutch, controlled by the rocking of shaft 736, be operated, for the operation of that clutch holds the main clutch and switch operative for a second cycle of operation (which is unnecessary in this case), causes a clearing of the keyboard and, most important, causes a clearing of the storage dials which is obviously undesirable. Therefore, there is no driving connection between this arm 1410 and the shaft 736, so that the arm rocks without effecting any rotation of the shaft 736. The front end of a clutch control link 1411 is pivotally connected to the arm 1410 by any suitable means, such as stud 1412. A spring 1413, tensioned between the stud 1412 and a bracket secured on the front end of the base plate 80, resiliently biases the clutch link 1411 to its forward, inoperative position and simultaneously biases the arm 1410 to its raised position. A torsion spring 1414 mounted on the stud 1412 and having one end seated in arm 1410 and the other on a stud of the link 1411, resiliently biases the rear end of the clutch control link 1411 downwardly, as shown in FIG. 20. The rear end of the clutch control link is provided with an angular slot 1415, the narrow upper end of which embraces a pin 1416 of a clutch control pawl 1417 when the rear end of the link is in its normal lower position. However, when the rear end of the clutch control link 1411 is lifted, as it is as the selection setting clutch approaches its full-cycle position, the broader lower portion of the slot 1415 is lifted into registry with the pin 1416, thereby releasing the clutch pawl for return to its normal clutch-disengaging position. The clutch pawl 1417 is pivotally mounted on a short shaft 1418 mounted in a pair of brackets, such as 1419, mounted on the base plate 80. The rocking of the clutch pawl 1417 (counter-clockwise in FIG. 20 and clockwise in FIG. 22) controls the operation of a clutch dog 1425 (see FIG. 22). The clutch dog 1425 has a single tooth adapted to engage a single tooth on a driving ratchet 1426 mounted on an auxiliary drive shaft 1427. This ratchet is provided with a single tooth so that the clutch of which it is the driving member can become engaged only in the full-cycle position of the machine. The shaft 1427 is constantly driven from the main drive shaft 255 by the gearing shown in FIG. 10. This gearing comprises a miter gear 1428 meshing with gear 327 on the left end of the main drive shaft 255, and rigidly mounted on a substantially vertical shaft 1429. A pair of miter gears 1430 and 1431 are mounted respectively on the shafts 1429 and 1427, whereby the shaft 1427 rotates synchronously with the main drive shaft 255 and at the same speed.

The clutch dog 1425 is pivotally mounted on a cam plate 1435, shown in FIG. 22, and is biased into engagement with the ratchet 1426 by a spring 1436 tensioned between the free end of the clutch dog and the driven plate 1435. Normally, however, the clutch dog 1425 is held out of engagement with its associated ratchet by a nose 1420 on the clutch pawl 1417 engaging a shoulder 1437 on the clutch dog, as shown in this figure, the clutch pawl being biased to such engagement with the clutch dog by a spring 1422. In the full-cycle position of the clutch, a roller 1421 lies in a depression 1438 formed in the dirven plate 1435, in which position the nose 1420 can engage the shoulder 1437, but in all other angular positions of the driven plate 1435, the roller rides on the periphery of the plate and holds the clutch pawl 1417 away from the clutch dog 1425, so that the clutch is disengageable only in the full-cycle position shown.

Associated with the driven plate 1435 is a second cam plate 1439, shown in phantom in FIG. 20 and in solid lines in FIGS. 21 and 10, the two plates 1435 and 1439 being mounted on a common hub. It is, therefore, obvious that when the control key 1400 is depressed, the consequent rocking of clutch pawl 1417 releases clutch dog 1425, whereupon the driven plates 1435 and 1439 rotate with shaft 1427 through a full machine cycle and are thereupon disengaged. It should be noted at this point that even though the key 1400 is held depressed, the form of slot 1415 on the clutch control link permits a disengagement of the clutch when the rear end of the link is depressed as is done as the driven members of the clutch approach their full-cycle position.

The cam member 1439 has a profile which is shown in FIG. 21 and includes a semicircular portion of constant radius extending through an angle of 180° from the home position shown in this figure. The cam also includes a pronounced lobe 1440 which is effective to rock a follower lever 1441 at approximately the midpoint of a cycle, and to hold it in the rocked position until the cam is returning to its full-cycle position. The cam follower 1441 carries a roller 1442 at its upper end, which engages the periphery of the cam 1439. The cam follower is also pivoted on the shaft 1418, and is provided with a pin 1443 which underlies the clutch control link 1411, as shown in FIG. 20. Thus, the rocking of the cam follower 1441, beginning at approximately the midpoint of the cycle, is effective to lift the rear end of control link 1411 against the force of torsion spring 1414, whereupon the pin 1416 on the lower end of the clutch pawl becomes disengaged from the narrow portion of the slot 1415 and lies freely in the enlarged portion thereof. Thereupon, the clutch pawl 1417 is freed from control of clutch link 1411 and the clutch will invariably become disengaged as it returns to its full-cycle position.

3. *Selection Setting Actuator (FIGS. 10, 20, 21 and 22)*

The cam 1439 carries a roller 1444 which, at approximately three-fourths of the way through the cycle, engages a setting arm 1447, shown in FIGS. 10 and 20 to 22, rocking the arm from the full-cycle position shown in full lines in FIG. 21 to the phantom line position shown therein. This rocker arm 1447 is rigidly mounted on the transverse shaft 1448 rotatably journalled in the frame plates 81 and 83, as shown in FIG. 10. The shaft 1448 also carries a number of bail arms 1449 rigidly mounted thereon, which arms support a transverse bail 1450 which extends immediately below the selection bars 210 and 211 and transversely across the arrangement of selection bars. This bail 1450 takes a considerable strain as it operates against the force of twenty springs in a ten-order machine, which is conventional in this type of machine, so that a number of supporting arms 1449 are desired to hold it against twisting or warping. Thus, the bail 1450 is rocked by the rocking of rocker arm 1447 from the rotation of the cam 1435 at approximately the 270° point of the machine cycle.

In the preferred embodiment of my invention, the bail is latched in its rocked position by the latching mechanism shown in FIG. 23.

4. Bail Latching Mechanism (FIGS. 20, 22 and 23)

The rocking of the bail 1450, resulting from the rotation of cam 1435, is effective to resiliently bias the various selection slides 210 and 211 forwardly to a value registering position, as will be explained in the next section. At this point, however, it should be noted that means is provided for latching the bail 1450 at the extreme limit of its forward stroke. It would, of course, be possible to permit the bail 1450 to return to the inoperative position shown in FIGS. 20 or 22, and to provide an individual latch for each of the selection slides 210 or 211 to hold them in the extreme position to which they are resiliently biased by the bail 1450. However, it is simpler, and therefore preferable, to provide a single latching means for the bail, holding the bail in its extreme value position and thereby holding all the selection bars 210 and 211 in their value registering position determined by the value standing in the storage dial 701. This latching mechanism is shown particularly in FIG. 23. It includes a latch arm 1455 rigidly mounted on the shaft 1448. This arm is strongly biased to the inoperative position by a spring 1457 tensioned between the arm and a bracket 1459 mounted on the base plate 80 in the position of rest shown, the arm engaging a suitable rubber stop 1458 mounted on the bracket. The arm 1455 is provided with a latching roller 1456 adapted to engage a notch 1460 in the upper end of a latching arm 1461 whenever the bail assembly, including the bail 1450 and the arm 1455, are rocked to their extreme position indicated by phantom lines in FIGS. 21 and 23. The latching arm 1461 is preferably pivotally mounted on the bracket 1459 by any suitable means, such as stud 1462, and is biased toward a latch-engaging position by a spring 1463 tensioned between the arm and a seat on the bracket.

It is obvious that the rocking of the bail 1450 causes the roller 1456 on arm 1455 to engage the notch of latch arm 1461, thereby holding the bail in its extreme position. This position can be released, preferably by depression of the keyboard clear key 59 already described. This can readily be accomplished by means of a link 1464 (see also FIG. 22), connecting the latching arm 1461 and an arm 1465 mounted on the keyboard clearing shaft 131. Thus, the depression of the keyboard clear key 59 (FIG. 1) rocks the shaft 131 (counter-clockwise in FIG. 22). This pulls the link 1464 forwardly, and thereby rocks the latching arm 1461 (clockwise in FIG. 23) to disengage the roller on arm 1455 from the notch on latch 1461. Thereupon, the spring 1457 snaps the bail assembly counter-clockwise to the inoperative position shown in full lines in FIG. 23.

5. Selection Bar Setting (FIGS. 20, 22 and 23)

The operating bail 1450, when rocked as hereinbefore described, effects a resilient translation of the selection bars 210 and 211 forwardly to sense the value standing in a series of value cams to be described in the next section. This forward translation of the selection slides for the sensing operation can be secured by a number of means, but the simple and very satisfactory means as shown in FIGS. 20 and 22 is preferred. In the preferred form, an operating arm 1470 is rotatably mounted on each of the selection bars 210 or 211 by any suitable means, such as pivot studs 1471. These arms are resiliently biased against stop pins 1472 by moderately strong springs 1473 which are tensioned between spring seats formed in the arms 1470 and an ear 1474 formed on the lower edge of each of the selection bars. Thus, the rocking of the bail 1450 will positively move the lower ends of all of the operating arms 1470 forwardly. So long as the selection bars 210 or 211 are free to move forwardly, the selection bars will follow movement of the arms from the force of the individual springs 1473. However, when forward movement of the selection bars 210 or 211 is stopped by engagement with a stop face of the aligned value cam, the spring 1473 yields, although the operating arm 1470 will be rocked to an extreme position. Thus, the bail 1450 may take a full operative stroke and be latched in the extreme operative position, thereby resiliently holding the respective selection bars in the proper value position from the force of the moderately strong springs 1473. By this means, the value standing in the coordinal value cam, which, as will be explained, corresponds to the value standing in the coordinal storage dial 701, is effectively set in the various selection slides and is held there as long as desired by the operator. While the value is so standing in the selection mechanism, it can be used in any machine problem desired. The value can be released by depression of the keyboard clear key 59 which will be effective to rock clearing shaft 131 and hence release the latch mechanism shown in FIG. 23. As soon as the bail 1450 has been rocked to its fully operative position, the cycle can be terminated, as nothing further remains to be done. For this reason, the roller is placed so as to engage the follower arm 1447 at approximately the 270° position.

6. Value Cams (FIGS. 2, 10, 20 and 22)

Each of the storage register drive shafts 710 carries a cupped cam 1480 mounted thereon, preferably immediately ahead of the crossframe member 91. Obviously, this cam will assume an angular position corresponding to the digital value position of the coordinal storage dial 701, so that a sensing of the cam member and the forward translation of the selection bars 210 and 211 in accordance therewith, will set the selection bars in a position corresponding to the digital value position of the coordinal storage register dial 701. This cam, as shown in these figures and substantially as shown in development in FIG. 10 of my copending application, S.N. 447,143, filed August 2, 1954, issued as Patent No. 2,909,320 on October 20, 1959, is of cup-shape, having a relatively thin outer wall in which are cut a first series of notches 1481 corresponding to the values of "1" to "4," which can be sensed by the value "1" to "4" selection slide 210; and a second series of notches, which are adapted to be sensed by the "5" to "9" selection slide 211. A series of peripheral cam edges interposed between the various slots is representative of a value of "0" and is effective to hold the selection slide not engaging a notch in a "0" position. A peripheral edge, which is representative of a value of "0," prevents operation of either of the selection bars 210 or 211 when the coordinal dial 701 registers "0." The first series of slots 1481 progress by a double increment from "1" to "2" and in uniform increments from "2" to "4," and are so located on the periphery of the cam as to be sensed by sensing fingers 1482 (FIGS. 10 and 22), mounted on the forward end of the "1" to "4" selection bar 210, these slots being progressively set around the shaft in equal angular increments corresponding to values of "1" to "4" on the storage dial 701. The second series of slots increases by the same incremental depth in five equal steps, and are representative of values from "5" to "9." These slots are angularly displaced with reference to the first series of slots so they can be sensed by sensing fingers 1483 mounted on the forward end of the "5" to "9" selection bars 211. There is no slot in the cam 1480 in the angular position representative of the value of "0," so that in that position, both sensing fingers 1482 and 1483 abut against the peripheral edge of the cam.

7. Cam Sensing Fingers (FIGS. 20 and 22)

The sensing fingers 1482 and 1483 are of substantially identical shape and are pivotally mounted on the related selection bars 210 and 211 by any suitable means, such as pivot pins, or studs, 1484. Each of these fingers is provided with a perpendicular ear 1485 on the rear end thereof, which extends through an aperture 1486 in the corresponding selection slide 210 or 211. A spring 1487, tensioned between the ears 1485 and a stud on the corresponding selection slide, rocks the sensing fingers out of engagement of the periphery of the respective cams 1480 (clockwise in FIG. 20 or counter-clockwise in FIG. 22).

The two sensing fingers 1482 and 1483 are provided with noses, or shoulders, 1488 which are adapted to enter the slots 1481, thereby limiting the forward movement of the fingers 1482 or 1483 and consequently the forward movement of the selection bars to which they are attached. The various sensing fingers 1482 and 1483 are normally held above the respective cams 1480 by means of the springs 1487, previously mentioned, so that the keyboard keys 50 can be used to set values in the selection mechanism, as is conventional in machines of this kind. However, when a value is to be set into the selection mechanism from the storage register dial 701, it is possible to rock the fingers 1482 and 1483 downwardly (counter-clockwise in FIG. 20 and clockwise in FIG. 22) by means of a cam-operated bail 1494 shown in FIG. 20. This bail is mounted on a plurality of legs 1495 which, in turn, are rigidly mounted on a short transverse shaft 1496. This bail, as shown in FIG. 20, overlies the forward end of the sensing fingers 1482 and 1483. One of the legs 1495 has a downwardly projecting extension 1497, which is connected by means of a link 1498, as seen in FIGS. 20 and 21, which extends rearwardly therefrom. The rear end of this link 1498 is supported on an arm 1499, shown in full lines in FIG. 21 and in phantom lines in FIG. 20. This arm is pivotally mounted on the shaft 1418, already mentioned, but is resiliently connected to the cam follower rocker 1441 by means of a spring 1500 tensioned between an ear on the arm 1499 and a stud on the cam follower rocker 1441. Thus, the rocking of the rocker 1441, which begins at about the midpoint of a machine cycle and therefore approximately one-fourth of a cycle before the bail 1450 starts to rock, causes depression of bail 1494. The depression of the bail, or clockwise movement when viewed from the right, as in FIG. 20, depresses the forward ends of the various selection sensing fingers 1482 and 1483 so that the shoulders 1488 thereon engage either the periphery or one of the slots of the coordinal cams 1480. Incidentally, the rocker 1441 is held in its rocked position until the end of the machine cycle so that the bail 1494 is not released until after the operating bail 1450 has been latched in its fully rocked position.

8. *Keyboard Lock (FIGS. 2 and 10)*

It is seen in FIGS. 2 and 10 that the right end of the bail 1450 carries an upwardly extending arm 1451. The upper end of the arm 1451 is shown in phantom in FIG. 4 where it lies immediately behind the pin 193 on the lower end of the keyboard locking member 190 previously described. Thus, the rocking of the bail 1450 and its latching in its forward operative position, through the effect of arm 1451 on member 190, locks the keyboard keys against operation and thereby prevents a misoperation on the part of the operator to manually enter a value into the keyboard when the keyboard contains the value in the storage register. The operator can, of course, clear the keyboard of the value in the storage dials by depressing the keyboard clear key 59, thereby releasing the bail 1450 and enabling the keyboard locking member 190 to be retracted to its normal, inoperative position by the force of its spring 194.

9. *Simultaneous Operation with Transfer Control Keys (FIGS. 2 and 22)*

It was previously indicated that it is possible in the preferred form of the present invention to operate the "Storage to Selection" key 1400 simultaneously with either the "Quotient Storage" key 1240 or "Product Storage" key 700, and thus initiate a continuous cycle of operation which transfers the value standing in the counter dials 73, or the product dials 71, into the selection mechanism for immediate re-use. The depression of either of the transfer keys 1240 or 700, of course, initiates the programmed operation controlled by these two keys, and previously described in detail. It is necessary, in this combined or simultaneous operation here under discussion, to release the clutch dog 1425 (FIG. 22) from its control pawl 1417, but to prevent its engagement with the drive ratchet 1426 until after the five-cycle transfer program is completed and the values from either the counter or product registers have been fully transferred into the storage register. Actually, the clutch dog 1425 is latched out of engagement with its normal control dog and out of engagement with its driving ratchet until the cycle in which the program shaft 851 returns from its 180° position to its full-cycle position. The release of the clutch dog at this time enables the selection setting mechanism to operate simultaneously with the clearing operation that terminates the operation of the machine in the next cycle.

It is seen in FIG. 22 that a latching arm 1505 is mounted adjacent the clutch pawl 1417. This latch is rigidly mounted on a short transverse shaft 1506 journalled in the bracket 1419 and the right frame plate (the latter mounting not being shown). The latch 1505 is provided with an elongated nose 1507 adapted to engage a pin 1508 on the clutch dog 1425. Preferably, there is a little lost motion between the nose 1507 and the pin 1508, so that when the clutch dog is released by the clutch pawl 1417, it can move a slight distance before being caught by the nose 1507, thereby preventing re-latching of the shoulders 1429 on the pawl and 1437 on the clutch dog, so that the clutch dog cannot be re-latched in a disengaged position. The latch arm 1505 can thus hold the clutch dog 1425 in a disengaged position after the dog 1425 has been released by the pawl 1417 upon depression of key 1400. The latch 1505 is so operated to hold the clutch dog in a disengaged position by the depression of either key 700 or 1240, and then remains operative throughout the tabulating phase of a transfer operation and through the five machine cycle program previously described.

The latch 1505 is operated by the depression of either the "Product Storage" key 700 or the "Quotient Storage" key 1240. It will be recalled that both of these keys are indirectly effective to rock the shaft 736, as shown in FIG. 24, which is primarily used to effect control of the primary auxiliary clutch. An arm 1509 is pinned on, or otherwise rigidly secured to, the shaft 736 and hence is rocked by depression of either of the keys 700 or 1240. The lower end of this arm carries a pin 1510 (see also FIG. 22), which is embraced within a slot 1511 formed in the forward end of a link 1512. The rear end of the link 1512 is pivotally connected to the latch arm 1505 by any suitable means, such as the long pin 1513 extending through an aperture 1514 of the bracket 1419. A spring 1515, tensioned between an ear 1516 formed on the forward end of the link and the pin 1510, resiliently holds the link 1512 in its rearward position when the two transfer keys 700 and 1240 rock the shaft 736 (clockwise in FIG. 22).

The arrangement above-described would normally hold the secondary pawl, or latch, member 1505 in latching position until the control keys will return to their normal position. This is undesirable as it would require an additional machine cycle, for the keys do not return to their raised position until the final cycle of machine operation in which the registers are being cleared. The clearing of the registers has nothing to do with the setting of the storage value into the selection mechanism, so that it is entirely possible for this setting operation to take place simultaneously with the register clearing operation already described. This is readily accomplished by means of a mechanism shown in FIG. 2. In connection with the description of the cam 1068, it was mentioned that this cam carries a roller 1084 which, at about the 270° position of the shaft 851 and cam, i.e., halfway through the cycle in which the shaft 851 and cam 1068 return to their full-cycle position, is effective to engage a nose 1086 on a cam follower arm 1085. This arm is connected by a link 1521 to an arm 1522 which is rigidly mounted on the right end of the shaft 1506. Thus, the rotation of the cam 1068 from its 180° position to its full-cycle position, is effective momentarily to force the link 1521 forwardly, thereby rocking the shaft 1506 (counter-clockwise in FIG. 2 and clockwise in FIG. 22). This rocking of the shaft causes the latching arm 1505 to release pin 1508, whereupon the spring 1436 snaps the dog 1425 into its operative position. This rocking of the link is permissible, even though the arm 1509 is locked in its operative position, as the spring 1515 will yield for this purpose. Thereafter, when the pin 1084 releases the cam nose 1086 on arm 1085 and permits the link 1521 and shaft 1506 to return toward an operative position due to the force of spring 1515, the dog 1425 will already have rocked sufficiently to prevent re-engagement of pin 1508 by the nose 1507 of latching arm 1505. Thus, the single tooth on the clutch dog 1425 is ready to engage the single tooth on the ratchet 1426 as the shaft 1427 comes to its full-cycle position and continues on in its clearing cycle of operation.

10. *Operation*

The operation of the mechanisms controlled by the "Storage to Keyboard" key 1400 can be very briefly summarized: The depression of the key rocks the shaft 758, by the mechanism shown in FIG. 24, to initiate a single cycle of machine operation. This operation can be either from the depression of the key alone or its simultaneous depression of either of the transfer keys. If the key 1400 is depressed alone, the rocking of the arm 1410, shown in FIGS. 20 and 24, forces the clutch control link 1411 rearwardly, thereby causing the clutch pawl 1417 to be rocked to a clutch-engaging position. In the event the key 1400 is operated alone, the auxiliary pawl, or latch, 1505 is not operated and consequently the clutch 1425, 1435, shown in FIG. 22, becomes engaged and the machine operates through the single cycle controlled by this clutch. If the key 1400 has been depressed simultaneously with either of the transfer keys, the rocking of shaft 736 by the transfer keys, by means of link 1512, operates the latch 1505 to hold the clutch dog 1425 in an inoperative position. This latch remains effective until the cam, or program, shaft 851 returns from its operative, or 180°, position to its full-cycle position, during which cycle the latch is released by the operation of arm 1085, link 1521 and shaft 1506.

Approximately halfway through the cycle controlled by clutch 1425, 1435, the lobe 1440 of cam 1439, as shown in FIG. 21, engages the roller 1442 on the upper end of cam follower, or rocker, 1441, thereby rocking the latter and holding it in its rocked position throughout substantially the entire balance of the cycle. Rocking of this arm 1441 is effective, through pin 1443, to lift the clutch control link 1411, thereby releasing the clutch pawl 1417 to the force of its spring 1422 so that it will cause disengagement of the clutch at the end of the single cycle of operation, regardless of whether the key 1400 is held depressed or not. The rocking of the follower lever 1441, as shown in FIG. 21, is effective, through the force of spring 1500, to rock arm 1499, thereby pushing the link 1498 forwardly to rock the bail 1494 (clockwise in FIG. 20). The rocking of this bail is effective to rock the sensing fingers 1482 and 1483 downwardly into operative position, and they are held in this position throughout practically the entire balance of the cycle. At approximately the 270° position of this cycle, the pin 1444 on cam 1439 engages the end of arm 1447, thereby rocking it, and consequently the bail 1450 (counter-clockwise in FIGS. 20 and 21 and clockwise in FIGS. 22 and 23). The rocking of this bail, through arms 1470 and springs 1473, resiliently forces the respective various selection slides 210 and 211 forward until the shoulders 1488 on the sensing fingers 1482 and 1483 engage either the periphery of the cam 1480 or the end of one of the slots 1481 formed therein. The latching of the bail 1450 in its forward position resiliently holds the slides in the adjusted position. Even though the bail 1494 is permitted to rise at the end of the cycle, the various sensing fingers 1482 and 1483 are prevented from rising out of the slots, or out of engagement with the periphery of the cam because of the friction between the shoulders 1488 and the cam face which they engage. If it is felt that this friction is not sufficient, it is a simple matter to provide the shoulders 1488 with small right-angular formed ears which would latch under the shell of the sensing cam 1480 and thereby positively lock the fingers 1482 and 1483 against disengagement, as was disclosed in my former application, S.N. 447,143, now Patent No. 2,909,320. By this means, the value in the storage register dial 701 is set into the coordinal selection bars 210 or 211. If the "Storage to Keyboard" key is operated simultaneously with one of the transfer keys 700 or 1240, then the latch member 1505 is effective as heretofore noted. Thereafter, the clutch pawl 1417 is rocked to clutch-engaging position, as heretofore noted, but the secondary pawl, or latch, 1505 is rendered operative, thereby preventing engagement of the clutch dog 1425 with the ratchet member 1426 until after the transfer cycle has been completed. Such rocking of the latch 1505, however, has permitted the shoulder 1437 on the clutch dog to rock a slight distance sufficient to prevent relatching on the corresponding shoulder 1420 of the clutch pawl. Thereafter, when the transfer operation is completed, and the cam, or program shaft, 851 is rotating from its half-cycle position to its full-cycle position to initiate the operation of the register clearing mechanism, the mechanism shown in FIG. 2 releases this auxiliary latch and thereby permits engagement of the clutch shown in FIG. 22 in its full-cycle position. Then, in the final cycle of machine operation, the clutch will be effective to control the setting mechanism herein described, which setting operation will occur simultaneously with the register clearing operation already described.

It has been mentioned before that it is practical to use modified cams and change the number of cycles required to effect the transfer accordingly. I have found that a cam having four value steps equivalent to "0," "1," "2" and "3" is very effective, and the machine using these cams effects the transfer in three machine cycles.

FIG. 16A is a plan view of the accumulator cam 1535 used in the three-cycle process. This cam has an extreme projection, or lobe, 1536 corresponding to a value of "0" and having an angular extent corresponding to the "0" position of the dials; a first intermediate step 1537 operable to set the sensing slides to a value of "1" and having an angular extent corresponding to the "1" position of the dials; a second intermediate step 1538 corresponding to a value "2" and having an angular extent corresponding to the "2" position of the dial; and a prolonged low portion 1539 extending from the "3" through the "9" value positions and operative to set a value of "3" respective to the selection slide. Such cams set the coordinal selection bars to values of "0" or "1" through "3", respectively, and the machine operates in the same manner as above-described to subtract these values from the accumulator dials and insert them in the storage dials until a dial registers a value of "0." A comparison of cam 1535 with that of cam 1035 shown in FIG. 16, illustrates the difference in the three and the five-step process.

Similarly, the counting cam 1545 of the three-step process, which is shown as a developed view in FIG. 16B, has a projecting nose, or lobe, 1546 corresponding to its "0" value position; a first step 1547 extending from the "1" through the "3" value positions and effective to set the sensing means to a value of "1," a second intermediate step 1548 extending through the angle corresponding to the "4" through "6" value positions of the dial and operable to set the sensing means to a value of "2;" and the final, or terminal, step 1549 extending from the "7" through "9" value positions and operable to set a value of "3" on the selection slides. It is seen by reference to FIG. 16B that after the extreme "0" lobe, the nine remaining values are divided equally between the three successive differential steps. This formula was also true of the preferred form shown in FIG. 16, in which the nine remaining values were divided into two groups as equally as could be done.

With the cams shown in FIGS. 16A and 16B, the corresponding selection slide can be set also to a value of "3" and, in that event, the counting mechanism counts out three cycles of digitation and then clears the machine in the same manner as herein described.

It will be understood that the machine shown and described herein is a preferred embodiment of my invention, and that the mechanisms shown are capable of considerable modification by a person skilled in the art without departing from the spirit or scope of this invention. It will be understood, also, that although the present invention has been shown and described as embodied in the machine of the type disclosed in the Friden patents above-mentioned, this invention is not limited to incorporation in such a machine and may be applied to other commercial calculating machines on the market.

I claim:

1. A calculating machine comprising ordinally arranged accumulator register wheels; a digitation means including ordinally arranged driving gears and intermediate gears selectively positionable with respect to their driving gears to enter a value determined by the relative position of said intermediate gears to their driving gears into said accumulator register wheels; means for connecting said accumulator wheels to the digitation means for additive or subtractive operation of the accumulator register wheels; a selection mechanism for positioning said intermediate gears; ordinally arranged counter register wheels; a counter actuating means normally operative to insert a value of "1" into a single order of said counter register wheels only and to effect tens-transfers between the respective orders of said counter register wheels; auxiliary counter actuators operative to insert a value of "1" into all orders of the counter register wheels subtractively; a plurality of ordinally arranged storage members connectable to the ordinally related intermediate gears; means for connecting said storage members to the ordinally related intermediate gears; a drive means for operating said machine through five cycles of operation of said digitation means; a cam on each of said accumulator register wheels, said cams having one extreme portion corresponding to a value of "0" and extending through an angle corresponding to the "0" value position of said wheel, an intermediate portion corresponding to a value of "1" and extending through an angle corresponding to the "1" value position of the wheel, and a second extreme portion corresponding to a value of "2" and extending through an angle corresponding to the "2" through "9" value positions of the wheel; a value cam on each of said counter register wheels, said cams having one extreme portion corresponding to a value of "0" and extending through an angle corresponding to the "0" position of the wheel, an intermediate portion corresponding to a value of "1" and extending through an angle corresponding to the "1" through "5" value positions of the wheel, and a second extreme portion corresponding to a value of "2" and extending through an angle corresponding to the "6" through "9" value positions of the wheel; a sensing mechanism selectively operable to sense either the accumulator cams or the counter cams and operative to set the coordinal selection mechanism to values corresponding to "0," "1" or "2"; means for operating the sensing mechanism to sense either the counter cams or the accumulator cams; a first control key operative to enable said storage member connecting means and thereby connect the storage members to the coordinal intermediate gears, to operate the means for operating the sensing means to sense the accumulator dials, to enable said accumulator wheel connecting means to connect the digitation means to the accumulator register wheels for subtractive operation, and to operate said drive means; and a second control key operative to enable said storage member connecting means and thereby connect said storage members to the coordinal intermediate gears, to operate the means for operating the sensing mechanism to sense the counter cams, to operate said auxiliary counter actuators to operate all of said counter dials subtractively with each cycle of machine operation, and to operate said drive means.

2. A calculating machine comprising ordinally arranged accumulator register dials, a selection mechanism, an ordinally arranged digitation means to enter a value determined by the selection means into said accumulator dials, means for connecting said accumulator dials to the digitation means for additive or subtractive operation, ordinally arranged counter register dials, a counter actuating means normally operative to insert a value of "1" in a single order of said counter dials only and to effect tens-transfers between the respective orders of said counter register, auxiliary counter actuators operative to insert a value of "1" into all orders of the counter dials subtractively, a plurality of ordinally arranged storage members connectable to the ordinally related digitating means, means for connecting said storage members to the digitating means, a drive means for operating said machine through five cycles of operation of said digitation means, a value position indicating means positioned by each of the said accumulator dials for indicating a "0," a "1" or a "2" to "9" value position of said dials, a value position indicating means positioned by each of the said counter register dials for indicating a "0," a "1" to "5" or a "6" to "9" value position of said dials, a sensing mechanism selectively operable to sense either the value position indicating means associated with the accumulator dials or the value position indicating means associated with the counter dials and operative to set the coordinal selection mechanism to values corresponding to "0," "1" or "2," respectively, means for operating the sensing mechanism to sense the value position of either the counter dials or the accumulator dials; a first control key effective to operate said storage member connecting means to connect the storage members to the digitation means, to operate the means for operating the sensing means to sense the accumulator dial indicating means, to operate the accumulator register connecting means to connect the digitation means to the accumulator register for subtractive operation, and to operate said drive means; and a second control key effective to operate said storage member connecting means to connect said storage members to the digitation means, to operate the means for operating the sensing mechanism to sense the counter dial indicating means, to operate said auxiliary counter actuators to operate all of said counter dials subtractively with each cycle of machine operation, and to operate said drive means.

3. In a cyclically operable calculating machine having a cyclically operable drive means including means for determining the number of cycles of operation, ordinally arranged accumulator register wheels, a selection mechanism, a digitation means including ordinally arranged positionable gears for controlling the entry of a value determined by the selection mechanism additively or subtractively into said accumulator wheels, ordinally arranged counter register wheels, a counter actuating means normally operative to insert a value of "1" in a single order only of said counter wheels and to effect tens-transfers between the respective wheels of said counter register, a plurality of ordinally arranged storage members connectable to the ordinally related positionable gears, and means for connecting said storage members to the ordinally related positionable gears, the combination comprising a cam on each of said accumulator register wheels, said cams having one extreme portion corresponding to a value of "0" and extending through an angle equivalent to the "0" value position on said wheel and a plurality of steps of successive values, each step except the last one extending through an angle equivalent to the corresponding value position of the accumulator wheel and the last of these steps extending through an angle equivalent to the corresponding value position through the "9" value position of the accumulator wheel; a value cam on each of said counter register wheels, said cams having one extreme portion corresponding to a value of "0" and extending through an angle corresponding to the "0" position of the counter wheel, a plurality of succcesive value positions corresponding to successive values and each extending through an angle equivalent to the angle of the other nine value positions divided by the number of successive steps; a sensing mechanism selectively operable to sense either the accumulator cams or the counter cams and operative to set the coordinal selection mechanism to the corresponding values sensed; means for operating the sensing mechanism to sense either the counter cams or the accumulator cams; a first control key operative to enable said storage member connecting means and thereby connect the storage members to the coordinal positionable gears, to operate the means for operating the sensing means to sense the accumulator cams, to enable the digitation means for subtractive operation, and to operate said drive means a predetermined number of cycles required to transfer a value of "9" when the selection mechanism is set to the largest of said cam values; and a second control key operative to enable said storage value connecting means and thereby connect said storage members to the coordinal intermediate gears, to operate the means for operating the sensing mechanism to sense the counter cams, to operate said counter actuator to operate all of said counter wheels subtractively with each cycle of machine operation, and to operate said drive means through said predetermined number of cycles.

4. In a calculating machine having ordinally arranged accumulator wheels, a cyclically operable digitation means including ordinally arranged driving gears and intermediate gears selectively positionable with rsepect to their driving gears to enter a value determined by the relative position of the intermediate gears with their driving gears into said accumulator wheels, a plurality of ordinally arranged storage members connectable to the ordinally related digitation means, means for connecting said storage members to said digitation means, and a selection mechanism for positioning the intermediate gears, a means for transferring values from said accumulator wheels into said storage members which comprises a value cam on each of said accumulator wheels, said cams having an extreme step corresponding to the value of "0" and extending through an angle corresponding to the "0" value position of the accumulator wheel, an intermediate step corresponding to the value of "1" and extending through an angle corresponding to the "1" value position of the accumulator wheel, and a second extreme step corresponding to a value of "2" and extending through an angle corresponding to the "2" to "9" value positions of the accumulator wheel, a sensing means operable to sense the ordinally related value cams and operative to set the ordinally related selection mechanism to values of "0," "1" and "2," respectively, means for actuating said sensing means, cycle control means for controlling operation of said digitation means through five cycles, an interregister transfer control key operative to enable said connecting means to connect the coordinal digitation means and the storage members, to operate said actuating means, and to operate said cycle control means.

5. In a calculating machine having ordinally arranged accumulator wheels, a selection mechanism, a digitation means for controlling the entry of a value determined by the selection mechanism into said accumulator wheels additively or subtractively, a plurality of ordinally arranged storage members connectable to the ordinally related digitation means, and a cyclically operable drive means for determining the number of cycles of operation of said digitation means, a means for transferring values from said accumulator wheels into said storage members which comprises a value cam on each of said accumulator wheels, said cams having an extreme step corresponding to the value of "0," an intermediate step corresponding to the value of "1" and a second extreme step corresponding to a value of "2," the second extreme step extending through an angle corresponding to the "2" to "9" value positions of the accumulator wheel and the other two steps extending only through their respective value positions, a sensing means operable to sense the ordinally related value cams and operative to set the ordinally related selection mechanism to values of "0," "1" and "2," respectively, an interregister transfer control key operative to connect the respective ordinal digitation means to the coordinal accumulator wheels for subtractive operation and to the coordinal storage members, for operating said sensing means, and for controlling the operation of said drive means through five digitation cycles, thereby subtracting the values originally in the wheels from the wheels and inserting such values in the storage register.

6. In a cyclically operable calculating machine having ordinally arranged accumulator wheels, a cyclically operable digitation means including ordinally arranged driving gears and intermediate gears selectively positionable with respect to their driving gears to enter a value determined by the relative position of the intermediate gears to their driving gears into said accumulator wheels, a plurality of ordinally arranged storage members connectable to the ordinally related digitation means, means for connecting said storage members to said intermediate gears, and a selection mechanism for positioning the intermediate gears, a means for transferring values from said accumulator wheels into said storage members which comprises a value cam on each of said accumulator wheels, said cams having an extreme step corresponding to the value of "0" and extending through an angle corresponding to the "0" value position of the accumulator wheel and a plurality of not more than three additional steps of differential values, each step except the last one extending through an angle equivalent to the corresponding value position of the accumulator wheel and the last of these steps extending through an angle equivalent to the corresponding value position through the "9" value position of the accumulator dial, a sensing means operable to sense the ordinally related value cams and operative to set the ordinally related selection mechanism to corresponding values, an interregister transfer control key for operating said connecting means to connect coordinal digitation means and the storage members, for operating said sensing means, and for controlling the operation of said digitation means through the number of cycles required to set a value of "9" into said storage members when the selection mechanism is set to the largest of said cam values.

7. In a cyclically operable calculating machine having an accumulator register, ordinally arranged counter wheels, a counter actuator normally operative to insert a value of "1" in a single counter wheel additively or subtractively, a digitation means including ordinally arranged driving gears and intermediate gears selectively positionable with respect to their driving gears to enter a value determined by the relative position of said intermediate gears to their driving gears into said accumulator register, a selection mechanism for positioning said intermediate gears, a plurality of ordinally arranged storage members connectable to the ordinally related intermediate gears, and positionable means for connecting said storage members to the coordinal intermediate gears, a means for transferring values from the counter register into the storage members which comprises a cam on each of said counter wheels, said cams having an extreme value position corresponding to a value of "0" and extending through an angle corresponding to the "0" value position of the wheel, an intermediate position corresponding to a value of "1" and extending through an angle corresponding to the "1" through "5" value positions of the wheel, and a second extreme value position corresponding to a value of "2" and extending through an angle corresponding to the "6" through "9" value positions of the wheel, an ordinally arranged sensing means operated by the coordinal value cams and operative to set the selection mechanism to values of "0," "1" and "2," respectively, means for operating each of said counter wheels a single value increment in each cycle of machine operation in a subtractive direction, and a control means operative to enable said connecting means to connect said storage members to the coordinal intermediate gears, to condition said counter actuator for subtractive operation in each order of the counter register, and for operating the machine through a program of five cycles of operation.

8. In a cyclically operable calculating machine having ordinally arranged counter wheels, a counter actuator operative to insert a value of "1" in a single counter wheel additively or subtractively, an accumulator register, a digitation means including ordinally arranged and differentially positionable gears, a selection mechanism for positioning said positionable gears, a plurality of ordinally arranged storage members connectable to the ordinally related intermediate gears, and positionable means for connecting said storage members to the coordinal intermediate gears, a means for setting values into the storage members corresponding to values registered in the counter register which comprises a cam on each of said counter wheels, said cams having an extreme value position of an angular extent corresponding to the "0" position of the wheel, a plurality of successive value positions corresponding to successive differential values and each extending through an angle equivalent to the angle of the other nine value positions divided by the number of such successive steps, an ordinally arranged sensing means operated by the coordinal value cams and operative to set the selection mechanism to corresponding values, auxiliary actuating means for operating all of said counter wheels subtractively a single increment in each cycle of machine operation, means for locking the selection mechanism in its "0" position whenever the coordinal cam registers a "0" value, and a control means operative to position said connecting means to connect said storage members to the coordinal positionable gears, to enable said auxiliary actuating means and thereby operate said counter subtractively in each order thereof, and to operate the machine through the number of cycles of operation required to set a value of "9" into said storage members when the selection mechanism is set to the largest of said cam values.

9. In a cyclically operable calculating machine having ordinally arranged counter dials, a counter actuator operative to insert a single digital value in a single dial additively or subtractively, a selection mechanism, a digitation means including positionable gears controlled by said selection mechanism, a plurality of ordinally arranged storage members connectable to the ordinally related positionable gears, and positionable means for connecting said storage members to the coordinal positionable gears, a means for transferring values from the counter register into the storage members which compises a cam on each of said counter dials, said cams having an extreme value position corresponding to a value of "0" and of an angular extent corresponding to the "0" position of that wheel, an intermediate position corresponding to a value of "1," and a second extreme value position corresponding to a value of "2," the last two mentioned positions having an angular extent corresponding approximately to five-ninths and four-ninths, respectively, of the remaining angular extent of the dial, an ordinally arranged sensing means operated by the coordinal value cams and operative to set the selection mechanism to values of "0," "1" and "2," respectively, auxiliary actuating means for operating each of said counter wheels subtractively a single value increment in each cycle of machine operation, and a control means operative to position said connecting means to connect said storage members to the coordinal intermediate gears, to enable said auxiliary actuating means and to operate the machine through a program of five cycles of operation.

10. In a calculating machine having ordinally arranged accumulator wheels, an ordinally arranged selection mechanism, an ordinally arranged digitation means connectable to said accumulator wheels for entering a value determined by the ordinally related selection mechanism into said connecting accumulator wheels additively or subtractively, a plurality of ordinally arranged storage members connectable to the ordinally related digitation means, a means for transferring values from said accumulator wheels into said storage members which comprises a drive means for operating said machine through five cycles of operation of said digitation means, a value indicating means for ecah of said accumulator wheels for indicating the "0" value position, the "1" value position, or the "2" to "9" value position of their respective accumulator wheels, an ordinally arranged, sensing means operable to sense the ordinally related value indicating means and operative to set the ordinally related selection mechanism to values of "0," "1" and "2," respectively, an interregister transfer control means operative to connect the coordinal digitation means and the storage members, to connect the digitation means to the accumulator wheels for subtractive operation, to operate said sensing means, and to control the operation of said drive means through said five digitation cycles.

11. In a cyclically operable calculating machine having ordinally arranged counter wheels, a counter actautor operative to insert a value of "1" in a single counter wheel additively or subtractively, an ordinally arranged digitation means, a selection mechanism, a plurality of ordinally arranged storage members connectable to the ordinally related digitation means, and positionable means for connecting said storage members to the coordinal digitation means, a means for transferring values from the counter register into the storage members which comprises a value indicating means fo each of said counter wheels for indicating the "0" value position, the "1" to "5" value position, or the "6" to "9" value position of the respective counter wheels, an ordinally arranged sensing means operated by the coordinal indicating means and operative to set the selection mechanism to values of "0," "1" and "2," respectively, auxiliary means for operating each of said counter wheels subtractively a single increment in each cycle of machine operation, and a control means operative to position said positionable means to connect said storage members to the coordinal digitation means, to enable operation of said auxiliary means, and to operate the machine through a program of five cycles of operation.

12. In a calculating machine having ordinally arranged accumulator wheels, a cyclically operable digitation means including ordinally arranged driving gears and intermediate gears selectively positionable with respect to their driving gears to enter a value determined by the relative position of the intermediate gears to their driving geas into said accumulator wheels, means for connecting the accumulator wheels to the digitating means for additive or subtractive operation of the accumulator wheels, a plurality of ordinally arranged storage members connectable to the ordinally related digitation means, means for connecting said storage members to the ordinally related digitation means, and a selection mechanism for positioning the intermediate gears, a means for transferring values from said accumulator wheels into said storage members which comprises a drive means for operating said digitation means through three cycles of operation, a value cam on each of said accumulator wheels, said cams having an extreme step corresponding to the value of "0" and extending through an angle corresponding to the "0" value position of the accumulator wheel, a first intermediate step corresponding to the value of "1" and extending through an angle corresponding to the "1" value position of the accumulator wheel, a second intermediate step corresponding to a value of "2" and extending through an angle corresponding to the "2" value position of the accumulator wheel, and a second extreme step corresponding to a value of "3" and extending through an angle corresponding to the "3" to "9" value positions of the accumulator wheel, an ordinally arranged sensing means operable to sense the ordinally related value cams and operative to set the ordinally related selection mechanism to values of "0," "1," "2" and "3," respectively, an interregister transfer control member operative to operate the storage member connecting means to connect the storage members to the coordinal digitation means, to operate the accumulator connecting means to connect the accumulator wheels to the digitation means for subtractive operation, to operate said sensing means, and to operate said drive means to control the operation of said digitation means through said three machine cycles.

13. In a cyclically operable calculating machine having ordinally arranged counter wheels, a counter actuator normally operative to insert a value of "1" in a single counter wheel additively or subtractively and positionable to subtract a value of "1" in every order simultaneously, an ordinally arranged digitation means, a selection mechanism for controlling operation of said digitation mechanism, a plurality of ordinally arranged storage members connectable to the ordinally related digitation means, and positionable means for connecting said storage members to the coordinal digitation means, a means for transferring values from the counter register into the storage members which comprises a cam on each of said counter wheels, said cams having an extreme value position corresponding to a value of "0" and extending through an angle corresponding to the "0" value position of the wheel, a first intermediate position corresponding to a value of "1" and extending through an angle and corresponding to the "1" through "3" value positions of the wheel, a second intermediate position corresponding to a value of "2" and extending through an angle corresponding to the "4" through "6" value positions of the wheel, and a second extreme value position corresponding to a value of "3" and extending through an angle corresponding to the "7" through "9" value positions of the wheel, an ordinally arranged sensing means operated by the coordinal value cams and operative to set the selection mechanism to values of "0," "1," "2" or "3," respectively, means for positioning the counter actuator to drive each of said counter wheels a single value increment in each cycle of machine operation in a subtractive direction, and a control means operative to position said storage member connecting means to connect said storage members to the coordinal digitation means, to operate said counter actuator positioning means to position said counter actuator for subtractive operation in each order of the counter, and to operate the machine through a program of three cycles of operation.

14. In a cyclically operable calculating machine having a cyclically operable drive means including means for determining the number of cycles of operation ordinally arranged accumulator wheels, a digitation means including ordinally arranged driving gears and positionable intermediate gears, means for connecting said digitation means to said accumulator dials for additive or subtractive operation of said wheels, a plurality of ordinally arranged storage members, means for connecting the storage members to the ordinally related positionable gears, and a selection mechanism for positioning the intermediate gears, a means for transferring values from said accumulator wheels into said storage members which comprises a value cam on each of said accumulator wheels, said cams having an extreme step corresponding to the value of "0" and extending through an angle corresponding to the "0" value position of the accumulator wheel and a plurality of not more than three additional steps of successive values, each step except the last one extending through an angle equivalent to the corresponding value position of the accumulator wheel and the last of these steps extending through an angle equivalent to the corresponding value position through the "9" value position of the accumulator dial, a sensing means operable to sense the ordinally related value cams and operative to set the ordinally related selection mechanism to corresponding values, an interregister transfer control member effective to operate both connecting means to connect the digitation means to the coordinal accumulator wheels for subtractive operation and to the storage members, to operate said sensing means, and to operate said digitation means through the number of machine cycles required to erase a value of "9" when the selection mechanism is set to the largest of said cam values.

15. In a cyclically operable calculating machine having ordinally arranged counter wheels, a counter actuator normally operative to insert a value of "1" in a single counter wheel additively or subtractively, an accumulator register, a selection mechanism, a digitation means operable to enter a value determined by the selection mechanism into said accumulator register, a plurality of ordinally arranged storage members connectable to the ordinally related digitation means, and positionable means for connecting said storage members to the ordinally related digitation means, a means for transferring values from the counter register into the storage members which comprises a cam on each of said counter wheels, said cams having an extreme value position corresponding to a value of "0" and extending through an angle corresponding to the "0" value position of the wheel and a plurality of steps of successive values, each step extending through an angle corresponding to a number of value positions of the wheel equal to nine divided by the number of such steps, an ordinally arranged sensing means operated by the coordinal value cams and operative to set the selection mechanism to corresponding values, auxiliary actuating means for operating each of said counter wheels a single value increment in each cycle of machine operation in a subtractive direction, and a control means operative to connect said storage members to the ordinally related digitation means to operate said auxiliary actuating means, and for operating the machine through a number of cycles of operation required to transfer a value of "9" when the selection mechanism is set to the largest of said cam values.

16. In a calculating machine having a plurality of ordinally arranged register wheels, a cyclically operable digitation means including ordinally arranged and differentially positionable gears, an ordinally arranged selection mechanism for positioning the positionable gears, a plurality of ordinally arranged storage members connectable to the ordinally related positionable gears, means for connecting said storage members to the ordinally related positionable gears, and a drive means for operating said digitation means through five cycles of operation, a means for transferring values from said register wheels into said storage members which comprises a value cam operatively connected to each of said register wheels, said cams having an extreme step corresponding to the value of "0," an intermediate step corresponding to the value of "1" and a second extreme step corresponding to a value of "2," a sensing means operable to sense the ordinally related value cams and operative to set the ordinally related selection mechanism to values of "0," "1" and "2," respectively, sensor operating means for operating said sensing means, means for holding the selection mechanism in a "0" registering position whenever the coordinal cam registers a "0" value, means for driving said register wheels subtractively, and an interregister transfer control member operative to operate the connecting means, to operate the sensor operating means, and to operate said drive means.

17. In a cyclically operable calculating machine having ordinally arranged register wheels, a digitation means including ordinally arranged differentially positionable gears, an ordinally arranged selection mechanism for positioning said positionable gears, a plurality of ordinally arranged storage members connectable to the ordinally related positionable gears, and connecting means for connecting said storage members to the coordinal positionable gears, a means for transferring values from the register wheels into the storage members which comprises a cam on each of said register wheels, said cams having an extreme value position corresponding to a value of "0" and extending through an angle corresponding to the "0" value position of the wheel, an intermediate position corresponding to a value of "1" and extending through an angle corresponding to the "1" through "5" value positions of the wheel, and a second extreme value position corresponding to a value of "2" and extending through an angle corresponding to the "6" through "9" value positions of the wheel, an ordinally arranged sensing means operated by the coordinal value cams and operative to set the selection mechanism to values of "0," "1" and "2," respectively, means for operating each of said register wheels a single value increment subtractively in each cycle of machine operation, means for latching an ordinal selection mechanism in its "0" registering position whenever the coordinal cam registers a "0" value, and a control means operative to enable said connecting means to connect said storage members to the coordinal intermediate gears, to operate said register operating means for such subtractive operation in each order of the register, and for operating the machine through a program of five cycles of operation.

18. In a cyclically operable calculating machine having ordinally arranged accumulator members, an ordinally arranged selection mechanism, an ordinally arranged digitation means controlled by said selection mechanism and normally operative to set a value determined by said selection means additively or subtractively into said accumulator members, a drive means therefor, a plurality of ordinally arranged storage members, a means for transferring values from said accumulator members into said storage members which comprises means for connecting the storage members to the coordinal digitation means, a value cam on each of said accumulator members, said cams having an extreme step corresponding to the value of "0" and extending through an angle corresponding to the "0" value position of the accumulator member and a plurality of not more than three additional steps of differential values, each step except the last one extending through an angle equivalent to the corresponding value position of the accumulator member and the last of these steps extending through an angle equivalent to the corresponding value position through the "9" value position of the accumulator member, a sensing means operable to sense the coordinal value cams and operative to set the coordinal selection mechanism to corresponding values, cycle control means for operating said drive means through the number of cycles required to erase a value of "9" when the selection mechanism is set to the largest of said cam values, an interregister transfer control member effective to operate said connecting means and thereby connect the digitation means to the coordinal storage members, to operate said sensing means, and to operate said cycle control means.

References Cited in the file of this patent

UNITED STATES PATENTS

| | | |
|---|---|---|
| 2,714,989 | Ellerbeck | Aug. 9, 1953 |
| 2,794,596 | Ellerbeck | June 4, 1957 |
| 2,828,913 | Ellerbeck | Apr. 1, 1958 |